US008652221B2

(12) United States Patent
Uptain et al.

(10) Patent No.: US 8,652,221 B2
(45) Date of Patent: Feb. 18, 2014

(54) HYBRID WAX COMPOSITIONS FOR USE IN COMPRESSION MOLDED WAX ARTICLES SUCH AS CANDLES

(75) Inventors: Kevin D. Uptain, Minneapolis, MN (US); Scott Walters, Sugar Grove, IL (US); John M. Zupfer, Mounds View, MN (US); Timothy A. Murphy, Yorkville, IL (US); Clive P. Bosnyak, Dripping Springs, TX (US); David E. Henton, Jackson, WY (US); Steve Russell, Grayslake, IL (US); Michael J. Tupy, Crystal, MN (US)

(73) Assignee: Elevance Renewable Sciences, Inc., Bolingbrook, IL (US)

( * ) Notice: Subject to any disclaimer, the term of this patent is extended or adjusted under 35 U.S.C. 154(b) by 364 days.

(21) Appl. No.: 12/637,123

(22) Filed: Dec. 14, 2009

(65) Prior Publication Data

US 2010/0205851 A1 Aug. 19, 2010

Related U.S. Application Data

(63) Continuation of application No. PCT/US2008/067025, filed on Jun. 13, 2008.

(60) Provisional application No. 60/934,753, filed on Jun. 15, 2007.

(51) Int. Cl.
*C11C 5/00* (2006.01)
*B29C 39/00* (2006.01)

(52) U.S. Cl.
USPC .............................................. 44/275; 264/330

(58) Field of Classification Search
USPC ................................ 44/275; 554/163; 426/610
See application file for complete search history.

(56) References Cited

U.S. PATENT DOCUMENTS 1,935,946 A 11/1933 Egan et al.
1,954,659 A 4/1934 Will (Continued)

FOREIGN PATENT DOCUMENTS

DE 19956226 A1 5/2001
EP 0536861 A1 4/1993

(Continued)

OTHER PUBLICATIONS

Extended European Search Report for European Application No. 08771113.1, dated Sep. 7, 2010, 6 pages.

(Continued)

*Primary Examiner* — James Goloboy
*Assistant Examiner* — Chantel Graham
(74) *Attorney, Agent, or Firm* — Brinks Gilson & Lione

(57) ABSTRACT

A hybrid wax compositions that are suitable for use in manufacturing wax articles (e.g., candles) by compression molding. The combination of a hydrogenated natural oil-based wax and a paraffin wax having a select distribution of hydrocarbon chain lengths provides the hybrid wax compositions with improved properties, such as improved compressive strength and improved de-molding characteristics, for example, as evidenced by reducing scarring and/or flashing. The hybrid wax compositions comprise: (a) a wax comprising a hydrogenated natural oil; and (b) a paraffin wax, wherein the paraffin wax comprises less than about 50% by weight of the hybrid wax composition, and wherein about 52% or greater of hydrocarbons in the paraffin wax have carbon chain lengths ranging from C25 to C29.

22 Claims, 19 Drawing Sheets

(56) References Cited

U.S. PATENT DOCUMENTS 2,468,799 A 5/1949 Ziels et al.
2,784,891 A 3/1957 Thielke
3,448,178 A 6/1969 Flanagan
3,630,697 A 12/1971 Duling et al.
3,645,705 A 2/1972 Miller et al.
3,744,956 A 7/1973 Hess
3,844,706 A 10/1974 Tsaras
4,118,203 A 10/1978 Beardmore et al.
4,134,718 A 1/1979 Kayfetz et al.
4,292,088 A 9/1981 Scheuffgen et al.
4,293,345 A 10/1981 Zeilstra et al.
4,314,915 A 2/1982 Wiegers et al.
4,390,590 A 6/1983 Saunders et al.
4,411,829 A 10/1983 Schulte-Elte et al.
4,434,306 A 2/1984 Kobayashi et al.
4,507,077 A 3/1985 Sapper
4,545,941 A * 10/1985 Rosenburg .................... 554/163
4,554,107 A 11/1985 Takao
4,567,548 A 1/1986 Schneeberger
4,608,011 A 8/1986 Comstock
4,614,625 A 9/1986 Wilson
4,623,488 A 11/1986 Takao
4,714,496 A 12/1987 Luken, Jr. et al.
4,759,709 A 7/1988 Luken, Jr. et al.
4,813,975 A 3/1989 Poulina et al.
4,842,648 A 6/1989 Phadoemchit et al.
4,855,098 A 8/1989 Taylor
4,923,708 A * 5/1990 Given, Jr. ...................... 426/610
5,171,329 A 12/1992 Lin
5,258,197 A 11/1993 Wheeler et al.
5,338,187 A 8/1994 Elharar
5,380,544 A 1/1995 Klemann et al.
5,578,089 A 11/1996 Elsamaloty
5,660,865 A 8/1997 Pedersen et al.
5,700,516 A 12/1997 Sandvick et al.
5,723,137 A 3/1998 Wahle et al.
5,753,015 A 5/1998 Sinwald et al.
5,843,194 A 12/1998 Spaulding
5,885,600 A 3/1999 Blum et al.
5,888,487 A 3/1999 Baumoeller et al.
6,001,286 A 12/1999 Sleeter
6,019,804 A 2/2000 Requejo et al.
6,022,402 A 2/2000 Stephenson et al.
6,063,144 A 5/2000 Calzada et al.
6,099,877 A 8/2000 Schuppan
6,103,308 A 8/2000 Floyd et al.
6,106,597 A 8/2000 Starks et al.
6,123,979 A 9/2000 Hepburn et al.
6,127,326 A 10/2000 Dieckmann et al.
6,132,742 A 10/2000 Le Bras et al.
6,156,369 A 12/2000 Eger et al.
6,201,053 B1 3/2001 Dieckmann et al.
6,214,918 B1 4/2001 Johnson et al.
6,224,641 B1 5/2001 Matzat et al.
6,238,926 B1 5/2001 Liu et al.
6,255,375 B1 7/2001 Michelman
6,258,965 B1 7/2001 O'Lenick, Jr.
6,262,153 B1 7/2001 Webster et al.
6,276,925 B1 8/2001 Varga
6,277,310 B1 8/2001 Sleeter
6,284,007 B1 9/2001 Tao
6,471,731 B1 * 10/2002 Elliott et al. .................... 44/275
6,497,735 B2 12/2002 Tao
6,503,077 B2 1/2003 Orth et al.
6,503,285 B1 1/2003 Murphy
6,582,748 B1 6/2003 Loh et al.
6,586,506 B2 7/2003 Webster et al.
6,599,334 B1 7/2003 Anderson
6,645,261 B2 11/2003 Murphy et al.
6,673,763 B1 1/2004 Hansen et al.
6,730,137 B2 5/2004 Pesu et al.
6,733,548 B2 5/2004 Rasmussen et al.
6,758,869 B2 7/2004 Roeske et al.
6,770,104 B2 8/2004 Murphy
6,773,469 B2 8/2004 Murphy
6,797,020 B2 9/2004 Murphy
6,824,572 B2 11/2004 Murphy
6,846,573 B2 1/2005 Seydel
6,852,140 B1 2/2005 Roeske
6,943,262 B2 9/2005 Kodali et al.
7,037,439 B2 5/2006 Tavares
7,128,766 B2 10/2006 Murphy et al.
7,176,171 B2 2/2007 Nieendick et al.
7,192,457 B2 3/2007 Murphy et al.
7,217,301 B2 5/2007 Murphy et al.
7,387,649 B2 6/2008 Tao
7,462,205 B2 12/2008 Murphy
7,510,584 B2 3/2009 Cap
7,569,084 B2 8/2009 Tao et al.
7,588,607 B1 9/2009 Cap
7,601,184 B2 10/2009 Tischendorf
7,637,968 B2 12/2009 Murphy
2001/0013195 A1 8/2001 Tao
2001/0051680 A1 12/2001 Webster et al.
2002/0005007 A1 1/2002 Roeske et al.
2002/0144455 A1 10/2002 Bertrand et al.
2002/0157303 A1 10/2002 Murphy et al.
2003/0008257 A1 1/2003 Tao
2003/0017431 A1 1/2003 Murphy
2003/0022121 A1 1/2003 Biggs
2003/0046860 A1 3/2003 Tiffany et al.
2003/0057599 A1 3/2003 Murphy et al.
2003/0061760 A1 4/2003 Tao et al.
2003/0091949 A1 5/2003 Pesu et al.
2003/0110683 A1 6/2003 Murphy
2003/0134244 A1 7/2003 Gray et al.
2003/0198826 A1 10/2003 Seydel
2003/0207971 A1 11/2003 Stuart, Jr. et al.
2003/0213163 A1 11/2003 Berger et al.
2004/0000088 A1 1/2004 Wesley
2004/0037859 A1 2/2004 Cecchi et al.
2004/0047886 A1 3/2004 Murphy et al.
2004/0076732 A1 4/2004 Valix
2004/0088907 A1 5/2004 Murphy
2004/0088908 A1 5/2004 Murphy
2004/0138359 A1 7/2004 Dinkelaker et al.
2004/0200136 A1 10/2004 Tao et al.
2004/0221503 A1 11/2004 Murphy et al.
2004/0221504 A1 11/2004 Murphy
2005/0014664 A1 1/2005 Nadolsky et al.
2005/0060927 A1 3/2005 Murphy
2005/0095545 A1 5/2005 Tischendorf
2005/0123780 A1 6/2005 Seydel
2005/0158679 A1 7/2005 Chen et al.
2005/0269728 A1 12/2005 Roos
2006/0236593 A1 * 10/2006 Cap ................................ 44/275
2006/0272199 A1 12/2006 Licciardello et al.
2006/0272200 A1 * 12/2006 Murphy et al. ................ 44/275
2007/0006521 A1 1/2007 Licciardello et al.
2007/0006522 A1 1/2007 Tao
2007/0039237 A1 2/2007 Murphy et al.
2007/0056211 A1 3/2007 Li et al.
2007/0144058 A1 6/2007 Chen et al.
2007/0151480 A1 7/2007 Bloom et al.
2007/0270621 A1 11/2007 Millis et al.
2007/0282000 A1 12/2007 Murphy et al.
2008/0027194 A1 1/2008 Schrodi
2008/0028670 A1 * 2/2008 Tully et al. ...................... 44/275
2008/0064891 A1 3/2008 Lee
2008/0138753 A1 6/2008 Tao et al.
2008/0145808 A1 6/2008 Lee
2008/0206411 A1 8/2008 Nielsen
2008/0307696 A1 12/2008 Wu et al.
2009/0048459 A1 2/2009 Tupy et al.
2009/0119977 A1 5/2009 Murphy
2009/0217568 A1 9/2009 Murphy et al.
2009/0259065 A1 10/2009 Abraham et al.
2009/0264672 A1 10/2009 Abraham et al.
2010/0024281 A1 2/2010 Lemke et al.
2010/0044924 A1 2/2010 Cap
2010/0047499 A1 2/2010 Braksmayer et al.

(56) References Cited

U.S. PATENT DOCUMENTS

| | | | |
|---|---|---|---|
| 2010/0132250 | A1 | 6/2010 | Uptain et al. |
| 2010/0145086 | A1 | 6/2010 | Schrodi et al. |

FOREIGN PATENT DOCUMENTS

| | | | |
|---|---|---|---|
| EP | 0545715 | A1 | 6/1993 |
| EP | 0685554 | A1 | 12/1995 |
| EP | 0811664 | A1 | 12/1997 |
| EP | 1801096 | A1 | 6/2007 |
| JP | 56-32550 | A | 4/1981 |
| JP | 04-59897 | A | 2/1992 |
| JP | 06-009987 | A | 1/1994 |
| JP | 09-014574 | A | 1/1997 |
| WO | WO 92/00269 | | 1/1992 |
| WO | WO 96/00815 | A1 | 1/1996 |
| WO | WO 96/14373 | A1 | 5/1996 |
| WO | WO 98/45390 | A1 | 10/1998 |
| WO | WO 99/27043 | A1 | 6/1999 |
| WO | WO 02/30386 | A1 | 4/2002 |
| WO | WO 02/092736 | A1 | 11/2002 |
| WO | WO 03/012016 | A1 | 2/2003 |
| WO | WO 03/051134 | A2 | 6/2003 |
| WO | WO 03/057983 | A1 | 7/2003 |
| WO | WO 03/104348 | A1 | 12/2003 |
| WO | WO 2004/033388 | A1 | 4/2004 |
| WO | WO 2004/083310 | A1 | 9/2004 |
| WO | WO 2004/101720 | A1 | 11/2004 |
| WO | WO 2005/042655 | A2 | 5/2005 |
| WO | WO 2006/041011 | A1 | 4/2006 |
| WO | WO 2006/076364 | A2 | 7/2006 |
| WO | WO 2007/002999 | A1 | 1/2007 |
| WO | WO 2008/008420 | A1 | 1/2008 |
| WO | WO 2008/010961 | A2 | 1/2008 |
| WO | WO 2008/048520 | A2 | 4/2008 |
| WO | WO 2008/103289 | A1 | 8/2008 |
| WO | WO 2008/140468 | A2 | 11/2008 |
| WO | WO 2008/151064 | A1 | 12/2008 |
| WO | WO 2008/157436 | A1 | 12/2008 |

OTHER PUBLICATIONS

Behren et al., "Beeswax and other Non-Paraffin Waxes," Presented at NCA Technical Meeting, Jun. 19-20, 1991, 6 pages.

Bell et al., "Sperm Oil Replacements: Synthetic Wax Esters from Selectively Hydrogenated Soybean and Linseed Oils," Journal of the American Chemical Society, Jun. 1997, vol. 54, pp. 259-263.

Erhan et al. , "Drying Properties of Metathesized Soybean Oil," Journal of American Oil Chemists' Society, AOCS Press, vol. 74, No. 6, 1997, pp. 703-706.

Frahm, "Harvest Lights: The only soy-based candle, a bright idea," available at http://www.extension.uiuc.edu/~stratsoy/new/news/html/909166253,html, Oct. 23, 1998, 2 pages.

Mol, "Applications of Olefin Metathesis in Oleochemistry: An Example of Green Chemistry," Green Chemistry, Royal Society of Chemistry, Cambridge, GB, vol. 4, 2002, pp. 5-13.

Noller, Chemistry of Organic Compounds, W.B. Saunders Company, $2^{nd}$ Ed., 1957, pp. 181 and 192.

Oliefabrik et al., "Paper coating", Research Disclosure Journal, Dec. 1996, 2 pages.

Orso, "New Use for Soybeans Has Bright Future," available at http://www.unitedsoybean.com/news/nr981014.htm, Oct. 14, 1998, 2 pages.

Rezaei, "Hydrogenated Vegetable Oils as Candle Wax," J. of the Am. Oil Chemists' Society, vol. 12, No. 79, pp. 1241-1247 (Dec. 2002).

Tao, "Development of Vegetable Lipid-based Candles," available at http://abe.www.ecn.purdue.edu/ABE/Research/research94/REPORT.94.Book_68.htmls, 1994, 2 pages.

In Business, "America's Shining Example of Sustainable Business," available at http://www.candleworks.org, Mar./Apr. 1998, 3 pages.

Pages from Bitter Creek Candle Supply, Inc., website (http://www.execpc.com/~bcsupply) now at http://www.candlesupply.com, available at least by Jun. 29, 2000, 9 pages.

Pages from Ecowax, Nature's Gift, Inc., website (http://nglwax.com/ecowax.htm), available at least by Jul. 5, 2000, 3 pages.

Pages from Heartland Candleworks website, available at www.candleworks.org, available at least by Feb. 11, 2000, 4 pages.

Purdue Agriculture News, Purdue May Agriculture & Natural Resources Package, available at http://purduenews.uns.purdue.edu/UNS/paks/agpak.digest.9605.html, May 1996, 3 pages.

Purdue News, "Purdue students put the 'happy' back into birthday candles," available at http://www.purdue.edu/UNS/html4ever/9611.Schweitzer.candles.html, Nov. 1996, 3 pages.

Purdue News, "Purdue students put the 'happy' back into birthday candles," available at http://www.purdue.edu/UNS/html4ever/9604.Schweitzer.candles.html, May 1996, 2 pages.

Purdue University School of Agriculture, 1998 Farm Progress Show, available at http://www.admin.ces.purdue.edu/anr/98fps/fpspix/930.html, 1998, 4 pages.

International Search Report and Written Opinion of the International Searching Authority for International Application No. PCT/US2008/067025, dated Sep. 8, 2008, 7 pages.

* cited by examiner

42
Internal Olefin

12

14

16

18

20

22

24

26

28

60

62

64

66

66

C823

C827

C627

C712

C697

C682

50 where

L = $PCy_3$, sIMes, Mes, Phobane
X = H, $NO_2$, $SO_2N(CH_3)_2$
$X_2$ = H, $N^+(C_2H_3)_2CH_3$
$X_3$ = H, Phenyl
R = H, alkyl, aryl, $CO_2Me$

52 where

L = $PCy_3$, sIMes, Mes, Phobane
L' = $PCy_3$, Phobane sIMes

Mes

Phobane

| Limit (°c) | Limit (°c) | Percent (%) |
|---|---|---|
| 35.000 | 2.550 | 0.15 |
| 40.000 | 19.618 | 1.16 |
| 45.000 | 89.671 | 5.30 |
| 50.000 | 246.308 | 14.56 |
| 55.000 | 419.910 | 24.83 |

DSC Scan of Paraffin Control Wax

HYBRID WAX COMPOSITIONS FOR USE IN COMPRESSION MOLDED WAX ARTICLES SUCH AS CANDLES

CROSS-REFERENCE TO RELATED APPLICATIONS

This application is a continuation of International Application No. PCT/US2008/067025, filed Jun. 13, 2008, which claims the benefit of U.S. Provisional Application having Ser. No. 60/934,753, filed Jun. 15, 2007, and entitled HYBRID WAX COMPOSITIONS FOR USE IN COMPRESSION MOLDED WAX ARTICLES SUCH AS CANDLES, the disclosures of which are incorporated herein by reference.

BACKGROUND

Typically, compression candles are made from wax that has been formed into prills, which prills are compressed in a mold to make a candle. The candle industry has traditionally relied on prilled paraffin waxes to make compression candles.

Some attempts to formulate waxes from bio-based, renewable materials suitable for making compression candles have suffered from a variety of problems, including poor compressive strength, poor cohesive strength, slump at elevated temps, flashing, tooling, and fat bloom associated with triglycerides. The term cohesive strength is used herein to refer to the bulk strength of a compressed wax article (i.e., load to failure of a test specimen).

A desirable characteristic for prilled waxes is to compress evenly in the compression mold and for the resulting compressed wax article to exhibit sufficient strength to resist chipping or crumbling when subjected to rough handling or dropping. Natural oil-based waxes may be mixed with paraffin wax to create hybrid waxes with improved properties. However, hybrid waxes with greater than 50% weight natural oil-based wax, when compressed, typically fail to exhibit bulk strengths that are comparable to paraffin systems. Consequently, the resulting candles are more susceptible to damage during processing and handling. They can also be more susceptible to damage while being ejected from the compression mold, resulting in defects such as surface scarring, erosion, pitting and/or filming. The strength issues become more problematic as the size of the candle that is being manufactured increases. For example, it is particularly challenging to make bio-based compression candles that are freestanding and/or that are larger than about 2.5 inches wide by about 2.5 inches tall.

While paraffin-based compression candles exhibit good strength properties, paraffin wax does have some disadvantages, such as being a non-renewable resource; exhibiting visible emissions; and having a low fragrance holding ability (about 1% maximum by weight) in freestanding and/or larger-size compression candles.

Hence, there is continuing interest in the development of new wax compositions and candle products based on bio-based materials, such as natural oils, that have a high compressive and a high cohesive strength.

BRIEF SUMMARY

Hybrid wax compositions that are suitable for use in manufacturing wax articles (e.g., candles) by compression molding are disclosed here. The combination of a hydrogenated natural oil-based wax and a paraffin wax having a select distribution of hydrocarbon chain lengths provides the hybrid wax compositions with improved properties, such as improved compressive strength and improved de-molding characteristics, for example, as evidenced by reduced scarring and/or flashing. The hybrid wax compositions comprise: (a) a wax comprising a hydrogenated natural oil; and (b) a paraffin wax, wherein the paraffin wax comprises less than about 50% by weight of the hybrid wax composition, and wherein about 52% or greater of hydrocarbons in the paraffin wax have carbon chain lengths ranging from C25 to C29.

Wax articles incorporating the hybrid wax compositions may be formed from prilled wax particles by compressing the prilled wax particles to form the wax article.

BRIEF DESCRIPTION OF THE DRAWINGS

The invention will be described further in connection with the attached drawings, wherein like reference numbers have been used to indicate like parts and wherein.

DETAILED DESCRIPTION

Figure 1:
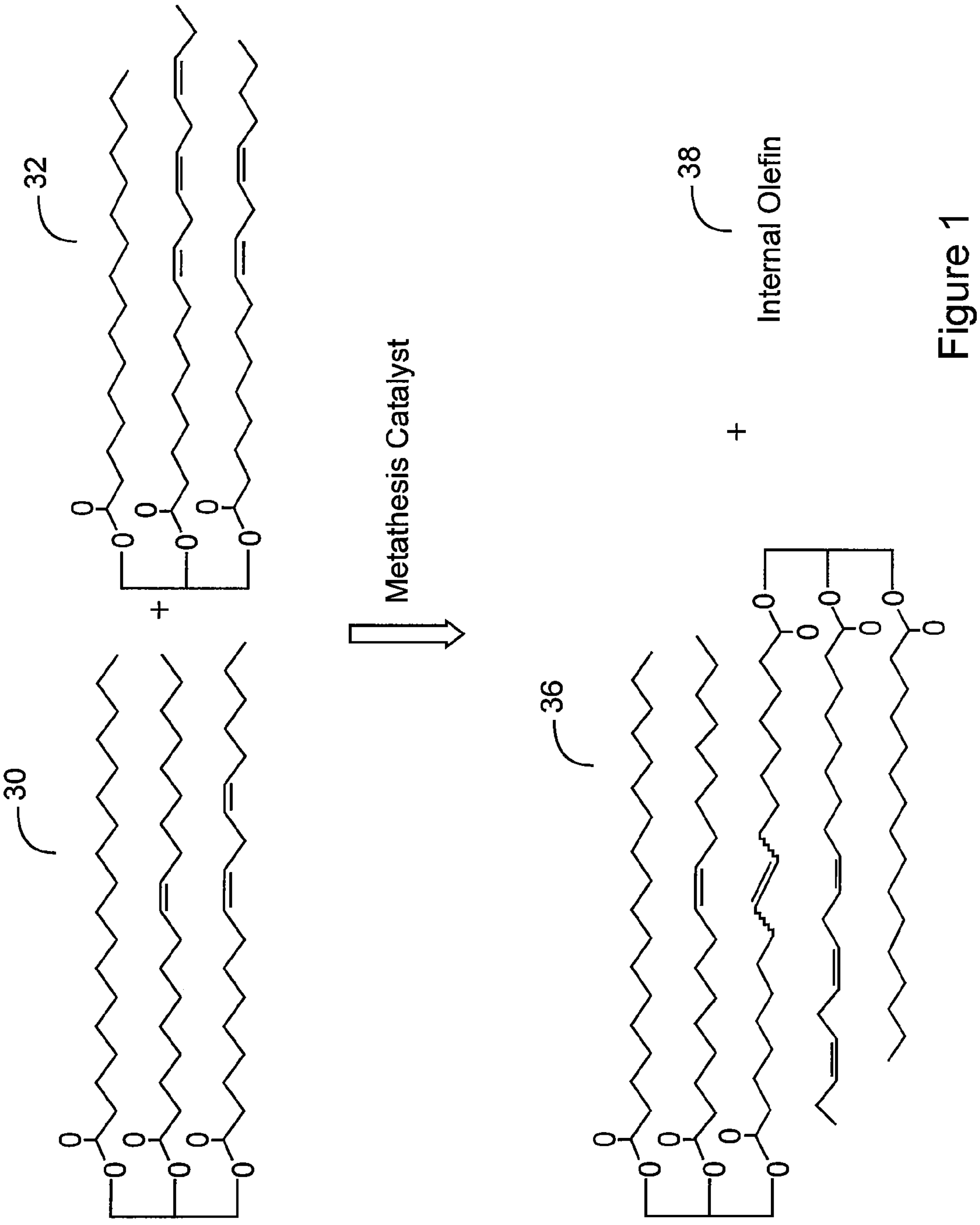
FIG. 1 is an exemplary metathesis reaction scheme.

As used herein, a "fully hydrogenated" refers to a natural oil that has been hydrogenated to achieve an iodine value (IV) of about 5 or less.

As used herein the term "partially hydrogenated" refers to a natural oil that has been hydrogenated to achieve an Iodine Value of about 5 to about 50.

As used herein, the term "natural oil" is intended to mean any oil derived from a plant or animal source, and includes any chemically modified oils from plant or animal sources.

As used herein, the term "relative density" is intended to mean the density, typically measured in g/ml, of the compressed candle or portion of a compressed candle, as the case may be, divided by the density of the individual particles making up the compressed candle or portion. As will be described below, the term "relative density" is one measure of the extent to which the prilled particles have been compressed to eliminate interstitial space therebetween.

As used in the specification and the appended claims, the singular forms "a," "an," and "the" include plural referents unless the context clearly dictates otherwise. Thus, for example, reference to "a substituent" encompasses a single substituent as well as two or more substituents, and the like.

As used in the specification and the appended claims, the terms "for example," "for instance," "such as," or "including" are meant to introduce examples that further clarify more general subject matter. Unless otherwise specified, these examples are provided only as an aid for understanding the applications illustrated in the present disclosure, and are not meant to be limiting in any fashion.

The term "alkyl" as used herein refers to a linear, branched, or cyclic saturated hydrocarbon group typically although not necessarily containing 1 to about 24 carbon atoms, preferably 1 to about 12 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl and the like. Generally, although again not necessarily, alkyl groups herein contain 1 to about 12 carbon atoms. The term "lower alkyl" intends an alkyl group of 1 to 6 carbon atoms, and the specific term "cycloalkyl" intends a cyclic alkyl group, typically having 4 to 8, preferably 5 to 7, carbon atoms. The term "substituted alkyl" refers to alkyl substituted with one or more substituent groups, and the terms "heteroatom-containing alkyl" and "heteroalkyl" refer to alkyl in which at least one carbon atom is replaced with a heteroatom. If not otherwise indicated, the terms "alkyl" and "lower alkyl" include linear, branched, cyclic, unsubstituted, substituted, and/or heteroatom-containing alkyl and lower alkyl, respectively.

The term "alkylene" as used herein refers to a difunctional linear, branched, or cyclic alkyl group, where "alkyl" is as defined above.

The term "alkenyl" as used herein refers to a linear, branched, or cyclic hydrocarbon group of 2 to about 24 carbon atoms containing at least one double bond, such as ethenyl, n-propenyl, isopropenyl, n-butenyl, isobutenyl, octenyl, decenyl, tetradecenyl, hexadecenyl, eicosenyl, tetracosenyl, and the like. Preferred alkenyl groups herein contain 2 to about 12 carbon atoms. The term "lower alkenyl" intends an alkenyl group of 2 to 6 carbon atoms, and the specific term "cycloalkenyl" intends a cyclic alkenyl group, preferably having 5 to 8 carbon atoms. The term "substituted alkenyl" refers to alkenyl substituted with one or more substituent groups, and the terms "heteroatom-containing alkenyl" and "heteroalkenyl" refer to alkenyl in which at least one carbon atom is replaced with a heteroatom. If not otherwise indicated, the terms "alkenyl" and "lower alkenyl" include linear, branched, cyclic, unsubstituted, substituted, and/or heteroatom-containing alkenyl and lower alkenyl, respectively.

The term "alkenylene" as used herein refers to a difunctional linear, branched, or cyclic alkenyl group, where "alkenyl" is as defined above.

The term "alkynyl" as used herein refers to a linear or branched hydrocarbon group of 2 to about 24 carbon atoms containing at least one triple bond, such as ethynyl, n-propynyl, and the like. Preferred alkynyl groups herein contain 2 to about 12 carbon atoms. The term "lower alkynyl" intends an alkynyl group of 2 to 6 carbon atoms. The term "substituted alkynyl" refers to alkynyl substituted with one or more substituent groups, and the terms "heteroatom-containing alkynyl" and "heteroalkynyl" refer to alkynyl in which at least one carbon atom is replaced with a heteroatom. If not otherwise indicated, the terms "alkynyl" and "lower alkynyl" include linear, branched, unsubstituted, substituted, and/or heteroatom-containing alkynyl and lower alkynyl, respectively.

The term "alkynylene" as used herein refers to a difunctional alkynyl group, where "alkynyl" is as defined above.

The term "alkoxy" as used herein intends an alkyl group bound through a single, terminal ether linkage; that is, an "alkoxy" group may be represented as —O-alkyl where alkyl is as defined above. A "lower alkoxy" group intends an alkoxy group containing 1 to 6 carbon atoms. Analogously, "alkenyloxy" and "lower alkenyloxy" respectively refer to an alkenyl and lower alkenyl group bound through a single, terminal ether linkage, and "alkynyloxy" and "lower alkynyloxy" respectively refer to an alkynyl and lower alkynyl group bound through a single, terminal ether linkage.

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Preferred aryl groups contain 5 to 24 carbon atoms, and particularly preferred aryl groups contain 5 to 14 carbon atoms. Exemplary aryl groups contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituents in which at least one carbon atom is replaced with a heteroatom, as will be described in further detail infra.

The term "aryloxy" as used herein refers to an aryl group bound through a single, terminal ether linkage, wherein "aryl" is as defined above. An "aryloxy" group may be represented as —O-aryl where aryl is as defined above. Preferred aryloxy groups contain 5 to 24 carbon atoms, and particularly preferred aryloxy groups contain 5 to 14 carbon atoms. Examples of aryloxy groups include, without limitation, phenoxy, o-halo-phenoxy, m-halo-phenoxy, p-halo-phenoxy, o-methoxy-phenoxy, m-methoxy-phenoxy, p-methoxy-phenoxy, 2,4-dimethoxy-phenoxy, 3,4,5-trimethoxy-phenoxy, and the like.

The term "alkaryl" refers to an aryl group with an alkyl substituent, and the term "aralkyl" refers to an alkyl group with an aryl substituent, wherein "aryl" and "alkyl" are as defined above. Preferred alkaryl and aralkyl groups contain 6 to 24 carbon atoms, and particularly preferred alkaryl and aralkyl groups contain 6 to 16 carbon atoms. Alkaryl groups include, for example, p-methylphenyl, 2,4-dimethylphenyl, p-cyclohexylphenyl, 2,7-dimethylnaphthyl, 7-cyclooctylnaphthyl, 3-ethyl-cyclopenta-1,4-diene, and the like. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like. The terms "alkaryloxy" and "aralkyloxy" refer to substituents of the formula —OR wherein R is alkaryl or aralkyl, respectively, as just defined.

The term "acyl" refers to substituents having the formula —(CO)-alkyl, —(CO)-aryl, or —(CO)-aralkyl, and the term "acyloxy" refers to substituents having the formula —O(CO)-alkyl, —O(CO)-aryl, or —O(CO)-aralkyl, wherein "alkyl," "aryl, and "aralkyl" are as defined above.

The terms "cyclic" and "ring" refer to alicyclic or aromatic groups that may or may not be substituted and/or heteroatom containing, and that may be monocyclic, bicyclic, or polycyclic. The term "alicyclic" is used in the conventional sense to refer to an aliphatic cyclic moiety, as opposed to an aromatic cyclic moiety, and may be monocyclic, bicyclic or polycyclic.

The terms "halo" and "halogen" are used in the conventional sense to refer to a chloro, bromo, fluoro or iodo substituent.

"Hydrocarbyl" refers to univalent hydrocarbyl radicals containing 1 to about 30 carbon atoms, preferably 1 to about 24 carbon atoms, most preferably 1 to about 12 carbon atoms, including linear, branched, cyclic, saturated and unsaturated species, such as alkyl groups, alkenyl groups, aryl groups, and the like. The term "lower hydrocarbyl" intends a hydrocarbyl group of 1 to 6 carbon atoms, preferably 1 to 4 carbon atoms, and the term "hydrocarbylene" intends a divalent hydrocarbyl moiety containing 1 to about 30 carbon atoms, preferably 1 to about 24 carbon atoms, most preferably 1 to about 12 carbon atoms, including linear, branched, cyclic, saturated and unsaturated species. The term "lower hydrocarbylene" intends a hydrocarbylene group of 1 to 6 carbon atoms. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom. Similarly, "substituted hydrocarbylene" refers to hydrocarbylene substituted with one or more substituent groups, and the terms "heteroatom-containing hydrocarbylene" and heterohydrocarbylene" refer to hydrocarbylene in which at least one carbon atom is replaced with a heteroatom. Unless otherwise indicated, the term "hydrocarbyl" and "hydrocarbylene" are to be interpreted as including substituted and/or heteroatom-containing hydrocarbyl and hydrocarbylene moieties, respectively.

The term "heteroatom-containing" as in a "heteroatom-containing hydrocarbyl group" refers to a hydrocarbon molecule or a hydrocarbyl molecular fragment in which one or more carbon atoms is replaced with an atom other than carbon, e.g., nitrogen, oxygen, sulfur, phosphorus or silicon, typically nitrogen, oxygen or sulfur. Similarly, the term "heteroalkyl" refers to an alkyl substituent that is heteroatom-containing, the term "heterocyclic" refers to a cyclic substituent that is heteroatom-containing, the terms "heteroaryl" and "heteroaromatic" respectively refer to "aryl" and "aromatic" substituents that are heteroatom-containing, and the like. It should be noted that a "heterocyclic" group or compound may or may not be aromatic, and further that "heterocycles" may be monocyclic, bicyclic, or polycyclic as described above with respect to the term "aryl." Examples of heteroalkyl groups include alkoxyaryl, alkylsulfanyl-substituted alkyl, N-alkylated amino alkyl, and the like. Examples of heteroaryl substituents include pyrrolyl, pyrrolidinyl, pyridinyl, quinolinyl, indolyl, pyrimidinyl, imidazolyl, 1,2,4-triazolyl, tetrazolyl, etc., and examples of heteroatom-containing alicyclic groups are pyrrolidino, morpholino, piperazino, piperidino, etc.

The term "heterocyclic carbene" refers to a neutral electron donor ligand comprising a carbene molecule, where the carbenic carbon atom is contained within a cyclic structure and where the cyclic structure also contains at least one heteroatom. Examples of heterocylic carbenes include "N-heterocyclic carbenes" wherein the heteroatom is nitrogen and "P-heterocyclic carbenes" wherein the heteroatom is phosphorus.

By "substituted" as in "substituted hydrocarbyl," "substituted alkyl," "substituted aryl," and the like, as alluded to in some of the aforementioned definitions, is meant that in the hydrocarbyl, alkyl, aryl, or other moiety, at least one hydrogen atom bound to a carbon (or other) atom is replaced with one or more non-hydrogen substituents. Examples of such substituents include, without limitation: functional groups referred to herein as "Fn," such as halo, hydroxyl, sulfhydryl, $C_1$-$C_{24}$ alkoxy, $C_2$-$C_{24}$ alkenyloxy, $C_2$-$C_{24}$ alkynyloxy, $C_5$-$C_{24}$ aryloxy, $C_6$-$C_{24}$ aralkyloxy, $C_6$-$C_{24}$ alkaryloxy, acyl (including $C_2$-$C_{24}$ alkylcarbonyl (—CO-alkyl) and $C_6$-$C_{24}$ arylcarbonyl (—CO-aryl)), acyloxy (—O-acyl, including $C_2$-$C_{24}$ alkylcarbonyloxy (—O—CO-alkyl) and $C_6$-$C_{24}$ arylcarbonyloxy (—O—CO-aryl)), $C_2$-$C_{24}$ alkoxycarbonyl (—(CO)—O-alkyl), $C_6$-$C_{24}$ aryloxycarbonyl (—(CO)—O-aryl), halocarbonyl (—CO)—X where X is halo), $C_2$-$C_{24}$ alkylcarbonato (—O—(CO)—O-alkyl), $C_6$-$C_{24}$ arylcarbonato (—O—(CO)—O-aryl), carboxy (—COOH), carboxylato (—$COO^-$), carbamoyl (—(CO)—$NH_2$), mono-($C_1$-$C_{24}$ alkyl)-substituted carbamoyl (—(CO)—NH($C_1$-$C_{24}$ alkyl)), di-($C_1$-$C_{24}$ alkyl)-substituted carbamoyl (—(CO)—N($C_1$-$C_{24}$ alkyl)$_2$), mono-($C_5$-$C_{24}$ aryl)-substituted carbamoyl (—(CO)—NH-aryl), di-($C_5$-$C_{24}$ aryl)-substituted carbamoyl (—(CO)—N($C_5$-$C_{24}$ aryl)$_2$), di-N—($C_1$-$C_{24}$ alkyl), N—($C_5$-$C_{24}$ aryl)-substituted carbamoyl, thiocarbamoyl (—(CS)—$NH_2$), mono-($C_1$-$C_{24}$ alkyl)-substituted thiocarbamoyl (—(CO)—NH($C_1$-$C_{24}$ alkyl)), di-($C_1$-$C_{24}$ alkyl)-substituted thiocarbamoyl (—(CO)—N($C_1$-$C_{24}$ alkyl)$_2$), mono-($C_5$-$C_{24}$ aryl)-substituted thiocarbamoyl (—(CO)—NH-aryl), di-($C_5$-$C_{24}$ aryl)-substituted thiocarbamoyl (—(CO)—N($C_5$-$C_{24}$ aryl)$_2$), di-N—($C_1$-$C_{24}$ alkyl), N—($C_5$-$C_{24}$ aryl)-substituted thiocarbamoyl, carbamido (—NH—(CO)—$NH_2$), cyano (—C≡N), cyanato (—O—C≡N), thiocyanato (—S—C≡N), formyl (—(CO)—H), thioformyl (—(CS)—H), amino (—$NH_2$), mono-($C_1$-$C_{24}$ alkyl)-substituted amino, di-($C_1$-$C_{24}$ alkyl)-substituted amino, mono-($C_5$-$C_{24}$ aryl)-substituted amino, di-($C_5$-$C_{24}$ aryl)-substituted amino, $C_2$-$C_{24}$ alkylamido (—NH—(CO)-alkyl), $C_6$-$C_{24}$ arylamido (—NH—(CO)-aryl), imino (—CR═NH where R=hydrogen, $C_1$-$C_{24}$ alkyl, $C_5$-$C_{24}$ aryl, $C_6$-$C_{24}$ alkaryl, $C_6$-$C_{24}$ aralkyl, etc.), $C_2$-$C_{20}$ alkylimino (—CR═N(alkyl), where R=hydrogen, $C_1$-$C_{24}$ alkyl, $C_5$-$C_{24}$ aryl, $C_6$-$C_{24}$ alkaryl, $C_6$-$C_{24}$ aralkyl, etc.), arylimino (—CR═N(aryl), where R=hydrogen, $C_1$-$C_{20}$ alkyl, $C_5$-$C_{24}$ aryl, $C_6$-$C_{24}$ alkaryl, $C_6$-$C_{24}$ aralkyl, etc.), nitro (—$NO_2$), nitroso (—NO), sulfo (—$SO_2$—OH), sulfonato (—$SO_2$—$O^-$), $C_1$-$C_{24}$ alkylsulfanyl (—S-alkyl; also termed "alkylthio"), $C_5$-$C_{24}$ arylsulfanyl (—S-aryl; also termed "arylthio"), $C_1$-$C_{24}$ alkylsulfinyl (—(SO)-alkyl), $C_5$-$C_{24}$ arylsulfinyl (—(SO)-aryl), $C_1$-$C_{24}$ alkylsulfonyl (—$SO_2$-alkyl), $C_5$-$C_{24}$ arylsulfonyl (—$SO_2$-aryl), boryl (—$BH_2$), borono (—B(OH)$_2$), boronato (—B(OR)$_2$ where R is alkyl or other hydrocarbyl), phosphono (—P(O)(OH)$_2$), phosphonato (—P(O)(O_)$_2$), phosphinato (—P(O)($O^-$)), phospho (—$PO_2$), phosphino (—$PH_2$), silyl (—$SiR_3$ wherein R is hydrogen or hydrocarbyl), and silyloxy (—O-silyl); and the hydrocarbyl moieties $C_1$-$C_{24}$ alkyl (preferably $C_1$-$C_{12}$ alkyl, more preferably $C_1$-$C_6$ alkyl), $C_2$-$C_{24}$ alkenyl (preferably $C_2$-$C_{12}$ alkenyl, more preferably $C_2$-$C_6$ alkenyl), $C_2$-$C_{24}$ alkynyl (preferably $C_2$-$C_{12}$ alkynyl, more preferably $C_2$-$C_6$ alkynyl), $C_5$-$C_{24}$ aryl (preferably $C_5$-$C_{14}$ aryl), $C_6$-$C_{24}$ alkaryl (preferably $C_6$-$C_{16}$ alkaryl), and $C_6$-$C_{24}$ aralkyl (preferably $C_6$-$C_{16}$ aralkyl).

In addition, the aforementioned functional groups may, if a particular group permits, be further substituted with one or more additional functional groups or with one or more hydrocarbyl moieties such as those specifically enumerated above. Analogously, the above-mentioned hydrocarbyl moieties may be further substituted with one or more functional groups or additional hydrocarbyl moieties such as those specifically enumerated.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present.

In the molecular structures herein, the use of bold and dashed lines to denote particular conformation of groups follows the IUPAC convention. A bond indicated by a broken line indicates that the group in question is below the general plane of the molecule as drawn, and a bond indicated by a bold line indicates that the group at the position in question is above the general plane of the molecule as drawn.

Hydrogenated Natural Oil-Based Wax

As disclosed here, hybrid wax compositions comprise a hydrogenated natural oil-based wax. Natural oils include, for example, vegetable oils and animal fats. Representative examples of vegetable oils include canola oil, jatropha oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, castor oil, and the like. Of these, soybean oil, canola oil, rapeseed, palm, and jatropha are preferred. Soybean oil is most preferred. Representative examples of useful animal fats include lard, tallow, chicken fat (yellow grease), and fish oil. Natural oils derived from algae also may be used.

In accordance with the invention, the natural oil is hydrogenated to modify the physical properties of the oil such that it forms a wax. Representative techniques for hydrogenating natural oils are known in the art. For example, hydrogenation of certain vegetable oils is reported in Chapter 11 of Bailey, A. E.; Baileys Industrial Oil and Fat Products; Volume 2: Edible Oil & Fat Products: Oils and Oil Seeds; 5th Edition (1996) edited by Y. H. Hui (ISBN 0-471-59426-1).

The hydrogenated natural oil-based waxes may be fully hydrogenated or partially hydrogenated. In an exemplary embodiment, the hydrogenated natural oil-based wax is fully hydrogenated, refined, bleached, and deodorized soybean oil (i.e., fully hydrogenated RBD soybean oil). Suitable fully hydrogenated RBD soybean oil can be obtained commercially from Cargill, Incorporated. (Minneapolis, Minn.).

In some embodiments, the hybrid wax may comprise a mixture of two or more natural oil-based waxes. For example, in some embodiments, the hydrogenated natural oil may comprise a mixture of fully hydrogenated soybean oil and partially hydrogenated soybean oil.

In many embodiments, the hydrogenated natural oil-based wax is present in the hybrid wax in an amount ranging from about 50% to about 99% wax weight of the hybrid wax composition. By "wax weight" it is meant that the weight percentage is calculated on the basis of the wax component only, and is exclusive of additives such as fragrance, colorants, anti-oxidants, UV stabilizers, oxidizers, and the like. Preferably, the hydrogenated natural oil-based wax is present in the hybrid wax in an amount ranging from about 50% to about 65% wax weight.

Paraffin Wax

The candle wax compositions described here include a paraffin wax. The paraffin wax is chosen to provide the wax composition of the invention with a desirable balance of properties. The paraffin wax is present in the composition at less than about 50% wax weight of the wax composition.

Generally, paraffin wax comprises primarily straight chain hydrocarbons having carbon chain lengths that range from about C20 to about C40, with the remainder of the wax comprising isoalkanes and cycloalkanes. Useful paraffin waxes are characterized by having a relatively narrow distribution of hydrocarbon carbon chain lengths. Preferably, the paraffin waxes useful in the hybrid wax compositions described here are characterized by having a relatively narrow distribution of predominantly straight chain hydrocarbons. In many embodiments, the paraffin wax has a hydrocarbon chain length distribution that is centered (i.e., has a maximum content) at about C25 to C29. That is, the maximum weight percentage of hydrocarbon in the paraffin wax has a carbon chain length that ranges from C25 to C29.

Figure 16:
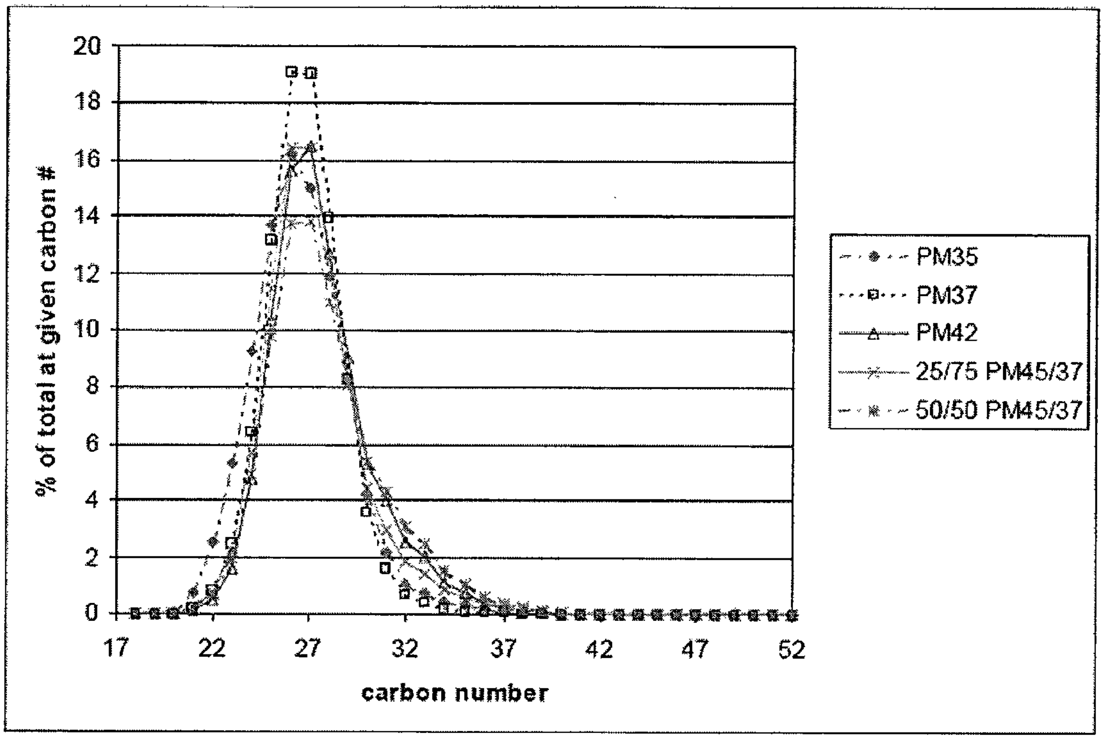
FIG. 16 shows carbon distribution profile for various paraffin waxes and paraffin wax blends.

For example, in many embodiments, about 52% or greater of the hydrocarbons in the paraffin wax have carbon chain lengths that range from C25 to C29. In other embodiments, about 65% or greater of the hydrocarbons in the paraffin wax have carbon chain lengths ranging from about C25 to C29. In exemplary embodiments, about 70% or greater of the hydrocarbons in the paraffin wax have chain lengths ranging from about C25 to C29. In some embodiments, some of the paraffin wax has a hydrocarbon carbon chain length distribution that is centered at C25 to C27. For example, FIG. 16 shows a curve representing the distribution of the carbon lengths of the paraffin, where the peak is centered at about C25 to about C27. In another example, the some of the paraffin wax has a hydrocarbon carbon chain length distribution that is centered at C26 to C28.

Useful paraffin waxes also are characterized by having two distinct endotherms of melting as shown by differential scanning calorimetry (DSC); a dominant endotherm in the temperature range 46-62° C. and a minor endotherm of melting in the range 25-45° C., preferably in the range of 30-45° C. This minor endotherm also is present in the blended hybrid wax. It is believed that the lower melting endotherms may be the result of a percentage of branched hydrocarbon species being present in the paraffin wax, and the melting range is influenced by their molecular weight and specific branching structure. In some embodiments, about 15% or less of the hydrocarbons in the paraffin wax is branched. In other embodiments, about 10% or less of the hydrocarbons in the paraffin wax is branched. For example, about 7% to about 10% of the hydrocarbons in the paraffin wax may be branched.

The lower temperature melting peak is considered advantageous for improving the bulk strength of compressed prills of the hybrid wax compositions, particularly at relative densities less than 0.95. The desired fraction of the minor endotherm melting below 45° C. is about 10% of the hybrid wax. A significantly higher fraction of paraffin wax melting below 45° C. may impact the ability to pass the slump test of the compressed candle made from the hybrid wax formulations.

The melting point of the paraffin wax typically ranges from about 130° F. to about 140° F., more typically ranging from about 130° F. to 135° F., and most typically ranging from about 132° F. to 134° F. Melting point can be measured, for example, according to ASTM D87. Unless otherwise noted, the melting points referred to herein and the appended claims are determined by ASTM D87 (also referred to as the Mettler drop point).

One suitable paraffin wax is commercially available under the trade designation "PACEMAKER 37 (PM 37)" (from Citgo Petroleum Corp., Tulsa Okla.). This paraffin wax is characterized in having a melting point of about 132° F. to about 134° F. (55.55 to 56.66° C.); an oil content of about 0.50 weight % or less; a needle penetration @77° F. (25° C.) of about 14; @100° F. (37.77° C.) of about 43; and @110° F. (43.33° C.) of about 96. Another suitable paraffin wax is commercially available under the trade designation "PACEMAKER 35" (from Citgo). This paraffin wax is characterized in having a melting point of about 130° F. to about 132° F. (54.44 to 55.55° C.); an oil content of about 0.50 weight % or less; a needle penetration @77° F. (25° C.) of about 14; @100° F. (37.33° C.) of about 57; and @110° F. of about 98. Yet another paraffin wax that may be suitable is commercially available under the trade designation "PACEMAKER 42" (PM 42) (from Citgo). This paraffin wax is characterized in having a melting point of about 134° F. to about 139° F. (56.66-59.44° C.); an oil content of about 0.50 weight % or less; a needle penetration @77° F. (25° C.) of about 13; @100° F. (37.77° C.) of about 21; and @110° F. (37.77° C.) of about 58.

In many embodiments, the paraffin wax is present in the wax composition of the invention in a minor amount, for example, less than about 50% wax weight of the hybrid wax composition. In more typical embodiments, the paraffin wax is present in an amount ranging from about 20% to about 49% wax weight of the hybrid wax composition. In a preferred embodiment, the paraffin wax is present in an amount ranging from about 40% to about 49% wax weight, for example 45% wax weight.

Fat Bloom Inhibitor

Fat bloom is an undersireable phenomena that occurs frequently in wax articles that contain high levels natural oils (i.e. greater than 50% wax weight). It typically occurs in one of two modes:

1) A white film appears on the surface of the wax article over time. This can occur at room temperature as the article ages. It can also be accelerated by thermal cycling (e.g. when exposed to hot storage conditions or when cycled between hot and cold conditions).
2) Growths, which look like cauliflower, form on the surface of a compressed article, typically after burning it and then allowing the melt pool to re-solidify.

As used herein, the term "fat bloom resistant" is used to indicate waxes that do not exhibit these modes of fat bloom under normal conditions for a reasonable time.

The hybrid wax compositions may include a fat bloom inhibitor. The fat bloom inhibitor functions to reduce or prevent polymorphic behaviors that may lead to visual defects in the form of haze and surface whiteness. When the wax article is a compression candle, polymorphic behavior may lead to cauliflower type crystal formation that can rise out of the melt pool of the compression candle (e.g. after burning the candle and then extinguishing the flame and allowing the melt pool to re-solidify). Representative examples of fat bloom inhibitors that may be used to retard polymorphic transformation in natural oil-based wax candles include monoglycerides, diglycerides, sorbitan esters, polyglycerol polyricinoleate, lecithin, high-molecular weight paraffins (such as polyalphaolefins and microcrystalline waxes), paraffin waxes at high levels of incorporation, and other surface-active ingredients. The fat bloom inhibitor may be added to the wax composition in an amount up to about 35% weight.

Hydrogenated Metathesized Natural Oil-Based Wax

In some embodiments, the wax compositions include a hydrogenated metathesized natural oil-based wax. The hydrogenated metathesized natural oil-based wax comes from a renewable resource (a natural oil), is naturally fat bloom resistant and functions to control fat bloom in the hybrid wax. Hydrogenated metathesized natural oil-based wax is typically fat bloom resistant by itself, allowing it to be used as a bulk natural oil-based ingredient in formulations. In many embodiments, it is used at lower levels to control the fat bloom of other natural oil-based ingredients, such as hydrogenated soybean oil.

A metathesized natural oil-based wax refers to the product obtained when one or more unsaturated polyol ester ingredient(s) are subjected to a metathesis reaction. Metathesis is a catalytic reaction that involves the interchange of alkylidene units among compounds containing one or more double bonds (i.e., olefinic compounds) via the formation and cleavage of the carbon-carbon double bonds. Metathesis may occur between two of the same molecules (often referred to as self-metathesis) and/or it may occur between two different molecules (often referred to as cross-metathesis). Self-metathesis may be represented schematically as shown in Equation I.

$$R^1—CH=CH—R^2+R^1—CH=CH—R^2 \leftrightarrow R^1—CH=CH—R^1+R^2—CH=CH—R^2 \quad (I)$$

where $R^1$ and $R^2$ are organic groups.

Cross-metathesis may be represented schematically as shown in Equation II.

$$R^1—CH=CH—R^2+R^3—CH=CH—R^4 \leftrightarrow R^1—CH=CH—R^3+R^1—CH=CH—R^4+R^2—CH=CH—R^3+R^2—CH=CH—R^4+R^1—CH=CH—R^1+R^2—CH=CH—R^2+R^3—CH=CH—R^3+R^4—CH=CH—R^4 \quad (II)$$

where $R^1$, $R^2$, $R^3$, and $R^4$ are organic groups.

When the unsaturated polyol ester comprises molecules such that there is more than one carbon-carbon double bond in the polyol ester (i.e., a polyunsaturated polyol ester), self-metathesis results in oligomerization of the unsaturated polyol ester. The self-metathesis reaction results in the formation of metathesis dimers, metathesis trimers, and metathesis tetramers. Higher order metathesis oligomers, such as metathesis pentamers and metathesis hexamers, also may be formed by continued self-metathesis.

A metathesized natural oil can be prepared from one or more unsaturated polyol esters. As used herein, the term "unsaturated polyol ester" refers to a compound having two or more hydroxyl groups wherein at least one of the hydroxyl groups has been esterified to a fatty acid chain and wherein the resulting ester has an organic group including at least one carbon-carbon double bond. In many embodiments, the unsaturated polyol ester can be represented by the general structure (I):

(I)

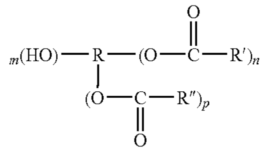

where $n \geq 1$;
$p \geq 0$;
$p \geq 0$;

(n+m+p)≥2;

R is an organic group;

R' is an organic group having at least one carbon-carbon double bond; and

R" is a saturated organic group.

In many embodiments of the invention, the unsaturated polyol ester is an unsaturated polyol ester of glycerol. Unsaturated polyol esters of glycerol have the general structure (II):

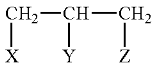

(II)

where —X, —Y, and —Z are independently selected from the group consisting of:

—OH; —(O—C(═O)—R'); and —(O—C(═O)—R");

where —R' is an organic group having at least one carbon-carbon double bond and —R" is a saturated organic group.

In structure (II), at least one of —X, —Y, or —Z is —(O—C(═O)—R').

In some embodiments, R' is a straight or branched chain hydrocarbon having about 50 or less carbon atoms (e.g., about 36 or less carbon atoms or about 26 or less carbon atoms) and at least one carbon-carbon double bond in its chain. In some embodiments, R' is a straight or branched chain hydrocarbon having about 6 carbon atoms or greater (e.g., about 10 carbon atoms or greater or about 12 carbon atoms or greater) and at least one carbon-carbon double bond in its chain. In some embodiments, R' may have two or more carbon-carbon double bonds in its chain. In other embodiments, R' may have three or more double bonds in its chain. In exemplary embodiments, R' has 17 carbon atoms and 1 to 3 carbon-carbon double bonds in its chain. Representative examples of R' include:

$—(CH_2)_7CH{=}CH—(CH_2)_7—CH_3$;

$—(CH_2)_7CH{=}CH—CH_2—CH{=}CH—(CH_2)_4—CH_3$; and $—(CH_2)_7CH{=}CH—CH_2—CH{=}CH—CH_2—CH{=}CH—CH_2—CH_3$.

In some embodiments, R" is a saturated straight or branched chain hydrocarbon having about 50 or less carbon atoms (e.g., about 36 or less carbon atoms or about 26 or less carbon atoms). In some embodiments, R" is a saturated straight or branched chain hydrocarbon having about 6 carbon atoms or greater (e.g., about 10 carbon atoms or greater or about 12 carbon atoms or greater. In exemplary embodiments, R" has 15 carbon atoms or 17 carbon atoms.

Sources of unsaturated polyol esters of glycerol include synthesized oils, natural oils (e.g., vegetable oils, algae oils, and animal fats), combinations of these, and the like. Representative examples of vegetable oils include canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, castor oil, jatropha oil, tall oil, combinations of these, and the like. Representative examples of animal fats include lard, tallow, chicken fat, yellow grease, fish oil, combinations of these, and the like.

In the preferred embodiment, the vegetable oil is soybean oil, for example, refined, bleached, and deodorized soybean oil (i.e., RBD soybean oil). Soybean oil is an unsaturated polyol ester of glycerol that typically comprises about 95% weight or greater (e.g., 99% weight or greater) triglycerides of fatty acids. Major fatty acids in the polyol esters of soybean oil include saturated fatty acids, for example, palmitic acid (hexadecanoic acid) and stearic acid (octadecanoic acid), and unsaturated fatty acids, for example, oleic acid (9-octadecenoic acid), linoleic acid (9,12-octadecadienoic acid), and linolenic acid (9,12,15-octadecatrienoic acid). Soybean oil is a highly unsaturated vegetable oil with many of the triglyceride molecules having at least two unsaturated fatty acids (i.e., a polyunsaturated triglyceride).

In exemplary embodiments, an unsaturated polyol ester is self-metathesized in the presence of a metathesis catalyst to form a metathesized composition. In many embodiments, the metathesized composition comprises one or more of: metathesis monomers, metathesis dimers, metathesis trimers, metathesis tetramers, metathesis pentamers, and higher order metathesis oligomers (e.g., metathesis hexamers).

A metathesis dimer refers to a compound formed when two unsaturated polyol ester molecules are covalently bonded to one another by a self-metathesis reaction. In many embodiments, the molecular weight of the metathesis dimer is greater than the molecular weight of the individual unsaturated polyol ester molecules from which the dimer is formed. A metathesis trimer refers to a compound formed when three unsaturated polyol ester molecules are covalently bonded together by metathesis reactions. In many embodiments, a metathesis trimer is formed by the cross-metathesis of a metathesis dimer with an unsaturated polyol ester. A metathesis tetramer refers to a compound formed when four unsaturated polyol ester molecules are covalently bonded together by metathesis reactions. In many embodiments, a metathesis tetramer is formed by the cross-metathesis of a metathesis trimer with an unsaturated polyol ester. Metathesis tetramers also may be formed, for example, by the cross-metathesis of two metathesis dimers. Higher order metathesis products also may be formed. For example, metathesis pentamers and metathesis hexamers also may be formed.

Figure 1A:
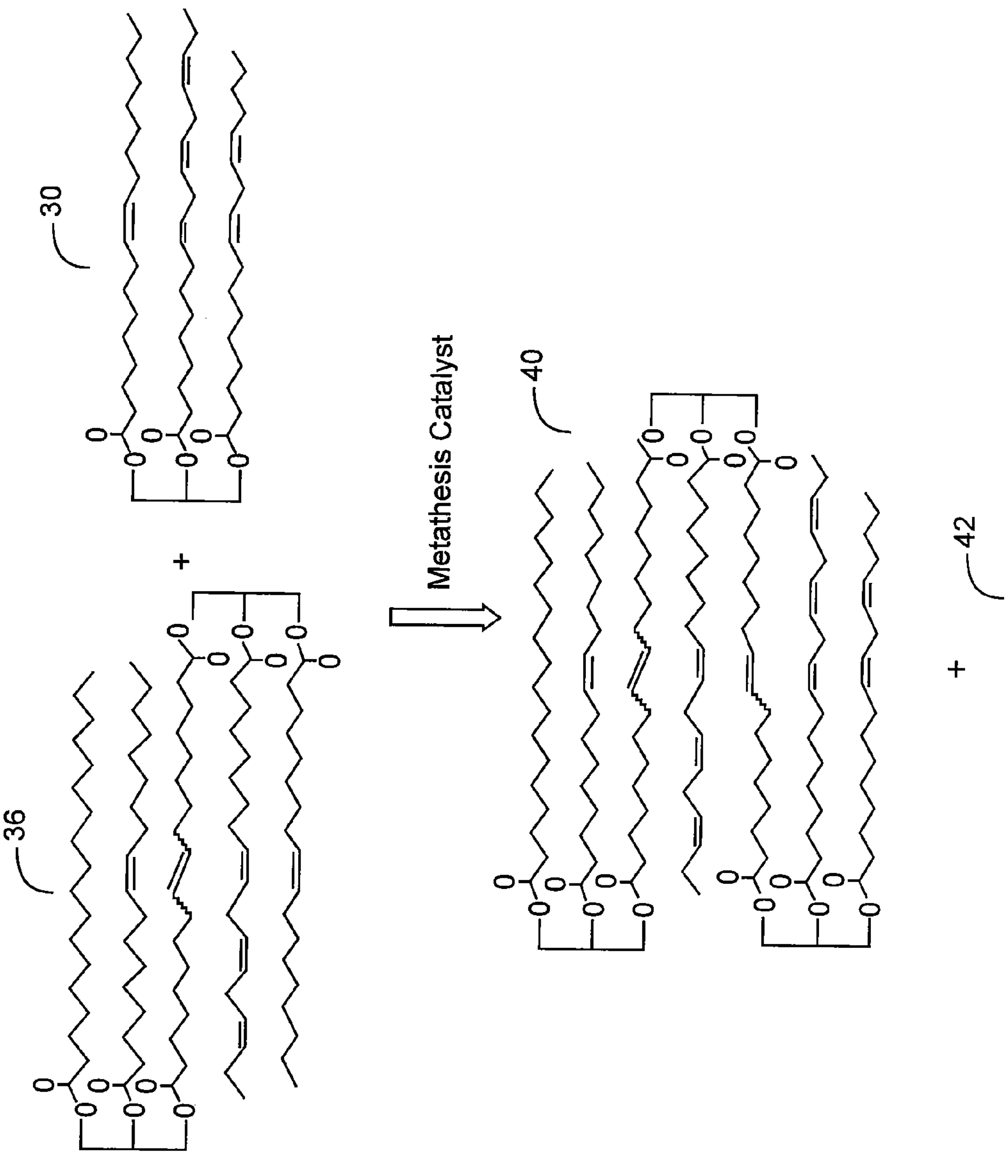
FIG. 1A is an exemplary metathesis reaction scheme.
Figure 1B:
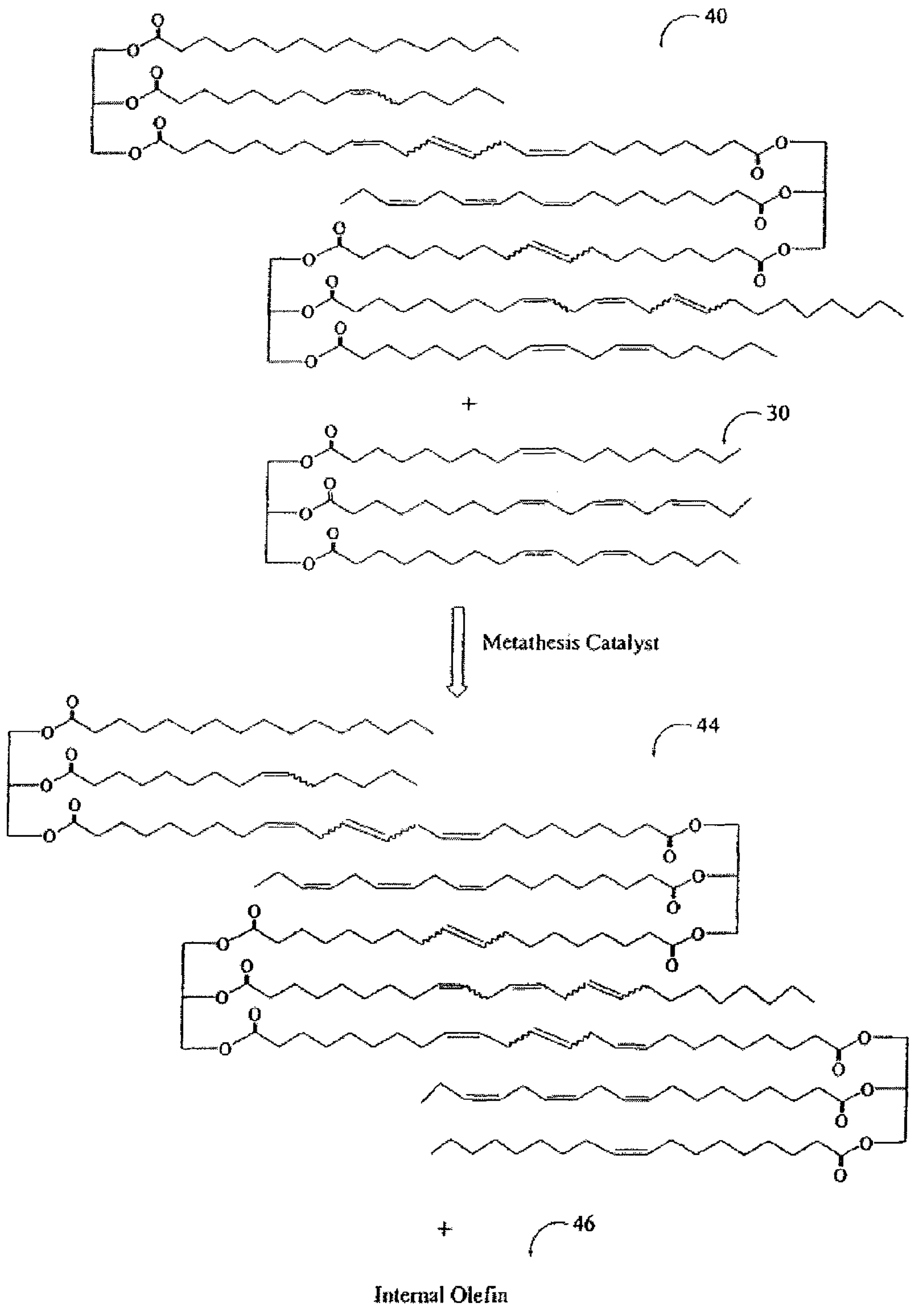
FIG. 1B is an exemplary metathesis reaction scheme.

An exemplary metathesis reaction scheme is shown in FIGS. 1-1B. As shown in FIG. 1, triglyceride 30 and triglyceride 32 are self metathesized in the presence of a metathesis catalyst 34 to form metathesis dimer 36 and internal olefin 38. As shown in FIG. 1A, metathesis dimer 36 may further react with another triglyceride molecule 30 to form metathesis trimer 40 and internal olefin 42. As shown in FIG. 1B, metathesis trimer 40 may further react with another triglyceride molecule 30 to form metathesis tetramer 44 and internal olefin 46. In this way, the self-metathesis results in the formation of a distribution of metathesis monomers, metathesis dimers, metathesis trimers, metathesis tetramers, and higher order metathesis oligomers. Also typically present are metathesis monomers, which may comprise unreacted triglyceride, or triglyceride that has reacted in the metathesis reaction but has not formed an oligomer.

Figure 1C:
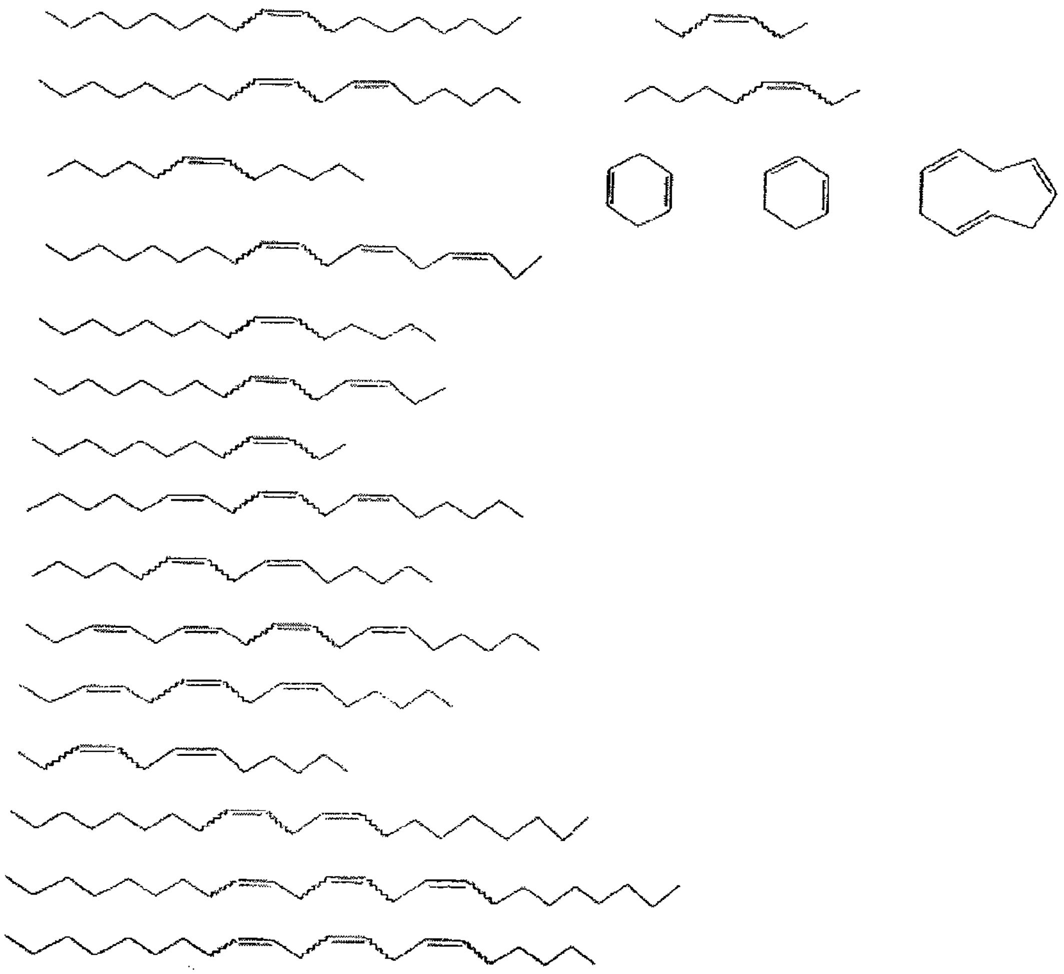
FIG. 1C displays certain internal and cyclic olefins that may be by products of the metathesis reactions of FIGS. 1-1B.

The self-metathesis reaction also results in the formation of internal olefin compounds that may be linear or cyclic. FIG. 1C shows representative examples of certain linear and cyclic internal olefins 38, 42, 46 that may be formed during a self-metathesis reaction. If the metathesized polyol ester is hydrogenated, the linear and cyclic olefins would typically be converted to the corresponding saturated linear and cyclic hydrocarbons. The linear/cyclic olefins and saturated linear/cyclic hydrocarbons may remain in the metathesized polyol ester or they may be removed or partially removed from the metathesized polyol ester using known stripping techniques.

FIG. 1 provides merely exemplary embodiments of metathesis reaction schemes and compositions that may result therefrom.

The relative amounts of monomers, dimers, trimers, tetramers, pentamers, and higher unit oligomers may be determined by chemical analysis of the metathesized polyol ester including, for example, by liquid chromatography, specifically gel permeation chromatography (GPC). For example, the relative amount of monomers, dimers, trimers, tetramers and higher unit oligomers may be characterized, for example, in terms of "area %" or weight %. That is, an area percentage of a GPC chromatograph can be correlated to weight percentage.

In some embodiments, the metathesized unsaturated polyol ester comprises at least about 30 area % or weight % tetramers and/or other higher unit oligomers or at least about 40 area % or weight % tetramers and/or other higher unit oligomers. In some embodiments, the metathesized unsaturated polyol ester comprises no more than about 60 area % or weight % tetramers and/or other higher unit oligomers or no more than about 50 area % or weight % tetramers and/or other higher unit oligomers. In other embodiments, the metathesized unsaturated polyol ester comprises no more than about 1 area % or weight % tetramers and/or other higher unit oligomers. In some embodiments, the metathesized unsaturated polyol ester comprises at least about 5 area % or weight % dimers or at least about 15 area % or weight % dimers. In some embodiments, the metathesized unsaturated polyol ester comprises no more than about 25 area % or weight % dimers. In some of these embodiments, the metathesized unsaturated polyol ester comprises no more than about 20 area % or weight % dimers or no more than about 10 area % or weight % dimers. In some embodiments, the metathesized unsaturated polyol ester comprises at least 1 area % or weight % trimers. In some of these embodiments, the metathesized unsaturated polyol ester comprises at least about 10 area % or weight % trimers. In some embodiments, the metathesized unsaturated polyol ester comprises no more than about 20 area % or weight % trimers or no more than about 10 area % or weight % trimers. According to some of these embodiments, the metathesized unsaturated polyol ester comprises no more than 1 area % or weight % timers. However, in some embodiments, dimmers, trimers, tetramers, pentamers, and higher unit oligomers may be present at greater levels.

In some embodiments, the unsaturated polyol ester is partially hydrogenated before being metathesized. For example, the soybean oil is partially hydrogenated to achieve an iodine value (IV) of about 120 or less before subjecting the partially hydrogenated soybean oil to metathesis. In some embodiments, the hydrogenated metathesized polyol ester has an iodine value (IV) of about 100 or less, for example, about 90 or less, about 80 or less, about 70 or less, about 60 or less, about 50 or less, about 40 or less, about 30 or less, about 20 or less, about 10 or less or about 5 or less.

The self-metathesis of unsaturated polyol esters is typically conducted in the presence of a catalytically effective amount of a metathesis catalyst. The term "metathesis catalyst" includes any catalyst or catalyst system that catalyzes a metathesis reaction. Any known or future-developed metathesis catalyst may be used, alone or in combination with one or more additional catalysts. Exemplary metathesis catalysts include metal carbene catalysts based upon transition metals, for example, ruthenium, molybdenum, osmium, chromium, rhenium, and tungsten. The olefin metathesis catalyst for carrying out the cross-metathesis reactions of the disclosure is preferably a Group 8 transition metal complex having the structure of formula (Ill)

(III)

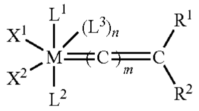

in which the various substituents are as follows.

M is a Group 8 transition metal;

$L^1$, $L^2$ and $L^3$ are neutral electron donor ligands;

n is 0 or 1, such that $L^3$ may or may not be present;

m is 0, 1, or 2;

$X^1$ and $X^2$ are anionic ligands; and $R^1$ and $R^2$ are independently selected from hydrogen, hydrocarbyl, substituted hydrocarbyl, heteroatom-containing hydrocarbyl, substituted heteroatom-containing hydrocarbyl, and functional groups, wherein any two or more of $X^1$, $X^2$, $L^1$, $L^2$, $L^3$, $R^1$, and $R^2$ can be taken together to form a cyclic group, and further wherein any one or more of $X^1$, $X^2$, $L^1$, $L^2$, $L^3$, $R^1$, and $R^2$ may be attached to a support.

Preferred catalysts contain Ru or Os as the Group 8 transition metal, with Ru particularly preferred.

Numerous embodiments of the catalysts useful in the reactions of the disclosure are described in more detail infra. For the sake of convenience, the catalysts are described in groups, but it should be emphasized that these groups are not meant to be limiting in any way. That is, any of the catalysts useful in the disclosure may fit the description of more than one of the groups described herein.

A first group of catalysts, then, are commonly referred to as $1^{st}$ Generation Grubbs-type catalysts, and have the structure of formula (III). For the first group of catalysts, M and m are as described above, and n, $X^1$, $X^2$, $L^1$, $L^2$, $L^3$, $R^1$, and $R^2$ are described as follows.

For the first group of catalysts, n is 0, and $L^1$ and $L^2$ are independently selected from phosphine, sulfonated phosphine, phosphite, phosphinite, phosphonite, arsine, stibine, ether, amine, amide, imine, sulfoxide, carboxyl, nitrosyl, pyridine, substituted pyridine, imidazole, substituted imidazole, pyrazine, and thioether. Exemplary ligands are trisubstituted phosphines.

$X^1$ and $X^2$ are anionic ligands, and may be the same or different, or are linked together to form a cyclic group, typically although not necessarily a five- to eight-membered ring. In preferred embodiments, $X^1$ and $X^2$ are each independently hydrogen, halide, or one of the following groups: $C_1$-$C_{20}$ alkyl, $C_5$-$C_{24}$ aryl, $C_1$-$C_{20}$ alkoxy, $C_5$-$C_{24}$ aryloxy, $C_2$-$C_{20}$ alkoxycarbonyl, $C_6$-$C_{24}$ aryloxycarbonyl, $C_2$-$C_{24}$ acyl, $C_2$-$C_{24}$ acyloxy, $C_1$-$C_{20}$ alkylsulfonato, $C_5$-$C_{24}$ arylsulfonato, $C_1$-$C_{20}$ alkylsulfanyl, $C_5$-$C_{24}$ arylsulfanyl, $C_1$-$C_{20}$ alkylsulfinyl, or $C_5$-$C_{24}$ arylsulfinyl. Optionally, $X^1$ and $X^2$ may be substituted with one or more moieties selected from $C_1$-$C_{12}$ alkyl, $C_1$-$C_{12}$ alkoxy, $C_5$-$C_{24}$ aryl, and halide, which may, in turn, with the exception of halide, be further substituted with one or more groups selected from halide, $C_1$-$C_6$ alkyl, $C_1$-$C_6$ alkoxy, and phenyl. In more preferred embodiments, $X^1$ and $X^2$ are halide, benzoate, $C_2$-$C_6$ acyl, $C_2$-$C_6$ alkoxycarbonyl, $C_1$-$C_6$ alkyl, phenoxy, $C_1$-$C_6$ alkoxy, $C_1$-$C_6$ alkylsulfanyl, aryl, or $C_1$-$C_6$ alkylsulfonyl. In even more preferred embodiments, $X^1$ and $X^2$ are each halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, or trifluoromethane-sulfonate. In the most preferred embodiments, $X^1$ and $X^2$ are each chloride.

$R^1$ and $R^2$ are independently selected from hydrogen, hydrocarbyl (e.g., $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), substituted hydrocarbyl (e.g., substituted $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), heteroatom-containing hydrocarbyl (e.g., heteroatom-containing $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), and substituted heteroatom-containing hydrocarbyl (e.g., substituted heteroatom-containing $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), and functional groups. $R^1$ and $R^2$ may also be linked to form a cyclic group, which may be aliphatic or aromatic, and may contain substituents and/or heteroatoms. Generally, such a cyclic group will contain 4 to 12, preferably 5, 6, 7, or 8 ring atoms.

In preferred catalysts, $R^1$ is hydrogen and $R^2$ is selected from $C_1$-$C_{20}$ alkyl, $C_2$-$C_{20}$ alkenyl, and $C_5$-$C_{24}$ aryl, more preferably $C_1$-$C_6$ alkyl, $C_2$-$C_6$ alkenyl, and $C_5$-$C_{14}$ aryl. Still more preferably, $R^2$ is phenyl, vinyl, methyl, isopropyl, or t-butyl, optionally substituted with one or more moieties selected from $C_1$-$C_6$ alkyl, $C_1$-$C_6$ alkoxy, phenyl, and a functional group Fn as defined earlier herein. Most preferably, $R^2$ is phenyl or vinyl substituted with one or more moieties selected from methyl, ethyl, chloro, bromo, iodo, fluoro, nitro, dimethylamino, methyl, methoxy, and phenyl. Optimally, $R^2$ is phenyl or $—C{=}C(CH_3)_2$.

Any two or more (typically two, three, or four) of $X^1$, $X^2$, $L^1$, $L^2$, $L^3$, $R^1$, and $R^2$ can be taken together to form a cyclic group, as disclosed, for example, in U.S. Pat. No. 5,312,940 to Grubbs et al. When any of $X^1$, $X^2$, $L^1$, $L^2$, $L^3$, $R^1$, and $R^2$ are linked to form cyclic groups, those cyclic groups may contain 4 to 12, preferably 4, 5, 6, 7 or 8 atoms, or may comprise two or three of such rings, which may be either fused or linked. The cyclic groups may be aliphatic or aromatic, and may be heteroatom-containing and/or substituted. The cyclic group may, in some cases, form a bidentate ligand or a tridentate ligand. Examples of bidentate ligands include, but are not limited to, bisphosphines, dialkoxides, alkyldiketonates, and aryldiketonates.

A second group of catalysts, commonly referred to as $2^{nd}$ Generation Grubbs-type catalysts, have the structure of formula (III), wherein $L^1$ is a carbene ligand having the structure of formula (IV)

(IV)

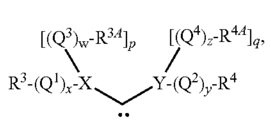

such that the complex may have the structure of formula (V)

(V)

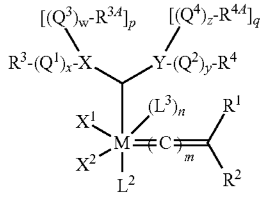

wherein M, m, n, $X^1$, $X^2$, $L^2$, $L^3$, $R^1$, and $R^2$ are as defined for the first group of catalysts, and the remaining substituents are as follows.

X and Y are heteroatoms typically selected from N, O, S, and P. Since O and S are divalent, p is necessarily zero when X is O or S, and q is necessarily zero when Y is O or S. However, when X is N or P, then p is 1, and when Y is N or P, then q is 1. In a preferred embodiment, both X and Y are N.

$Q^1$, $Q^2$, $Q^3$, and $Q^4$ are linkers, e.g., hydrocarbylene (including substituted hydrocarbylene, heteroatom-containing hydrocarbylene, and substituted heteroatom-containing hydrocarbylene, such as substituted and/or heteroatom-containing alkylene) or —(CO)—, and w, x, y, and z are independently zero or 1, meaning that each linker is optional. Preferably, w, x, y, and z are all zero. Further, two or more substituents on adjacent atoms within $Q^1$, $Q^2$, $Q^3$, and $Q^4$ may be linked to form an additional cyclic group.

$R^3$, $R^{3A}$, $R^4$, and $R^{4A}$ are independently selected from hydrogen, hydrocarbyl, substituted hydrocarbyl, heteroatom-containing hydrocarbyl, and substituted heteroatom-containing hydrocarbyl.

In addition, any two or more of $X^1$, $X^2$, $L^1$, $L^2$, $L^3$, $R^1$, $R^2$, $R^3$, $R^{3A}$, $R^4$, and $R^{4A}$ can be taken together to form a cyclic group, and any one or more of $X^1$, $X^2$, $L^1$, $L^2$, $L^3$, $R^1$, $R^2$, $R^3$, $R^{3A}$, $R^4$, and $R^{4A}$ may be attached to a support.

Preferably, $R^{3A}$ and $R^{4A}$ are linked to form a cyclic group so that the carbene ligand is an heterocyclic carbene and preferably an N-heterocyclic carbene, such as the N-heterocylic carbene having the structure of formula (VI)

(VI)

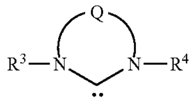

where $R^3$ and $R^4$ are defined above, with preferably at least one of $R^3$ and $R^4$, and more preferably both $R^3$ and $R^4$, being alicyclic or aromatic of one to about five rings, and optionally containing one or more heteroatoms and/or substituents. Q is a linker, typically a hydrocarbylene linker, including substituted hydrocarbylene, heteroatom-containing hydrocarbylene, and substituted heteroatom-containing hydrocarbylene linkers, wherein two or more substituents on adjacent atoms within Q may also be linked to form an additional cyclic structure, which may be similarly substituted to provide a fused polycyclic structure of two to about five cyclic groups. Q is often, although again not necessarily, a two-atom linkage or a three-atom linkage.

Examples of N-heterocyclic carbene ligands suitable as $L^1$ thus include, but are not limited to, the following:

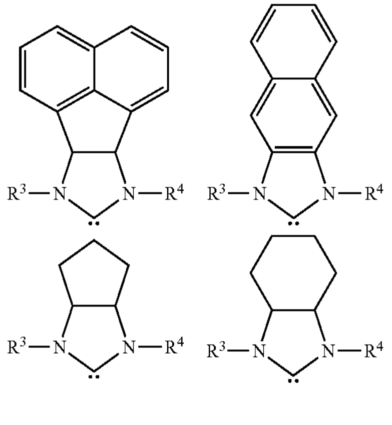

-continued

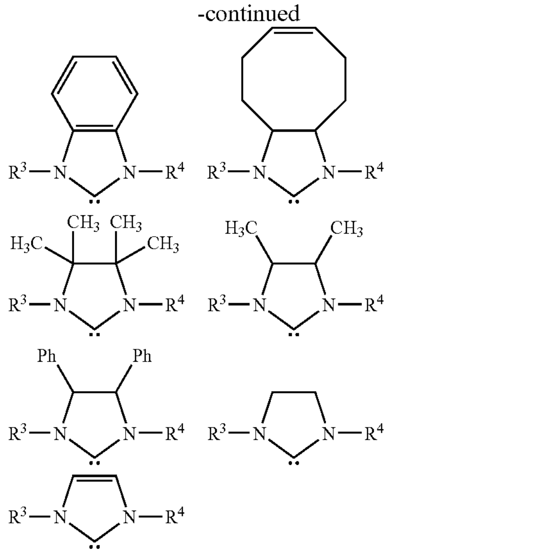

When M is ruthenium, then, the preferred complexes have the structure of formula (VII).

(VII)

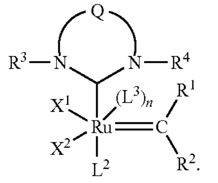

In a more preferred embodiment, Q is a two-atom linkage having the structure $—CR^{11}R^{12}—CR^{13}R^{14}—$ or $—CR^{11}═CR^{13}—$, preferably $—CR^{11}R^{12}—CR^{13}R^{14}—$, wherein $R^{11}$, $R^{12}$, $R^{13}$, and $R^{14}$ are independently selected from hydrogen, hydrocarbyl, substituted hydrocarbyl, heteroatom-containing hydrocarbyl, substituted heteroatom-containing hydrocarbyl, and functional groups. Examples of functional groups here include carboxyl, $C_1$-$C_{20}$ alkoxy, $C_5$-$C_{24}$ aryloxy, $C_2$-$C_{20}$ alkoxycarbonyl, $C_5$-$C_{24}$ alkoxycarbonyl, $C_2$-$C_{24}$ acyloxy, $C_1$-$C_{20}$ alkylthio, $C_5$-$C_{24}$ arylthio, $C_1$-$C_{20}$ alkylsulfonyl, and $C_1$-$C_{20}$ alkylsulfinyl, optionally substituted with one or more moieties selected from $C_1$-$C_{12}$ alkyl, $C_1$-$C_{12}$ alkoxy, $C_5$-$C_{14}$ aryl, hydroxyl, sulfhydryl, formyl, and halide. $R^{11}$, $R^{12}$, $R^{13}$, and $R^{14}$ are preferably independently selected from hydrogen, C1-C12 alkyl, substituted $C_1$-$C_{12}$ alkyl, $C_1$-$C_{12}$ heteroalkyl, substituted $C_1$-$C_{12}$ heteroalkyl, phenyl, and substituted phenyl. Alternatively, any two of $R^{11}$, $R^{12}$, $R^{13}$, and $R^{14}$ may be linked together to form a substituted or unsubstituted, saturated or unsaturated ring structure, e.g., a $C_4$-$C_{12}$ alicyclic group or a $C_5$ or $C_6$ aryl group, which may itself be substituted, e.g., with linked or fused alicyclic or aromatic groups, or with other substituents.

When $R^3$ and $R^4$ are aromatic, they are typically although not necessarily composed of one or two aromatic rings, which may or may not be substituted, e.g., $R^3$ and $R^4$ may be phenyl, substituted phenyl, biphenyl, substituted biphenyl, or the like. In one preferred embodiment, $R^3$ and $R^4$ are the same and are each unsubstituted phenyl or phenyl substituted with up to three substituents selected from $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, $C_6$-$C_{24}$ aralkyl, $C_6$-$C_{24}$ alkaryl, or halide. Preferably, any substituents present are hydrogen, $C_1$-$C_{12}$ alkyl, $C_1$-$C_{12}$ alkoxy, $C_5$-$C_{14}$ aryl, substituted $C_5$-$C_{14}$ aryl, or halide. As an example, $R^3$ and $R^4$ are mesityl.

In a third group of catalysts having the structure of formula (III), M, m, n, $X^1$, $X^2$, $R^1$, and $R^2$ are as defined for the first group of catalysts, $L^1$ is a strongly coordinating neutral electron donor ligand such as any of those described for the first and second groups of catalysts, and $L^2$ and $L^3$ are weakly coordinating neutral electron donor ligands in the form of optionally substituted heterocyclic groups. Again, n is zero or 1, such that $L^3$ may or may not be present. Generally, in the third group of catalysts, $L^2$ and $L^3$ are optionally substituted five- or six-membered monocyclic groups containing 1 to 4, preferably 1 to 3, most preferably 1 to 2 heteroatoms, or are optionally substituted bicyclic or polycyclic structures composed of 2 to 5 such five- or six-membered monocyclic groups. If the heterocyclic group is substituted, it should not be substituted on a coordinating heteroatom, and any one cyclic moiety within a heterocyclic group will generally not be substituted with more than 3 substituents.

For the third group of catalysts, examples of $L^2$ and $L^3$ include, without limitation, heterocycles containing nitrogen, sulfur, oxygen, or a mixture thereof.

Examples of nitrogen-containing heterocycles appropriate for $L^2$ and $L^3$ include pyridine, bipyridine, pyridazine, pyrimidine, bipyridamine, pyrazine, 1,3,5-triazine, 1,2,4-triazine, 1,2,3-triazine, pyrrole, 2H-pyrrole, 3H-pyrrole, pyrazole, 2H-imidazole, 1,2,3-triazole, 1,2,4-triazole, indole, 3H-indole, 1H-isoindole, cyclopenta(b)pyridine, indazole, quinoline, bisquinoline, isoquinoline, bisisoquinoline, cinnoline, quinazoline, naphthyridine, piperidine, piperazine, pyrrolidine, pyrazolidine, quinuclidine, imidazolidine, picolylimine, purine, benzimidazole, bisimidazole, phenazine, acridine, and carbazole.

Examples of sulfur-containing heterocycles appropriate for $L^2$ and $L^3$ include thiophene, 1,2-dithiole, 1,3-dithiole, thiepin, benzo(b)thiophene, benzo(c)thiophene, thionaphthene, dibenzothiophene, 2H-thiopyran, 4H-thiopyran, and thioanthrene.

Examples of oxygen-containing heterocycles appropriate for $L^2$ and $L^3$ include 2H-pyran, 4H-pyran, 2-pyrone, 4-pyrone, 1,2-dioxin, 1,3-dioxin, oxepin, furan, 2H-1-benzopyran, coumarin, coumarone, chromene, chroman-4-one, isochromen-1-one, isochromen-3-one, xanthene, tetrahydrofuran, 1,4-dioxan, and dibenzofuran.

Examples of mixed heterocycles appropriate for $L^2$ and $L^3$ include isoxazole, oxazole, thiazole, isothiazole, 1,2,3-oxadiazole, 1,2,4-oxadiazole, 1,3,4-oxadiazole, 1,2,3,4-oxatriazole, 1,2,3,5-oxatriazole, 3H-1,2,3-dioxazole, 3H-1,2-oxathiole, 1,3-oxathiole, 4H-1,2-oxazine, 2H-1,3-oxazine, 1,4-oxazine, 1,2,5-oxathiazine, o-isooxazine, phenoxazine, phenothiazine, pyrano[3,4-b]pyrrole, indoxazine, benzoxazole, anthranil, and morpholine.

Preferred $L^2$ and $L^3$ ligands are aromatic nitrogen-containing and oxygen-containing heterocycles, and particularly preferred $L^2$ and $L^3$ ligands are monocyclic N-heteroaryl ligands that are optionally substituted with 1 to 3, preferably 1 or 2, substituents. Specific examples of particularly preferred $L^2$ and $L^3$ ligands are pyridine and substituted pyridines, such as 3-bromopyridine, 4-bromopyridine, 3,5-dibromopyridine, 2,4,6-tribromopyridine, 2,6-dibromopyridine, 3-chloropyridine, 4-chloropyridine, 3,5-dichloropyridine, 2,4,6-trichloropyridine, 2,6-dichloropyridine, 4-iodopyridine, 3,5-diiodopyridine, 3,5-dibromo-4-methylpyridine, 3,5-dichloro-4-methylpyridine, 3,5-dimethyl-4-bromopyridine, 3,5-dimethylpyridine, 4-methylpyridine, 3,5-diisopropylpyridine, 2,4,6-trimethylpyridine, 2,4,6-triisopropylpyridine, 4-(tert-butyl)pyridine, 4-phenylpyridine, 3,5-diphenylpyridine, 3,5-dichloro-4-phenylpyridine, and the like.

In general, any substituents present on $L^2$ and/or $L^3$ are selected from halo, $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, substituted $C_5$-$C_{24}$ heteroaryl, $C_6$-$C_{24}$ alkaryl, substituted $C_6$-$C_{24}$ alkaryl, $C_6$-$C_{24}$ heteroalkaryl, substituted $C_6$-$C_{24}$ heteroalkaryl, $C_6$-$C_{24}$ aralkyl, substituted $C_6$-$C_{24}$ aralkyl, $C_6$-$C_{24}$ heteroaralkyl, substituted $C_6$-$C_{24}$ heteroaralkyl, and functional groups, with suitable functional groups including, without limitation, $C_1$-$C_{20}$ alkoxy, $C_5$-$C_{24}$ aryloxy, $C_2$-$C_{20}$ alkylcarbonyl, $C_6$-$C_{24}$ arylcarbonyl, $C_2$-$C_{20}$ alkylcarbonyloxy, $C_6$-$C_{24}$ arylcarbonyloxy, $C_2$-$C_{20}$ alkoxycarbonyl, $C_6$-$C_{24}$ aryloxycarbonyl, halocarbonyl, $C_2$-$C_{20}$ alkylcarbonato, $C_6$-$C_{24}$ arylcarbonato, carboxy, carboxylato, carbamoyl, mono-($C_1$-$C_{20}$ alkyl)-substituted carbamoyl, di-($C_1$-$C_{20}$ alkyl)-substituted carbamoyl, di-N—($C_1$-$C_{20}$ alkyl), N—($C_5$-$C_{24}$ aryl)-substituted carbamoyl, mono-($C_5$-$C_{24}$ aryl)-substituted carbamoyl, di-($C_6$-$C_{24}$ aryl)-substituted carbamoyl, thiocarbamoyl, mono-($C_1$-$C_{20}$ alkyl)-substituted thiocarbamoyl, di-($C_1$-$C_{20}$ alkyl)-substituted thiocarbamoyl, di-N—($C_1$-$C_{20}$ alkyl)-N—($C_6$-$C_{24}$ aryl)-substituted thiocarbamoyl, mono-($C_6$-$C_{24}$ aryl)-substituted thiocarbamoyl, di-($C_6$-$C_{24}$ aryl)-substituted thiocarbamoyl, carbamido, formyl, thioformyl, amino, mono-($C_1$-$C_{20}$ alkyl)-substituted amino, di-($C_1$-$C_{20}$ alkyl)-substituted amino, mono-($C_5$-$C_{24}$ aryl)-substituted amino, di-($C_5$-$C_{24}$ aryl)-substituted amino, di-N—($C_1$-$C_{20}$ alkyl), N—($C_5$-$C_{24}$ aryl)-substituted amino, $C_2$-$C_{20}$ alkylamido, $C_6$-$C_{24}$ arylamido, imino, $C_1$-$C_{20}$ alkylimino, $C_5$-$C_{24}$ arylimino, nitro, and nitroso. In addition, two adjacent substituents may be taken together to form a ring, generally a five- or six-membered alicyclic or aryl ring, optionally containing 1 to 3 heteroatoms and 1 to 3 substituents as above.

Preferred substituents on $L^2$ and $L^3$ include, without limitation, halo, $C_1$-$C_{12}$ alkyl, substituted $C_1$-$C_{12}$ alkyl, $C_1$-$C_{12}$ heteroalkyl, substituted $C_1$-$C_{12}$ heteroalkyl, $C_5$-$C_{14}$ aryl, substituted $C_5$-$C_{14}$ aryl, $C_5$-$C_{14}$ heteroaryl, substituted $C_5$-$C_{14}$ heteroaryl, $C_6$-$C_{16}$ alkaryl, substituted $C_6$-$C_{16}$ alkaryl, $C_6$-$C_{16}$ heteroalkaryl, substituted $C_6$-$C_{16}$ heteroalkaryl, $C_6$-$C_{16}$ aralkyl, substituted $C_6$-$C_{16}$ aralkyl, $C_6$-$C_{16}$ heteroaralkyl, substituted $C_6$-$C_{16}$ heteroaralkyl, $C_1$-$C_{12}$ alkoxy, $C_5$-$C_{14}$ aryloxy, $C_2$-$C_{12}$ alkylcarbonyl, $C_6$-$C_{14}$ arylcarbonyl, $C_2$-$C_{12}$ alkylcarbonyloxy, $C_6$-$C_{14}$ arylcarbonyloxy, $C_2$-$C_{12}$ alkoxycarbonyl, $C_6$-$C_{14}$ aryloxycarbonyl, halocarbonyl, formyl, amino, mono-($C_1$-$C_{12}$ alkyl)-substituted amino, di-($C_1$-$C_{12}$ alkyl)-substituted amino, mono-($C_5$-$C_{14}$ aryl)-substituted amino, di-($C_5$-$C_{14}$ aryl)-substituted amino, and nitro.

Of the foregoing, the most preferred substituents are halo, $C_1$-$C_6$ alkyl, $C_1$-$C_6$ haloalkyl, $C_1$-$C_6$ alkoxy, phenyl, substituted phenyl, formyl, N,N-di$C_1$-$C_6$ alkyl)amino, nitro, and nitrogen heterocycles as described above (including, for example, pyrrolidine, piperidine, piperazine, pyrazine, pyrimidine, pyridine, pyridazine, etc.).

$L^2$ and $L^3$ may also be taken together to form a bidentate or multidentate ligand containing two or more, generally two, coordinating heteroatoms such as N, O, S, or P, with preferred such ligands being diimine ligands of the Brookhart type. One representative bidentate ligand has the structure of formula (VIII)

(VIII)

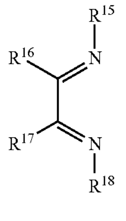

wherein $R^{15}$, $R^{16}$, $R^{17}$, and $R^{18}$ hydrocarbyl (e.g., $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, or $C_6$-$C_{24}$ aralkyl), substituted hydrocarbyl (e.g., substituted $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, or $C_6$-$C_{24}$ aralkyl), heteroatom-containing hydrocarbyl (e.g., $C_1$-$C_{20}$ heteroalkyl, $C_5$-$C_{24}$ heteroaryl, heteroatom-containing $C_6$-$C_{24}$ aralkyl, or heteroatom-containing $C_6$-$C_{24}$ alkaryl), or substituted heteroatom-containing hydrocarbyl (e.g., substituted $C_1$-$C_{20}$ heteroalkyl, $C_5$-$C_{24}$ heteroaryl, heteroatom-containing $C_6$-$C_{24}$ aralkyl, or heteroatom-containing $C_6$-$C_{24}$ alkaryl), or (1) $R^{15}$ and $R^{16}$, (2) $R^{17}$ and $R^{18}$, (3) $R^{16}$ and $R^{17}$, or (4) both $R^{15}$ and $R^{16}$, and $R^{17}$ and $R^{18}$, may be taken together to form a ring, i.e., an N-heterocycle. Preferred cyclic groups in such a case are five- and six-membered rings, typically aromatic rings.

In a fourth group of catalysts that have the structure of formula (III), two of the substituents are taken together to form a bidentate ligand or a tridentate ligand. Examples of bidentate ligands include, but are not limited to, bisphosphines, dialkoxides, alkyldiketonates, and aryldiketonates. Specific examples include —$P(Ph)_2CH_2CH_2P(Ph)_2$-, —As$(Ph)_2CH_2CH_2As(Ph_2)$-, —$P(Ph)_2CH_2CH_2C(CF_3)_2O$—, binaphtholate dianions, pinacolate dianions, —$P(CH_3)_2(CH_2)_2P(CH_3)_2$—, and —$OC(CH_3)_2(CH_3)_2CO$—. Preferred bidentate ligands are —$P(Ph)_2CH_2CH_2P(Ph)_2$- and —$P(CH_3)_2(CH_2)_2P(CH_3)_2$—. Tridentate ligands include, but are not limited to, $(CH_3)_2NCH_2CH_2P(Ph)CH_2CH_2N(CH_3)_2$. Other preferred tridentate ligands are those in which any three of $X^1$, $X^2$, $L^1$, $L^2$, $L^3$, $R^1$, and $R^2$ (e.g., $X^1$, $L^1$, and $L^2$) are taken together to be cyclopentadienyl, indenyl, or fluorenyl, each optionally substituted with $C_2$-$C_{20}$ alkenyl, $C_2$-$C_{20}$ alkynyl, $C_1$-$C_{20}$ alkyl, $C_5$-$C_{20}$ aryl, $C_1$-$C_{20}$ alkoxy, $C_2$-$C_{20}$ alkenyloxy, $C_2$-$C_{20}$ alkynyloxy, $C_5$-$C_{20}$ aryloxy, $C_2$-$C_{20}$ alkoxycarbonyl, $C_1$-$C_{20}$ alkylthio, $C_1$-$C_{20}$ alkylsulfonyl, or $C_1$-$C_{20}$ alkylsulfinyl, each of which may be further substituted with $C_1$-$C_6$ alkyl, halide, $C_1$-$C_6$ alkoxy or with a phenyl group optionally substituted with halide, $C_1$-$C_6$ alkyl, or $C_1$-$C_6$ alkoxy. More preferably, in compounds of this type, X, $L^1$, and $L^2$ are taken together to be cyclopentadienyl or indenyl, each optionally substituted with vinyl, $C_1$-$C_{10}$ alkyl, $C_5$-$C_{20}$ aryl, $C_1$-$C_{10}$ carboxylate, $C_2$-$C_{10}$ alkoxycarbonyl, $C_1$-$C_{10}$ alkoxy, or $C_5$-$C_{20}$ aryloxy, each optionally substituted with $C_1$-$C_6$ alkyl, halide, $C_1$-$C_6$ alkoxy or with a phenyl group optionally substituted with halide, $C_1$-$C_6$ alkyl or $C_1$-$C_6$ alkoxy. Most preferably, X, $L^1$ and $L^2$ may be taken together to be cyclopentadienyl, optionally substituted with vinyl, hydrogen, methyl, or phenyl. Tetradentate ligands include, but are not limited to $O_2C(CH_2)_2P(Ph)(CH_2)_2P(Ph)(CH_2)_2CO_2$, phthalocyanines, and porphyrins.

Complexes wherein $L^2$ and $R^2$ are linked are examples of the fourth group of catalysts, and are commonly called "Grubbs-Hoveyda" catalysts. Examples of Grubbs-Hoveyda-type catalysts include the following:

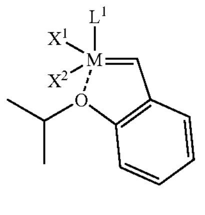

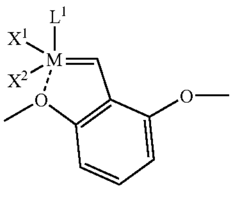

-continued

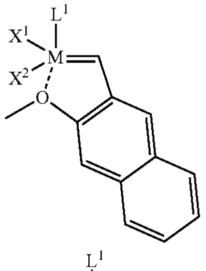

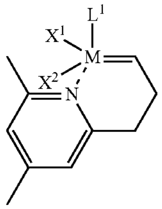

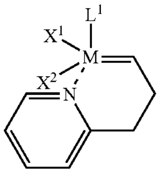

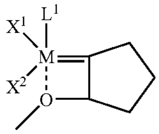

wherein $L^1$, $X^1$, $X^2$, and M are as described for any of the other groups of catalysts.

In addition to the catalysts that have the structure of formula (III), as described above, other transition metal carbene complexes include, but are not limited to:

neutral ruthenium or osmium metal carbene complexes containing metal centers that are formally in the +2 oxidation state, have an electron count of 16, are pentacoordinated, and are of the general formula (IX);

neutral ruthenium or osmium metal carbene complexes containing metal centers that are formally in the +2 oxidation state, have an electron count of 18, are hexacoordinated, and are of the general formula (X);

cationic ruthenium or osmium metal carbene complexes containing metal centers that are formally in the +2 oxidation state, have an electron count of 14, are tetracoordinated, and are of the general formula (XI); and cationic ruthenium or osmium metal carbene complexes containing metal centers that are formally in the +2 oxidation state, have an electron count of 14, are tetracoordinated, and are of the general formula (XII)

(IX)

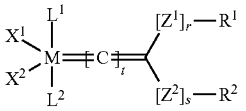

(X)

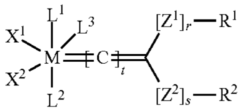

(XI)

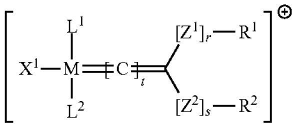

(XII)

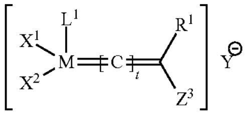

wherein: $X^1$, $X^2$, $L^1$, $L^2$, n, $L^3$, $R^1$, and $R^2$ are as defined for any of the previously defined four groups of catalysts; r and s are independently zero or 1; t is an integer in the range of zero to 5;

Y is any non-coordinating anion (e.g., a halide ion, $BF_4^-$, etc.); $Z^1$ and $Z^2$ are independently selected from —O—, —S—, —$NR^2$—, —$PR^2$—, —P(═O)$R^2$—, —P($OR^2$)—, —P(═O)($OR^2$)—, —C(═O)—, —C(═O)O—, —OC(═O)—, —OC(═O)O—, —S(═O)—, and —S(═O)$_2$—; $Z^3$ is any cationic moiety such as —$P(R^2)_3^+$ or —$N(R^2)_3^+$; and any two or more of $X^1$, $X^2$, $L^1$, $L^2$, $L^3$, n, $Z^1$, $Z^2$, $Z^3$, $R^1$, and $R^2$ may be taken together to form a cyclic group, e.g., a multidentate ligand, and wherein any one or more of $X^1$, $X^2$, $L^1$, $L^2$, n, $L^3$, $Z^1$, $Z^2$, $Z^3$, $R^1$, and $R^2$ may be attached to a support.

Other suitable complexes include Group 8 transition metal carbenes bearing a cationic substituent, such as are disclosed in U.S. Pat. No. 7,365,140 (Piers et al.) having the general structure (XIII):

(XIII)

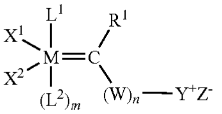

wherein:

M is a Group 8 transition metal;

$L^1$ and $L^2$ are neutral electron donor ligands;

$X^1$ and $X^2$ are anionic ligands;

$R^1$ is hydrogen, $C_1$-$C_{12}$ hydrocarbyl, or substituted $C_1$-$C_{12}$ hydrocarbyl;

W is an optionally substituted and/or heteroatom-containing $C_1$-$C_{20}$ hydrocarbylene linkage;

Y is a positively charged Group 15 or Group 16 element substituted with hydrogen, $C_1$-$C_{12}$ hydrocarbyl, substituted $C_1$-$C_{12}$ hydrocarbyl; heteroatom-containing $C_1$-$C_{12}$ hydrocarbyl, or substituted heteroatom-containing hydrocarbyl;

$Z^-$ is a negatively charged counterion;

m is zero or 1; and n is zero or 1;

wherein any two or more of $L^1$, $L^2$, $X^1$, $X^2$, $R^1$, W, and Y can be taken together to form a cyclic group.

Each of M, $L^1$, $L^2$, $X^1$, and $X^2$ in structure (XIII) may be as previously defined herein.

W is an optionally substituted and/or heteroatom-containing $C_1$-$C_{20}$ hydrocarbylene linkage, typically an optionally substituted $C_1$-$C_{12}$ alkylene linkage, e.g., —$(CH_2)_i$— where i is an integer in the range of 1 to 12 inclusive and any of the hydrogen atoms may be replaced with a non-hydrogen substituent as described earlier herein with regard to the definition of the term "substituted." The subscript n is zero or 1, meaning that W may or may not be present. In a preferred embodiment, n is zero.

Y is a positively charged Group 15 or Group 16 element substituted with hydrogen, $C_1$-$C_{12}$ hydrocarbyl, substituted $C_1$-$C_{12}$ hydrocarbyl, heteroatom-containing $C_1$-$C_{12}$ hydrocarbyl, or substituted heteroatom-containing hydrocarbyl. Preferably, Y is a $C_1$-$C_{12}$ hydrocarbyl-substituted, positively charged Group 15 or Group 16 element. Representative Y groups include $P(R^2)_3$, $P(R^2)_3$, $As(R^2)_3$, $S(R^2)_2$, $O(R^2)_2$, where the $R^2$ are independently selected from $C_1$-$C_{12}$ hydrocarbyl; within these, preferred Y groups are phosphines of the structure $P(R^2)_3$ wherein the $R^2$ are independently selected from $C_1$-$C_{12}$ alkyl and aryl, and thus include, for example, methyl, ethyl, n-propyl, isopropyl, n-butyl, isobutyl, t-butyl, cyclopentyl, cyclohexyl, and phenyl. Y can also be a heterocyclic group containing the positively charged Group 15 or Group 16 element. For instance, when the Group 15 or Group 16 element is nitrogen, Y may be an optionally substituted pyridinyl, pyrazinyl, or imidazolyl group.

$Z^-$ is a negatively charged counterion associated with the cationic complex, and may be virtually any anion, so long as the anion is inert with respect to the components of the complex and the reactants and reagents used in the metathesis reaction catalyzed. Preferred $Z^-$ moieties are weakly coordinating anions, such as, for instance, $[B(C_6F_5)_4]^-$, $[BF_4]^-$, $[B(C_6H_6)_4]^-$, $[CF_3S(O)_3]^-$, $[PF_6]^-$, $[SbF_6]^-$, $[AlCl_4]^-$, $[FSO_3]^-$, $[CB_{11}H_6Cl_6]^-$, $[CB_{11}H_6Br_6]^-$, and $[SO_3F{:}SbF_5]^-$. Preferred anions suitable as $Z^-$ are formula $B(R^{15})_4^-$ where $R^{15}$ is fluoro, aryl, or perfluorinated aryl, typically fluoro or perfluorinated aryl. Most preferred anions suitable as $Z^-$ are $BF_4^-$ and $B(C_6F_5)^-$, optimally the latter.

It should be emphasized that any two or more of $X^1$, $X^2$, $L^1$, $L^2$, $R^1$, W, and Y can be taken together to form a cyclic group, as disclosed, for example, in U.S. Pat. No. 5,312,940 to Grubbs et al. When any of $X^1$, $X^2$, $L^1$, $L^2$, $R^1$, W, and Y are linked to form cyclic groups, those cyclic groups may be five- or six-membered rings, or may comprise two or three five- or six-membered rings, which may be either fused or linked. The cyclic groups may be aliphatic or aromatic, and may be heteroatom-containing and/or substituted, as explained in part (I) of this section.

One group of exemplary catalysts encompassed by the structure of formula (XIII) are those wherein m and n are zero, such that the complex has the structure of formula (XIV)

(XIV)

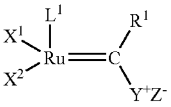

Possible and preferred $X^1$, $X^2$, and $L^1$ ligands are as described earlier with respect to complexes of formula (I), as are possible and preferred $Y^+$ and $Z^-$ moieties. M is Ru or Os, preferably Ru, and $R^1$ is hydrogen or $C_1$-$C_{12}$ alkyl, preferably hydrogen.

In formula (XIV)-type catalysts, $L^1$ is preferably a heteroatom-containing carbene ligand having the structure of formula (XV)

(XV)

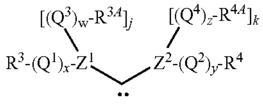

such that complex (XIV) has the structure of formula (XVI)

(XVI)

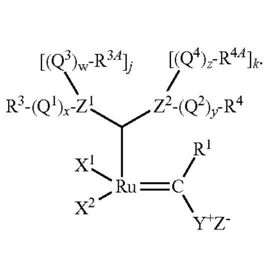

wherein $X^1$, $X^2$, $R^1$, $R^2$, Y, and Z are as defined previously, and the remaining substituents are as follows:

$Z^1$ and $Z^2$ are heteroatoms typically selected from N, O, S, and P. Since O and S are divalent, j is necessarily zero when $Z^1$ is O or S, and k is necessarily zero when $Z^2$ is O or S. However, when $Z^1$ is N or P, then j is 1, and when $Z^2$ is N or P, then k is 1. In a preferred embodiment, both $Z^1$ and $Z^2$ are N.

$Q^1$, $Q^2$, $Q^3$, and $Q^4$ are linkers, e.g., $C_1$-$C_{12}$ hydrocarbylene, substituted $C_1$-$C_{12}$ hydrocarbylene, heteroatom-containing $C_1$-$C_{12}$ hydrocarbylene, substituted heteroatom-containing $C_1$-$C_{12}$ hydrocarbylene, or —(CO)—, and w, x, y, and z are independently zero or 1, meaning that each linker is optional. Preferably, w, x, y, and z are all zero.

$R^3$, $R^{3A}$, $R^4$, and $R^{4A}$ are independently selected from hydrogen, hydrogen, $C_1$-$C_{20}$ hydrocarbyl, substituted $C_1$-$C_{20}$ hydrocarbyl, heteroatom-containing $C_1$-$C_{20}$ hydrocarbyl, and substituted heteroatom-containing $C_1$-$C_{20}$ hydrocarbyl.

Preferably, w, x, y, and z are zero, $Z^1$ and $Z^1$ are N, and $R^{3A}$ and $R^{4A}$ are linked to form -Q-, such that the complex has the structure of formula (XVII)

(XVII)

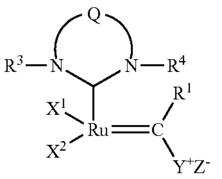

wherein $R^3$ and $R^4$ are defined above, with preferably at least one of $R^3$ and $R^4$, and more preferably both $R^3$ and $R^4$, being alicyclic or aromatic of one to about five rings, and optionally containing one or more heteroatoms and/or substituents. Q is a linker, typically a hydrocarbylene linker, including $C_1$-$C_{12}$ hydrocarbylene, substituted $C_1$-$C_{12}$ hydrocarbylene, heteroatom-containing $C_1$-$C_{12}$ hydrocarbylene, or substituted heteroatom-containing $C_1$-$C_{12}$ hydrocarbylene linker, wherein two or more substituents on adjacent atoms within Q may be linked to form an additional cyclic structure, which may be similarly substituted to provide a fused polycyclic structure of two to about five cyclic groups. Q is often, although not necessarily, a two-atom linkage or a three-atom linkage, e.g., $—CH_2—CH_2—$, —CH(Ph)-CH(Ph)- where Ph is phenyl; =CR—N=, giving rise to an unsubstituted (when R=H) or substituted (R= other than H) triazolyl group; or $—CH_2—SiR_2—CH_2—$ (where R is H, alkyl, alkoxy, etc.).

In a more preferred embodiment, Q is a two-atom linkage having the structure $—CR^8R^9—CR^{10}R^{11}—$ or $—CR^8{=}CR^{10}—$, preferably $—CR^8R^9—CR^{10}R^{11}—$, wherein $R^8$, $R^9$, $R^{10}$, and $R^{11}$ are independently selected from hydrogen, $C_1$-$C_{12}$ hydrocarbyl, substituted $C_1$-$C_{12}$ hydrocarbyl, heteroatom-containing $C_1$-$C_{12}$ hydrocarbyl, substituted heteroatom-containing $C_1$-$C_{12}$ hydrocarbyl, and functional groups as defined in part (I) of this section. Examples of functional groups here include carboxyl. $C_1$-$C_{20}$ alkoxy, $C_5$-$C_{20}$ aryloxy, $C_2$-$C_{20}$ alkoxycarbonyl, $C_2$-$C_{20}$ alkoxycarbonyl, $C_2$-$C_{20}$ acyloxy, $C_1$-$C_{20}$ alkylthio, $C_5$-$C_{20}$ arylthio, $C_1$-$C_{20}$ alkylsulfonyl, and $C_1$-$C_{20}$ alkylsulfinyl, optionally substituted with one or more moieties selected from $C_1$-$C_{10}$ alkyl, $C_1$-$C_{10}$ alkoxy, $C_5$-$C_{20}$ aryl, hydroxyl, sulfhydryl, formyl, and halide. Alternatively, any two of $R^9$, $R^9$, $R^{10}$, and $R^{11}$ may be linked together to form a substituted or unsubstituted, saturated or unsaturated ring structure, e.g., a $C_4$-$C_{12}$ alicyclic group or a $C_5$ or $C_6$ aryl group, which may itself be substituted, e.g., with linked or fused alicyclic or aromatic groups, or with other substituents.

Further details concerning such formula (XIII) complexes, as well as associated preparation methods, may be obtained from U.S. Pat. No. 7,365,140.

As is understood in the field of catalysis, suitable solid supports for any of the catalysts described herein may be of synthetic, semi-synthetic, or naturally occurring materials, which may be organic or inorganic, e.g., polymeric, ceramic, or metallic. Attachment to the support will generally, although not necessarily, be covalent, and the covalent linkage may be direct or indirect, if indirect, typically through a functional group on a support surface.

Non-limiting examples of catalysts that may be used in the reactions of the disclosure include the following, some of which for convenience are identified throughout this disclosure by reference to their molecular weight:

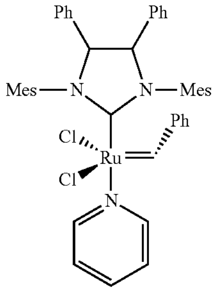

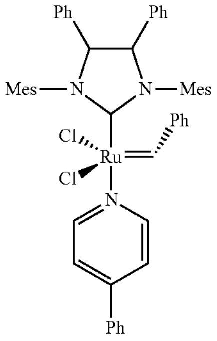

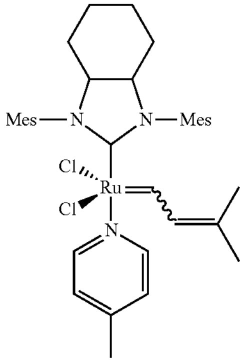

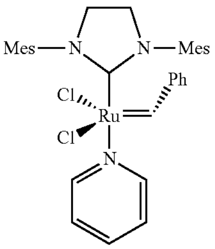

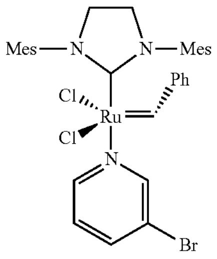

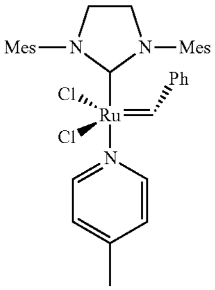

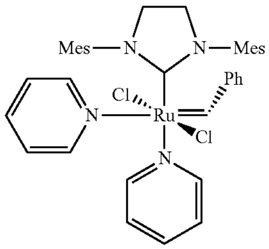

-continued

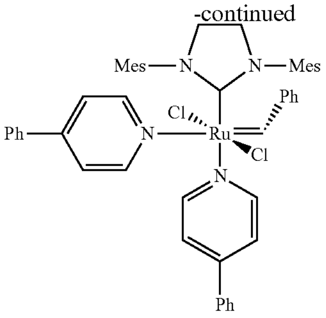

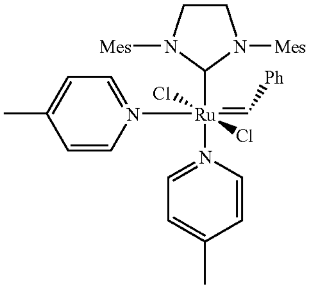

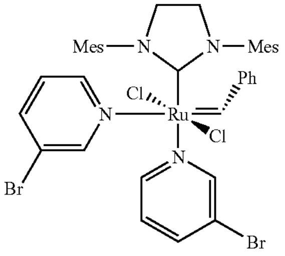

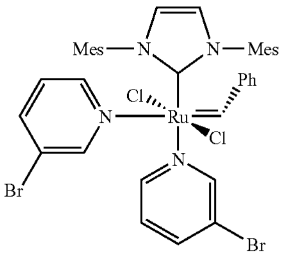

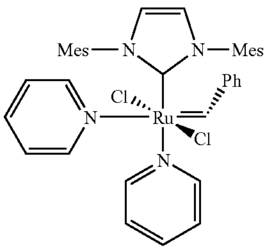

C827

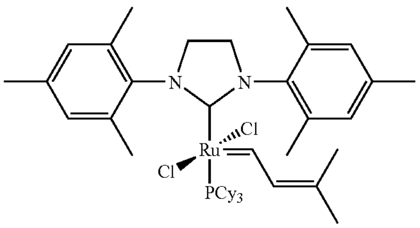

-continued
C859
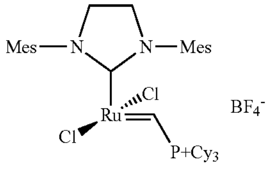
C841-n
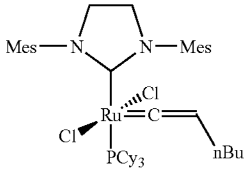
C916
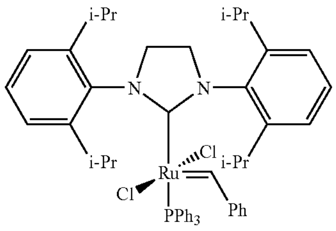
C965-p
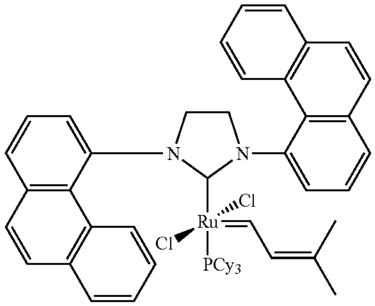
C727
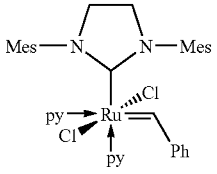
C577
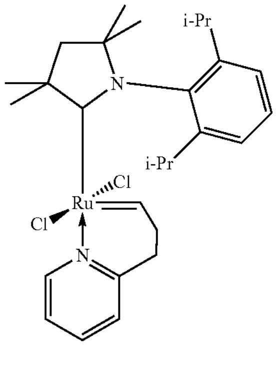
-continued
C646
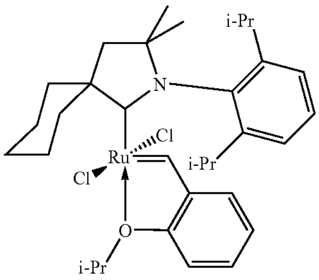
C701
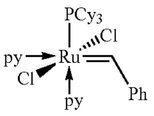
C767-m
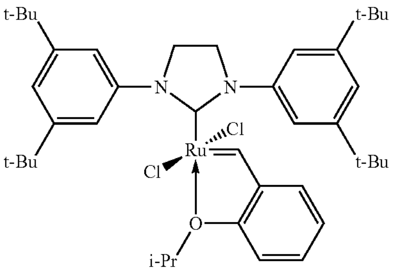
C811
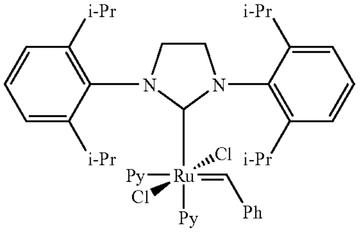
C801
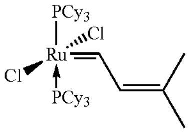
C838
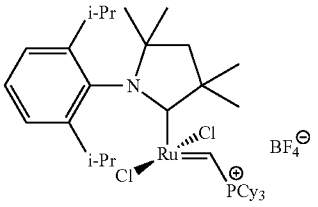
C712
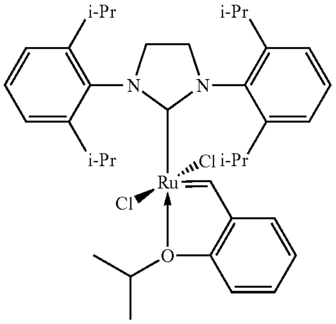

-continued
C933
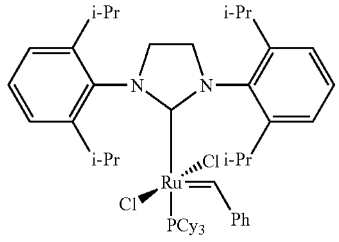
C824
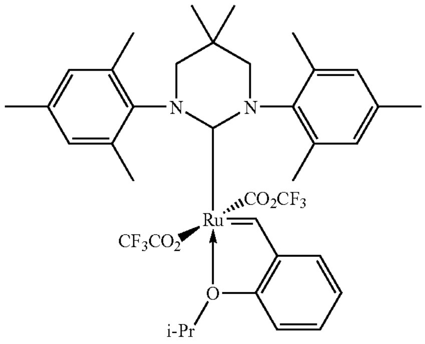
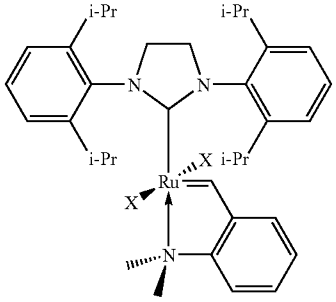
C697 (X = Cl)
C785 (X = Br)
C879 (X = I)
C601
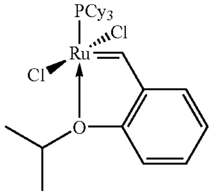
C848
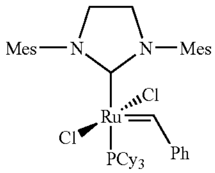
C831
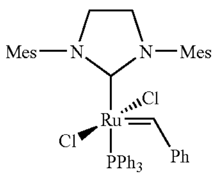
-continued
C627
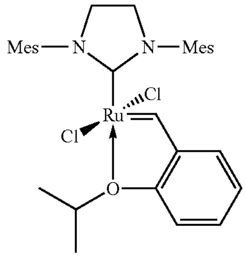
C672
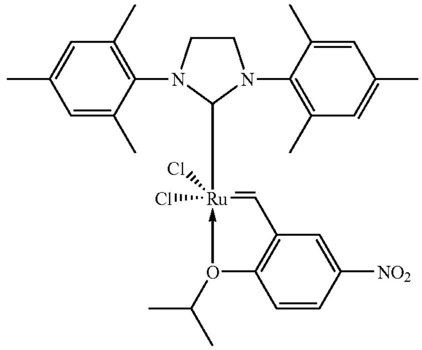
C657
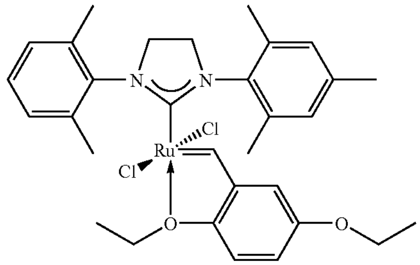
C734
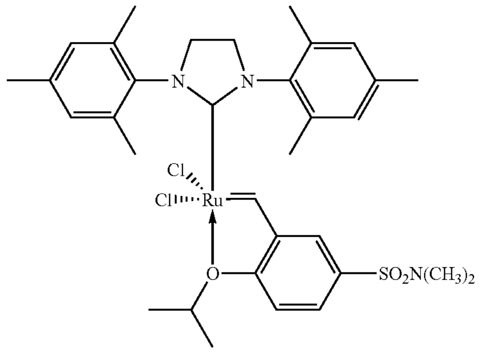
C767
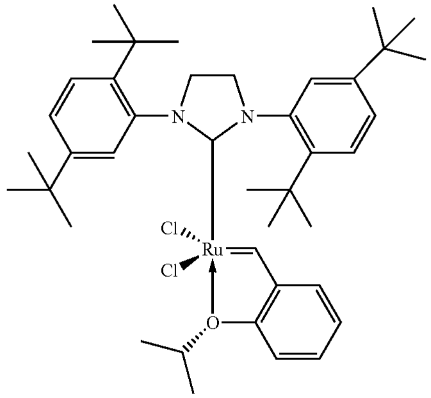

-continued
C809
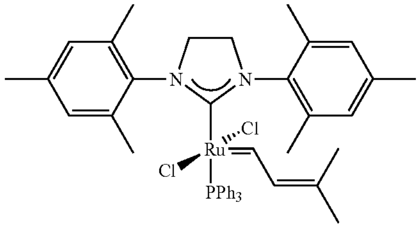
C849
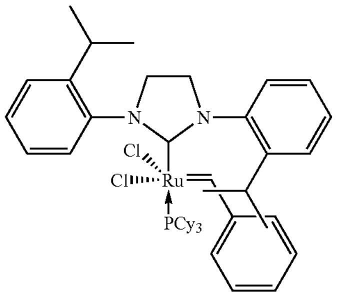
C923
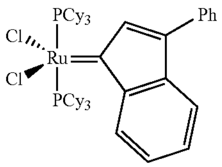
C-524
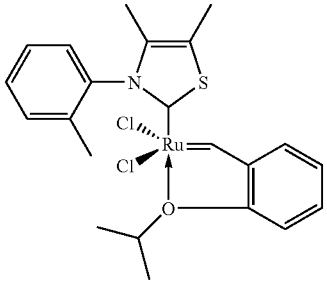
C-552
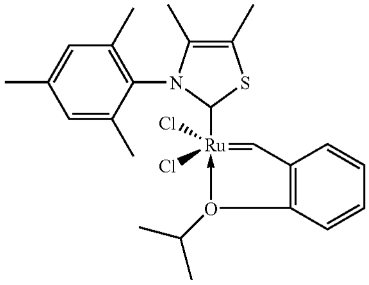
C-566
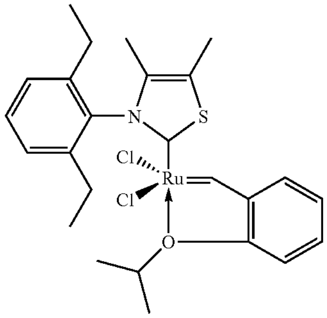
-continued
DPAI-278
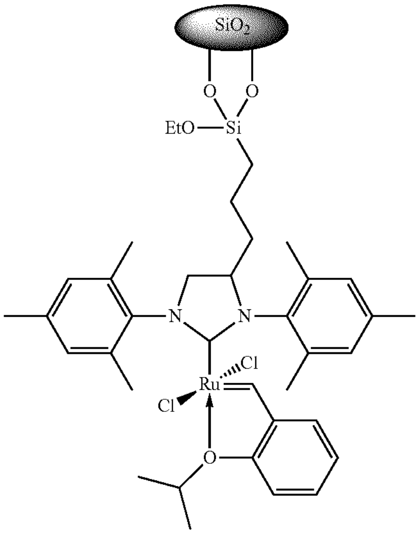
C-598
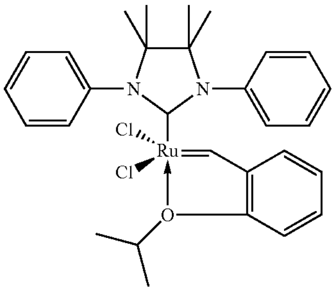
C-626
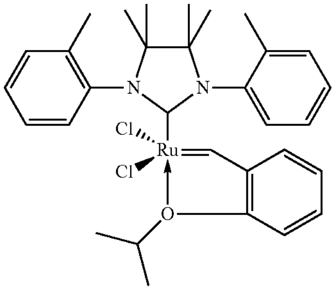
C949
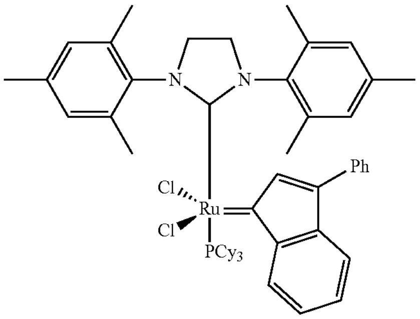
C823
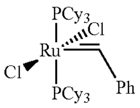

-continued
C606
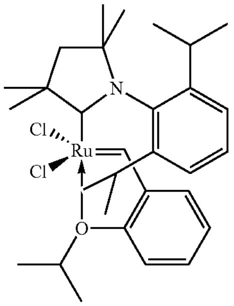
C629
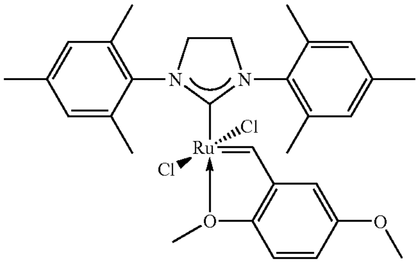
C833
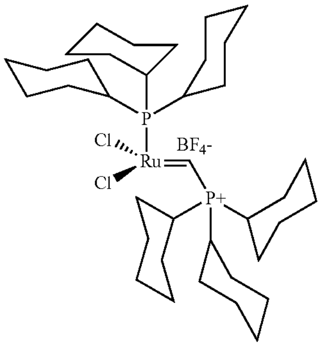
C613
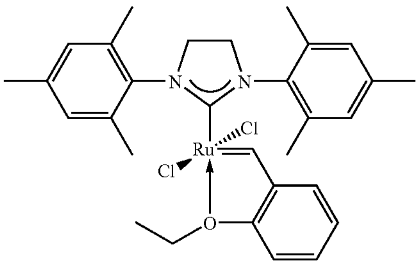
C827
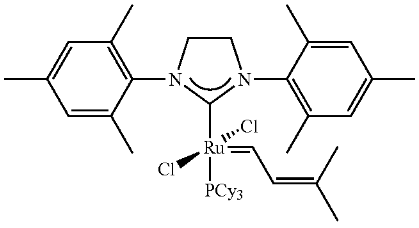
-continued
C627
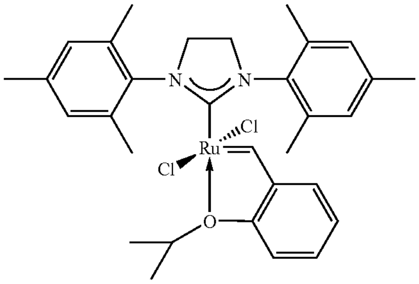
C793
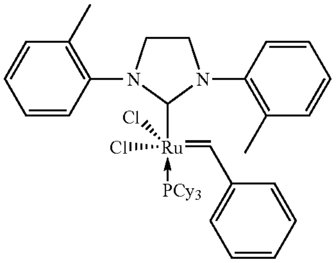
C598Cs
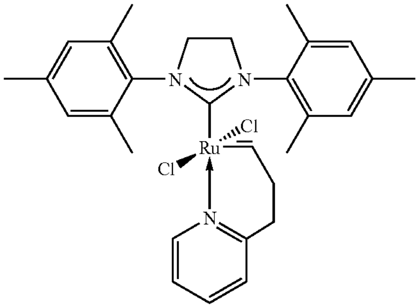
C782
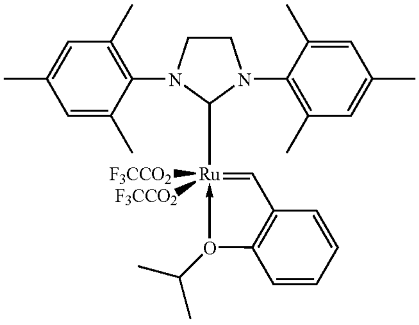
C702
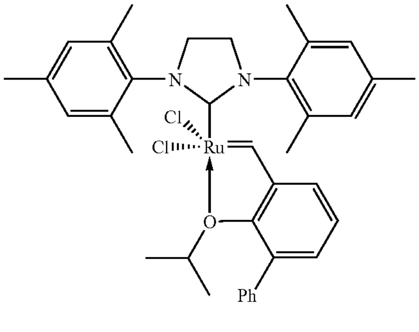

-continued

C884

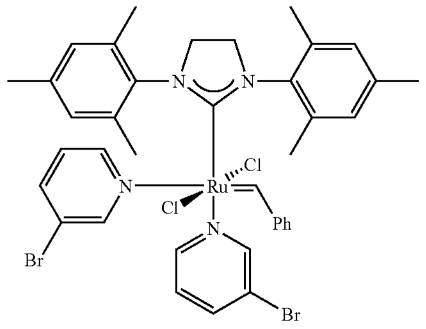

C933

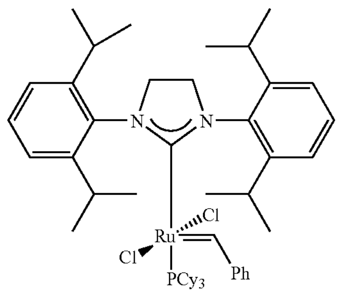

C866

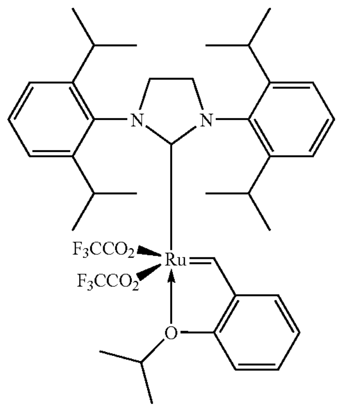

C571

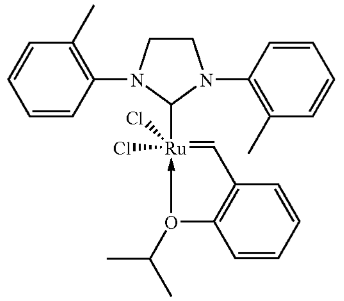

C578

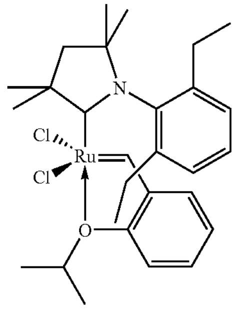

In the foregoing molecular structures and formulae, Ph represents phenyl, Cy represents cyclohexane, Me represents methyl, nBu represents n-butyl, i-Pr represents isopropyl, py represents pyridine (coordinated through the N atom), and Mes represents mesityl (i.e., 2,4,6-trimethylphenyl).

Further examples of catalysts useful in the reactions of the present disclosure include the following: ruthenium (II) dichloro (3-methyl-1,2-butenylidene)bis(tricyclopentylphosphine) (C716); ruthenium (II) dichloro (3-methyl-1, 2-butenylidene)bis(tricyclohexylphosphine) (C801); ruthenium (II) dichloro(phenylmethylene)bis (tricyclohexylphosphine) (C823); ruthenium (II) [1,3-bis-(2, 4,6-trimethylphenyl)-2-imidazolidinylidene)dichloro (phenylmethylene)(triphenylphosphine) (C830), and ruthenium (II) dichloro(vinyl phenylmethylene)bis(tricyclohexylphosphine) (C835); ruthenium (II) dichloro(tricyclohexylphosphine)(o-isopropoxyphenylmethylene) (C601), and ruthenium (II) (1,3-bis-(2,4,6,-trimethylphenyl)-2-imidazolidinylidene)dichloro(phenylmethylene)(bis 3-bromopyridine (C884)).

Figure 2:
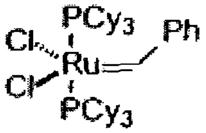
FIG. 2 is a figure showing exemplary ruthenium-based metathesis catalysts.
Figure 2:
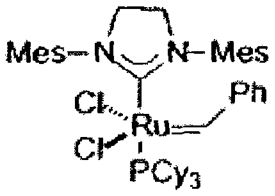
Figure 2:
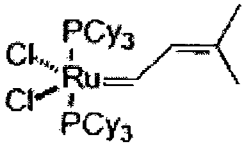
Figure 3:
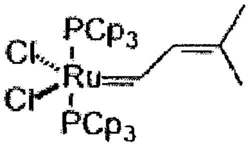
FIG. 3 is a figure showing exemplary ruthenium-based metathesis catalysts.
Figure 3:
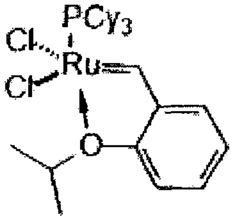
Figure 3:
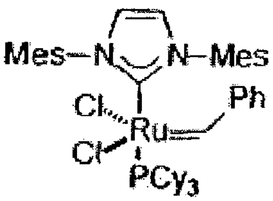
Figure 3:
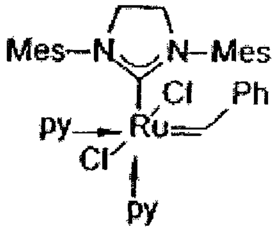
Figure 3:
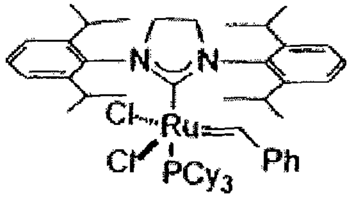
Figure 3:
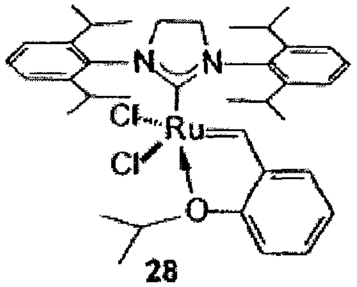
Figure 4:
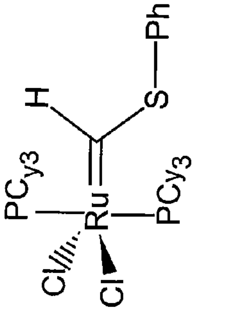
FIG. 4 is a figure showing exemplary ruthenium-based metathesis catalysts.
Figure 4:
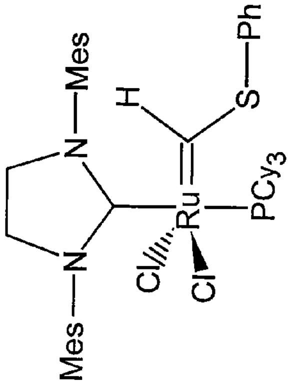
Figure 4:
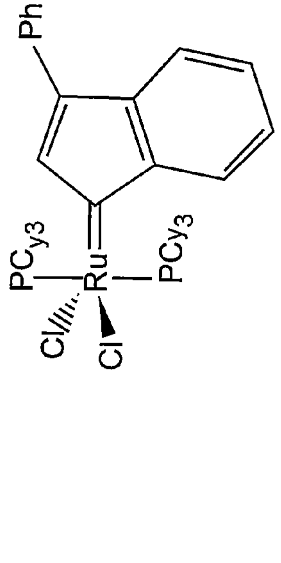
Figure 4:
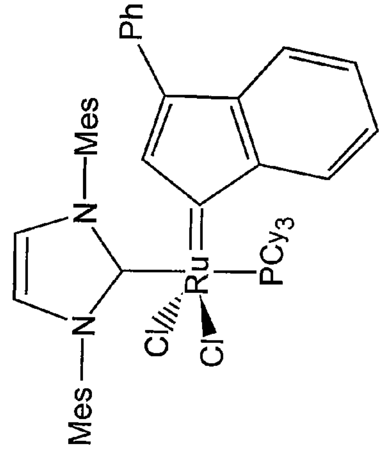
Figure 4:
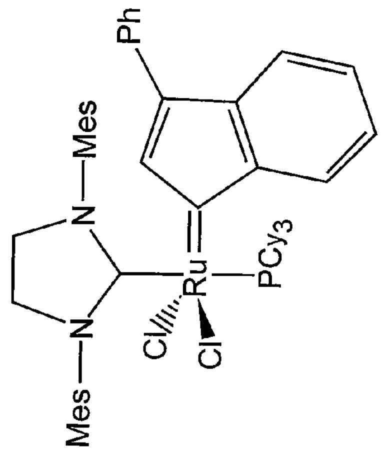
Figure 5:
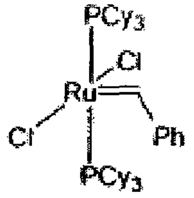
FIG. 5 is a figure showing exemplary ruthenium-based metathesis catalysts.
Figure 5:
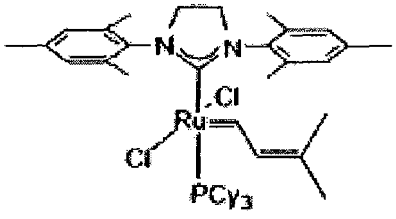
Figure 5:
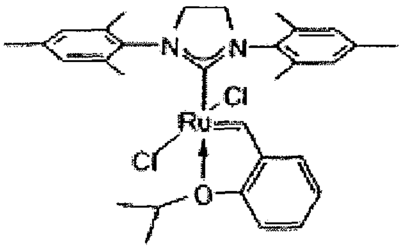
Figure 5:
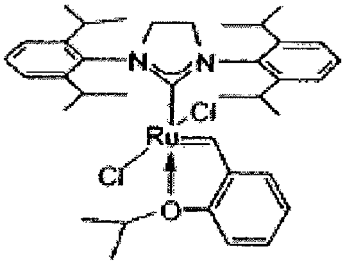
Figure 5:
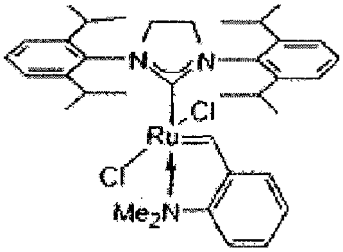
Figure 5:
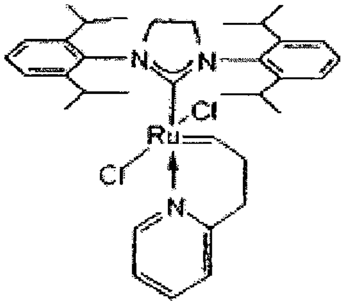
Figure 6:
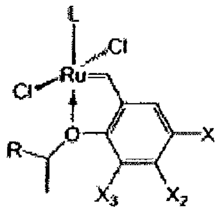
FIG. 6 is a figure showing exemplary ruthenium-based metathesis catalysts.
Figure 6:
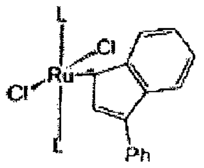
Figure 6:
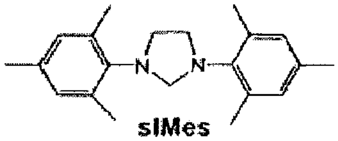
Figure 6:
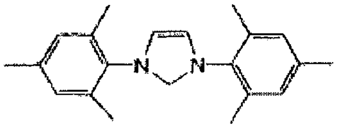
Figure 6:
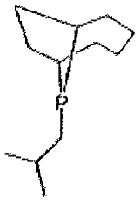

Referring to FIG. 2, exemplary ruthenium-based metathesis catalysts include those represented by structures 12 (commonly known as Grubbs's catalyst), 14 and 16. Referring to FIG. 3, structures 18, 20, 22, 24, 26, and 28 represent additional ruthenium-based metathesis catalysts. Referring to FIG. 4, structures 60, 62, 64, 66, and 68 represent additional ruthenium-based metathesis catalysts. Referring to FIG. 5, catalysts C627, C682, C697, C712, and C827 represent still additional ruthenium-based catalysts. Referring to FIG. 6, general structures 50 and 52 represent additional ruthenium-based metathesis catalysts of the type reported in *Chemical & Engineering News*; Feb. 12, 2007, at pages 37-47. In the structures of FIGS. 2-6, Ph is phenyl, Mes is mesityl, py is pyridine, Cp is cyclopentyl, and Cy is cyclohexyl.

Techniques for using the metathesis catalysts are known in the art (see, for example, U.S. Pat. Nos. 7,102,047; 6,794,534; 6,696,597; 6,414,097; 6,306,988; 5,922,863; 5,750,815; and metathesis catalysts with ligands in U.S. Publication No. 2007/0004917 A1), all incorporated by reference herein in their entireties. Metathesis catalysts as shown, for example, in FIGS. 2-5 are manufactured by Materia, Inc. (Pasadena, Calif.).

Additional exemplary metathesis catalysts include, without limitation, metal carbene complexes selected from the group consisting of molybdenum, osmium, chromium, rhenium, and tungsten. The term "complex" refers to a metal atom, such as a transition metal atom, with at least one ligand or complexing agent coordinated or bound thereto. Such a ligand typically is a Lewis base in metal carbene complexes useful for alkyne- or alkene-metathesis. Typical examples of such ligands include phosphines, halides and stabilized carbenes. Some metathesis catalysts may employ plural metals or metal co-catalysts (e.g., a catalyst comprising a tungsten halide, a tetraalkyl tin compound, and an organoaluminum compound).

An immobilized catalyst can be used for the metathesis process. An immobilized catalyst is a system comprising a catalyst and a support, the catalyst associated with the support. Exemplary associations between the catalyst and the support may occur by way of chemical bonds or weak interactions (e.g. hydrogen bonds, donor acceptor interactions) between the catalyst, or any portions thereof, and the support or any portions thereof. Support is intended to include any material suitable to support the catalyst. Typically, immobilized catalysts are solid phase catalysts that act on liquid or gas phase reactants and products. Exemplary supports are polymers, silica or alumina. Such an immobilized catalyst may be used in a flow process. An immobilized catalyst can simplify purification of products and recovery of the catalyst so that recycling the catalyst may be more convenient.

The metathesis process can be conducted under any conditions adequate to produce the desired metathesis products. For example, stoichiometry, atmosphere, solvent, temperature and pressure can be selected to produce a desired product and to minimize undesirable byproducts. The metathesis process may be conducted under an inert atmosphere. Similarly, if a reagent is supplied as a gas, an inert gaseous diluent can be used. The inert atmosphere or inert gaseous diluent typically is an inert gas, meaning that the gas does not interact with the metathesis catalyst to substantially impede catalysis. For example, particular inert gases are selected from the group consisting of helium, neon, argon, nitrogen and combinations thereof.

Similarly, if a solvent is used, the solvent chosen may be selected to be substantially inert with respect to the metathesis catalyst. For example, substantially inert solvents include, without limitation, aromatic hydrocarbons, such as benzene, toluene, xylenes, etc.; halogenated aromatic hydrocarbons, such as chlorobenzene and dichlorobenzene; aliphatic solvents, including pentane, hexane, heptane, cyclohexane, etc.; and chlorinated alkanes, such as dichloromethane, chloroform, dichloroethane, etc.

In certain embodiments, a ligand may be added to the metathesis reaction mixture. In many embodiments using a ligand, the ligand is selected to be a molecule that stabilizes the catalyst, and may thus provide an increased turnover number for the catalyst. In some cases the ligand can alter reaction selectivity and product distribution. Examples of ligands that can be used include Lewis base ligands, such as, without limitation, trialkylphosphines, for example tricyclohexylphosphine and tributyl phosphine; triarylphosphines, such as triphenylphosphine; diarylalkylphosphines, such as, diphenylcyclohexylphosphine; pyridines, such as 2,6-dimethylpyridine, 2,4,6-trimethylpyridine; as well as other Lewis basic ligands, such as phosphine oxides and phosphinites. Additives also may be present during metathesis that increase catalyst lifetime.

Any useful amount of the selected metathesis catalyst can be used in the process. For example, the molar ratio of the unsaturated polyol ester to catalyst may range from about 5:1 to about 10,000,000:1 or from about 50:1 to 500,000:1. In some embodiments, an amount of about 1 to about 10 ppm, or about 2 ppm to about 5 ppm, of the metathesis catalyst per double bond of the starting composition (i.e., on a mole/mole basis) is used.

The metathesis reaction temperature may be a rate-controlling variable where the temperature is selected to provide a desired product at an acceptable rate. The metathesis temperature may be greater than −40° C., may be greater than about −20° C., and is typically greater than about 0° C. or greater than about 20° C. Typically, the metathesis reaction temperature is less than about 150° C., typically less than about 120° C. An exemplary temperature range for the metathesis reaction ranges from about 20° C. to about 120° C.

The metathesis reaction can be run under any desired pressure. Typically, it will be desirable to maintain a total pressure that is high enough to keep the cross-metathesis reagent in solution. Therefore, as the molecular weight of the cross-metathesis reagent increases, the lower pressure range typically decreases since the boiling point of the cross-metathesis reagent increases. The total pressure may be selected to be greater than about 10 kPa, in some embodiments greater than about 30 kP, or greater than about 100 kPa. Typically, the reaction pressure is no more than about 7000 kPa, in some embodiments no more than about 3000 kPa. An exemplary pressure range for the metathesis reaction is from about 100 kPa to about 3000 kPa.

In some embodiments, the metathesis reaction is catalyzed by a system containing both a transition and a non-transition metal component. The most active and largest number of catalyst systems are derived from Group VI A transition metals, for example, tungsten and molybdenum.

In some embodiments, the unsaturated polyol ester is partially hydrogenated before it is subjected to the metathesis reaction. Partial hydrogenation of the unsaturated polyol ester reduces the number of double bonds that are available for in the subsequent metathesis reaction. In some embodiments, the unsaturated polyol ester is metathesized to form a metathesized unsaturated polyol ester, and the metathesized unsaturated polyol ester is then hydrogenated (e.g., partially or fully hydrogenated) to form a hydrogenated metathesized unsaturated polyol ester.

Hydrogenation may be conducted according to any known method for hydrogenating double bond-containing compounds such as vegetable oils. In some embodiments, the unsaturated polyol ester or metathesized unsaturated polyol ester is hydrogenated in the presence of a nickel catalyst that has been chemically reduced with hydrogen to an active state. Commercial examples of supported nickel hydrogenation catalysts include those available under the trade designations "NYSOFACT", "NYSOSEL", and "NI 5248 D" (from Englehard Corporation, Iselin, N.H.). Additional supported nickel hydrogenation catalysts include those commercially available under the trade designations "PRICAT 9910", "PRICAT 9920", "PRICAT 9908", "PRICAT 9936" (from Johnson Matthey Catalysts, Ward Hill, Mass.).

The hydrogenation catalyst may comprise, for example, nickel, copper, palladium, platinum, molybdenum, iron, ruthenium, osmium, rhodium, or iridium. Combinations of metals also may be used. Useful catalyst may be heterogeneous or homogeneous. In some embodiments, the catalysts are supported nickel or sponge nickel type catalysts.

In some embodiments, the hydrogenation catalyst comprises nickel that has been chemically reduced with hydrogen to an active state (i.e., reduced nickel) provided on a support. The support may comprise porous silica (e.g., kieselguhr, infusorial, diatomaceous, or siliceous earth) or alumina. The catalysts are characterized by a high nickel surface area per gram of nickel.

The particles of supported nickel catalyst may be dispersed in a protective medium comprising hardened triacylglyceride, edible oil, or tallow. In an exemplary embodiment, the supported nickel catalyst is dispersed in the protective medium at a level of about 22 weight % nickel.

The supported nickel catalysts may be of the type descibed in U.S. Pat. No. 3,351,566 (Taylor et al.), and incorporated by reference herein. These catalysts comprise solid nickel-silica having a stabilized high nickel surface area of 45 to 60 sq. meters per gram and a total surface area of 225 to 300 sq. meters per gram. The catalysts are prepared by precipitating the nickel and silicate ions from solution such as nickel hydrosilicate onto porous silica particles in such proportions that the activated catalyst contains 25 weight % to 50 weight % nickel and a total silica content of 30 weight % to 90 weight %. The particles are activated by calcining in air at 600° F. to 900° F., then reducing with hydrogen.

Useful catalysts having a high nickel content are described in EP 0 168 091 (incorporated by reference herein), wherein the catalyst is made by precipitation of a nickel compound. A soluble aluminum compound is added to the slurry of the precipitated nickel compound while the precipitate is maturing. After reduction of the resultant catalyst precursor, the reduced catalyst typically has a nickel surface area of the order of 90 to 150 sq. m per gram of total nickel. The catalysts have a nickel/aluminum atomic ratio in the range of 2 to 10 and have a total nickel content of more than about 66 weight %.

Useful high activity nickel/alumina/silica catalysts are described in EP 0 167 201 (incorporated by reference herein). The reduced catalysts have a high nickel surface area per gram of total nickel in the catalyst. Useful nickel/silica hydrogenation catalysts are described in U.S. Pat. No. 6,846,772. The catalysts are produced by heating a slurry of particulate silica (e.g. kieselguhr) in an aqueous nickel amine carbonate solution for a total period of at least 200 minutes at a pH above 7.5, followed by filtration, washing, drying, and optionally calcination. The nickel/silica hydrogenation catalysts are reported to have improved filtration properties. U.S. Pat. No. 4,490,480 reports high surface area nickel/alumina hydrogenation catalysts having a total nickel content of 5% to 40% weight.

Commercial examples of supported nickel hydrogenation catalysts include those available under the trade designations "NYSOFACT", "NYSOSEL", and "NI 5248 D" (from Englehard Corporation, Iselin, N.H.). Additional supported nickel hydrogenation catalysts include those commercially available under the trade designations "PRICAT 9910", "PRICAT 9920", "PRICAT 9908", "PRICAT 9936" (from Johnson Matthey Catalysts, Ward Hill, Mass.).

Hydrogenation may be carried out in a batch or in a continuous process and may be partial hydrogenation or complete hydrogenation. In a representative batch process, a vacuum is pulled on the headspace of a stirred reaction vessel and the reaction vessel is charged with the material to be hydrogenated (e.g., RBD soybean oil or metathesized RBD soybean oil). The material is then heated to a desired temperature. Typically, the temperature ranges from about 50° C. to 350° C., for example, about 100° C. to 300° C. or about 150° C. to 250° C. The desired temperature may vary, for example, with hydrogen gas pressure. Typically, a higher gas pressure will require a lower temperature. In a separate container, the hydrogenation catalyst is weighed into a mixing vessel and is slurried in a small amount of the material to be hydrogenated (e.g., RBD soybean oil or metathesized RBD soybean oil). When the material to be hydrogenated reaches the desired temperature, the slurry of hydrogenation catalyst is added to the reaction vessel. Hydrogen gas is then pumped into the reaction vessel to achieve a desired pressure of $H_2$ gas. Typically, the $H_2$ gas pressure ranges from about 15 to 3000 psig, for example, about 15 psig to 90 psig. As the gas pressure increases, more specialized high-pressure processing equipment may be required. Under these conditions the hydrogenation reaction begins and the temperature is allowed to increase to the desired hydrogenation temperature (e.g., about 120° C. to 200° C.) where it is maintained by cooling the reaction mass, for example, with cooling coils. When the desired degree of hydrogenation is reached, the reaction mass is cooled to the desired filtration temperature.

The amount of hydrogenation catalyst is typically selected in view of a number of factors including, for example, the type of hydrogenation catalyst used, the amount of hydrogenation catalyst used, the degree of unsaturation in the material to be hydrogenated, the desired rate of hydrogenation, the desired degree of hydrogenation (e.g., as measure by iodine value (IV)), the purity of the reagent, and the $H_2$ gas pressure. In some embodiments, the hydrogenation catalyst is used in an amount of about 10 weight % or less, for example, about 5 weight % or less or about 1 weight % or less.

After hydrogenation, the hydrogenation catalyst may be removed from the hydrogenated product using known techniques, for example, by filtration. In some embodiments, the hydrogenation catalyst is removed using a plate and frame filter such as those commercially available from Sparkler Filters, Inc., Conroe Tex. In some embodiments, the filtration is performed with the assistance of pressure or a vacuum. In order to improve filtering performance, a filter aid may be used. A filter aid may be added to the metathesized product directly or it may be applied to the filter. Representative examples of filtering aids include diatomaceous earth, silica, alumina, and carbon. Typically, the filtering aid is used in an amount of about 10 weight % or less, for example, about 5 weight % or less or about 1 weight % or less. Other filtering techniques and filtering aids also may be employed to remove the used hydrogenation catalyst. In other embodiments the hydrogenation catalyst is removed using centrifugation followed by decantation of the product.

When present, the hydrogenated metathesized natural oil-based wax is typically present in a minor amount as compared to the hydrogenated natural oil-based wax. For example, the hydrogenated metathesized natural oil-based wax is typically present in an amount ranging from about 5% to about 80% wax weight of the hybrid wax composition, more typically from about 5% to about 30% wax weight. In many embodiments, the ratio of hydrogenated vegetable oil wax to hydrogenated metathesized natural oil-based wax ranges from about 10:1 to about 1:2.

Wax Prillinq

Hybrid wax compositions of the invention are often prilled to form prilled waxes that comprise a plurality of typically spherical and/or flat particles. Prilled wax particles of the invention may be formed conventionally by first melting a wax composition of the invention in a vat or similar vessel. Optionally, additives such as coloring agents, scenting agents, UV stabilizers, and antioxidants may be added to the melted wax composition so they become incorporated into the prilled wax. The molten wax composition is then sprayed through a nozzle and into a cooling chamber. The finely dispersed liquid solidifies as it falls through the relatively cooler air in the chamber and forms prilled wax particles that, to the naked eye, appear to be spherical and/or flat particles (i.e., flakes) about the size of a grain of sand (e.g., about 600 μm to about 2000 μm).

Prilled waxes of the invention may be formed into wax articles (e.g., candles) using compression molding techniques that are known in the art. The particles may be introduced into a mold using a gravity flow tank. The mold is typically made from steel although other material also may be used. A physical press then applies between about 400-4000 pounds per square inch of pressure at ambient room temperature (i.e., generally about 65° F. to 85° F.). The pressure may be applied from the top or the bottom of the mold or both. The formed wax article (e.g., candle) can then be pushed out or ejected from the mold. In general, candles formed by this method do not tend to have even appearing sides and may be overdipped with hot liquid wax to give the candle a smooth appearance.

Hybrid Wax Properties

In order to survive abuse that is typical during handling, it is desirable for wax articles (e.g., compression candles) to have good cohesive strength. In commercial practice, compression candles do not typically have a uniform density throughout. That is, compression candles usually have a density gradient from one portion of the candle to another. The lower density regions are often responsible for certain types of defects. For example, in uniaxial compression, it is often difficult to get the longitudinal center of a tall candle to compress to the same density as the top and/or the bottom regions of the candle. The lower density regions may be more prone to breakage by snapping actions, surface erosion, and the like. As a result, compression waxes that exhibit good cohesive strength at low relative density (e.g. at relative densities less than 0.96; in some cases less than 0.90; sometimes even below 0.87) are desired since they may resist these type of defects. A high level of cohesiveness at lower relative density also allows the production of lighter compression candles, which may potentially improve the yield per candle and, thus, reduce raw material costs.

Advantageously, in many embodiments, the hybrid wax compositions of the invention display improved cohesive strength. This allows prilled wax compositions of the invention to be compressed to form wax articles (e.g., candles) that have improved compressive strength. Hybrid wax compositions of the invention typically comprise greater than about 50% wax weight natural oil-based wax, yet compare favorably in terms of maximum crush force to pure paraffin wax compositions, when evaluated using Test Procedure 2, as defined herein.

In some embodiments, the wax articles have improved cohesive strength as compared to prior hybrid waxes, particularly where the natural-oil based content was more than 50% wax weight. Cohesive strength can be measured, for example, by crushing a wax article comprising the wax of the invention and measuring the force necessary to crush the article (i.e., maximum crush force). It is useful to report cohesive strength on a relative basis, for example, comparing the strength of a particular wax against the strength of a paraffin control. As used herein the term "paraffin control wax" refers to the paraffin compression wax that is described in detail in the Example section of the application. When both the control and the test sample are pilled on the same prilling system, this relative strength comparison is expected to be reproducible. A relative strength of 1 means that the maximum crush force of a hybrid wax article is equal to the maximum crush force of the paraffin control when both articles are measured using Test Procedure 2.

In some embodiments, the wax article has a relative strength that is equal to or greater than 0.80 as compared to the paraffin control wax when measured at a relative density of 0.93 using Test Procedure 2. In yet other embodiments, the wax article has a relative strength that is equal to or greater than 0.90 as compared to the paraffin control wax when measured at a relative density of 0.93 using Test Procedure 2. In yet other embodiments, the wax article has a relative strength that is equal to or greater than 1.0 as compared to the paraffin control wax when measured at a relative density of 0.93 using Test Procedure 2. In yet other embodiments, the wax article has a relative strength that is equal to or greater than 0.88, when measured at a relative density of 0.95 using Test Procedure 2. In yet other embodiments, the wax article has a relative strength that is equal to or greater than 0.98, when measured at a relative density of 0.95 using Test Procedure 2.

The compressive strength may be specific to the thermal history that is imparted to the wax during prilling. For example, it has been observed that compressed prills of the same composition taken from different prilling configurations may have different maximum crush force as measured by Test Procedure 2. The order ranking of different compositions max crush strength appears to remain constant even if the absolute values measured change proportionally. For this reason, a standard paraffin control is included as a comparison.

The candle wax compositions described here also may display improved de-molding characteristics. In particular, the waxes resist damage that can occur as a result of the wax sticking to the compression mold during the ejection cycle. In some instances, the ejection of the wax article (e.g., candle) may cause "tooling marks" to be imparted to the surface of the candle. Tooling marks include, for example, scars on the surface of the candle, which may give the candle an unacceptable visual appearance. In some instances, "flashing" also may be a problem with candle wax compositions that display high adhesion to a mold. "Flashing" refers to thin layers of candle wax (i.e., thin shavings) that may form when the candle is ejected from a compression mold. After ejection, the shavings may stick to the candle (e.g., by static electricity or other means) causing the candle to be covered in a film (often a white film). Although not wishing to be bound by theory, it is believed that the improved de-molding characteristics for the candle wax compositions of the present invention may be due to the cohesive strength of the hybrid wax being greater than the adhesion forces between the wax prills and the wall of the compression mold during de-molding.

One test that is useful for characterizing hybrid wax compositions for use in freestanding compression candles is the slump test. Passing the slump test indicates that candles stacked on top of each other in a hot warehouse will retain their shape. Typically, refined paraffin waxes with Mettler drop points below 144° F. (e.g., Pacemaker 45, Pacemaker 37, and Pacemaker 35 from Citgo) do not retain enough crystallinity and rigidity to pass the slump test at 120° F. (49° C.). Pure paraffin compression waxes usually contain higher-melting-point wax components in order to provide a composition that passes the slump test. Hybrid wax compositions of the invention combine natural oil-based waxes with specific paraffin waxes that, by themselves, do not pass the slump test, in order to provide a hybrid wax that passes the slump test. The slump test is described in detail in Test Procedure 5 herein and in Example 5. In many embodiments, the hybrid wax of the invention has a Mettler drop point that ranges from about 120° F. to about 160° F.

Optional Ingredients

A variety of optional ingredients may be added to the wax compositions of the invention. Examples of optional ingredients include colorants, dyes, fragrances, UV stabilizers, and anti-oxidants. A variety of pigments and dyes suitable for candle making are listed in U.S. Pat. No. 4,614,625

The colorant is an optional ingredient and is commonly made up of one or more pigments and dyes. Colorants are typically added in a quantity of about 0.001 to 2 weight % of the wax base composition. If a pigment is employed, it is typically an organic toner in the form of a fine powder suspended in a liquid medium, such as a mineral oil. It may be advantageous to use a pigment that is in the form of fine particles suspended in a vegetable oil, e.g., a natural oil derived from an oilseed source such as soybean or corn oil. The pigment is typically a finely ground, organic toner so that the wick of a candle formed eventually from pigment-covered wax particles does not clog as the wax is burned. Pigments, even in finely ground toner forms, are generally in colloidal suspension in a carrier.

Candles often are designed to appeal to the olfactory as well as the visual sense. This type of candle usually incorporates a fragrance oil in the waxy body material. As the waxy material is melted in a lighted candle, there is a release of the fragrance oil from the liquefied wax pool. The scenting agent may be an air freshener, an insect repellent or serve more than one of such functions.

The air freshener ingredient commonly is a liquid fragrance comprising one or more volatile organic compounds which are available from perfumery suppliers such IFF, Firmenich Inc., Takasago Inc., Belmay, Noville Inc., Quest Co., and Givaudan-Roure Corp. Most conventional fragrance materials are volatile essential oils. The fragrance can be a synthetically formed material, or a naturally derived oil such as oil of Bergamot, Bitter Orange, Lemon, Mandarin, Caraway, Cedar Leaf, Clove Leaf, Cedar Wood, Geranium, Lavender, Orange, Origanum, Petitgrain, White Cedar, Patchouli, Lavandin, Neroli, Rose and the like.

A wide variety of chemicals are known for perfumery such as aldehydes, ketones, esters, alcohols, terpenes, and the like. A fragrance can be relatively simple in composition, or can be a complex mixture of natural and synthetic chemical components. A typical scented oil can comprise woody/earthy bases containing exotic constituents such as sandalwood oil, civet, patchouli oil, and the like. Scented oil can have a light floral fragrance, such as rose extract or violet extract. Scented oil also can be formulated to provide desirable fruity odors, such as lime, lemon or orange.

Synthetic types of fragrance compositions either alone or in combination with natural oils such as described in U.S. Pat. Nos. 4,314,915; 4,411,829; and 4,434,306; incorporated herein by reference. Other artificial liquid fragrances include geraniol, geranyl acetate, eugenol, isoeugenol, linalool, linalyl acetate, phenethyl alcohol, methyl ethyl ketone, methylionone, isobomyl acetate, and the like. The scenting agent can also be a liquid formulation containing an insect repellent such as citronellal, or a therapeutic agent such as eucalyptus or menthol. Once the coloring and scenting agents have been formulated, the desired quantities are combined with waxy material which will be used to form the body of the candle. For example, the coloring and/or scenting agents can be added to the waxy materials in the form of pilled wax granules.

When both coloring and scenting agents are employed, it is generally preferable to combine the agents together and then add the resulting mixture to the wax. It also is possible, however, to add the agents separately to the waxy material. Having added the agent or agents to the wax, the granules are coated by agitating the wax particles and the coloring and/or scenting agents together. The agitating step commonly consists of tumbling and/or rubbing the particles and agent(s) together. Preferably, the agent or agents are distributed substantially uniformly among the particles of wax, although it is entirely possible, if desired, to have a more random pattern of distribution. The coating step may be accomplished by hand, or with the aid of mechanical tumblers and agitators when relatively large quantities of prilled wax are being colored and/or scented.

Other optional additives include but are not limited to UV stabilizers and anti-oxidants.

EXAMPLES AND TEST PROCEDURES

The following materials were used in the Examples:

| Ingredient | Description | Melting Point (° F.) | Supplier |
|---|---|---|---|
| S-155 | Fully-hydrogenated soybean oil | 155 | Cargill |

-continued

| Ingredient | Description | Melting Point (° F.) | Supplier |
|---|---|---|---|
| HMSBO | Fully-hydrogenated metathesized soybean oil | 130 | Cargill |
| PM30 | Pacemaker 30 Fully refined paraffin wax | 122-127 | Citgo |
| PM35 | Pacemaker 35 Fully refined paraffin wax | 130-132 | Citgo |
| PM37 | Pacemaker 37 Fully refined paraffin wax | 132-134 | Citgo |
| PM42 | Pacemaker 42 Fully refined paraffin wax | 134-139 | Citgo |
| PM45 | Pacemaker 45 Fully refined paraffin wax | 140-143 | Citgo |
| PM53 | Pacemaker 53 Fully refined paraffin wax | 145-150 | Citgo |

The following test procedures are used in the various examples.

Test Procedure 1: Determination of Hydrocarbon Components by GC

This method determines the hydrocarbon (HC) components in candles containing paraffin by capillary gas chromatography with cool on-column injection and flame ionization detection (GC/FID). The hydrocarbon components, while themselves not needing to be derivatized, are exposed to silylation treatment using bis-(trimethylsilyl)-trifluoroacetamide+1% trimethylchlorosilane (BSTFA+1% TMCS) for the sake of other potential functional groups present that might require such conditions for proper GC introduction without risk to column disruption. Pyridine is added during derivatization and is thought to act as a catalyst by facilitating removal of active hydrogen.

This method may be done either qualitatively to determine which hydrocarbon compounds are present or quantitatively to determine the concentration of those hydrocarbons present. Heptadecane (17:0) is used as an internal standard (IS) and added via the solubilizing solvent, dichloromethane (methylene chloride).

This method incorporates the use of Theoretical Correction Factors (TCFs), which account for the differences in the detector response for all of the different hydrocarbons relative to heptadecane. The amount of each hydrocarbon is determined by comparison to the IS and multiplied by the appropriate TCF. Results are reported as total hydrocarbons on a weight percent basis.

It is useful to understand the difference (and hence the relationship) between TCF and Theoretical Response Factor (TRF) for a Flame Ionization Detector (FID). The TRF is actually the proportion (with respect to the total weight, which is the molecular weight) of the total amount of carbon atoms that are responding to the FID. Since the FID response depends on the proportion of active carbon atoms, to determine the actual weight of a hydrocarbon, the experimental measured area (or the weight) needs to be corrected. This factor is termed as TCF and it is equal to 1/TRF. The use of TCF should allow for reduced method variation compared to Empirical Correction Factors (ECFs) (if the GC system is operating properly). In essence, the standards do not need to be run to determine the RF. Thus TCFs can be used where the TCF of heptadecane is set to equal 1.000 and is the only TCF used in the calculation. In an effort to minimize and expedite processing (e.g., integrate all hydrocarbon peaks as one peak) the TCF of heptadecane was chosen since most of the other TCFs ranged from 1.0154 to 0.9939 for 6:0 to 54:0 hydrocarbons, respectively, when normalized to 17:0.

This method determines percent paraffin on a weight/weight percent basis. In order to calculate the percent detected paraffin in a given size range (say C25 to C29), the w/w % for the straight chain paraffins in that size range are summed and placed over the w/w % for the straight chain sum of the total (C6-C54) and multiplied by 100 to obtain a percent of the total paraffins detected by this method that fall in the C25 to C29 chain length window.

To determine the percent branched material a similar exercise is performed. This time the w/w % of the branched chains (minor components eluting between the straight chain paraffins) is summed and placed over the w/w % sum of both branched and straight chains over the C6-C54 range which encompasses all paraffins detected.

Test Procedure 2: Compression Testing of Wax Article

Test Procedure 2 tests the compressive strength of the wax article under compression (load to failure). The test has two parts. Part A, a constrained compression test, is used to form a compressed wax article under precisely controlled conditions. Depending on the test conditions (i.e. the physical properties of the wax composition being subjected to the test and the amount of force/pressure being applied during the text), the wax article will be produced with a certain relative density. Part B, an unconstrained compression test, takes the wax article formed in Part A and does a destructive test to measure its compressive strength. By comparing compressive strengths for samples with different wax compositions but comparable (i.e. similar) relative densities, it is possible to get a ranking of cohesive strength between different wax compositions. At the same relative density, a higher compressive strength indicates that one wax composition is more cohesive than other wax composition.

Figure 7:
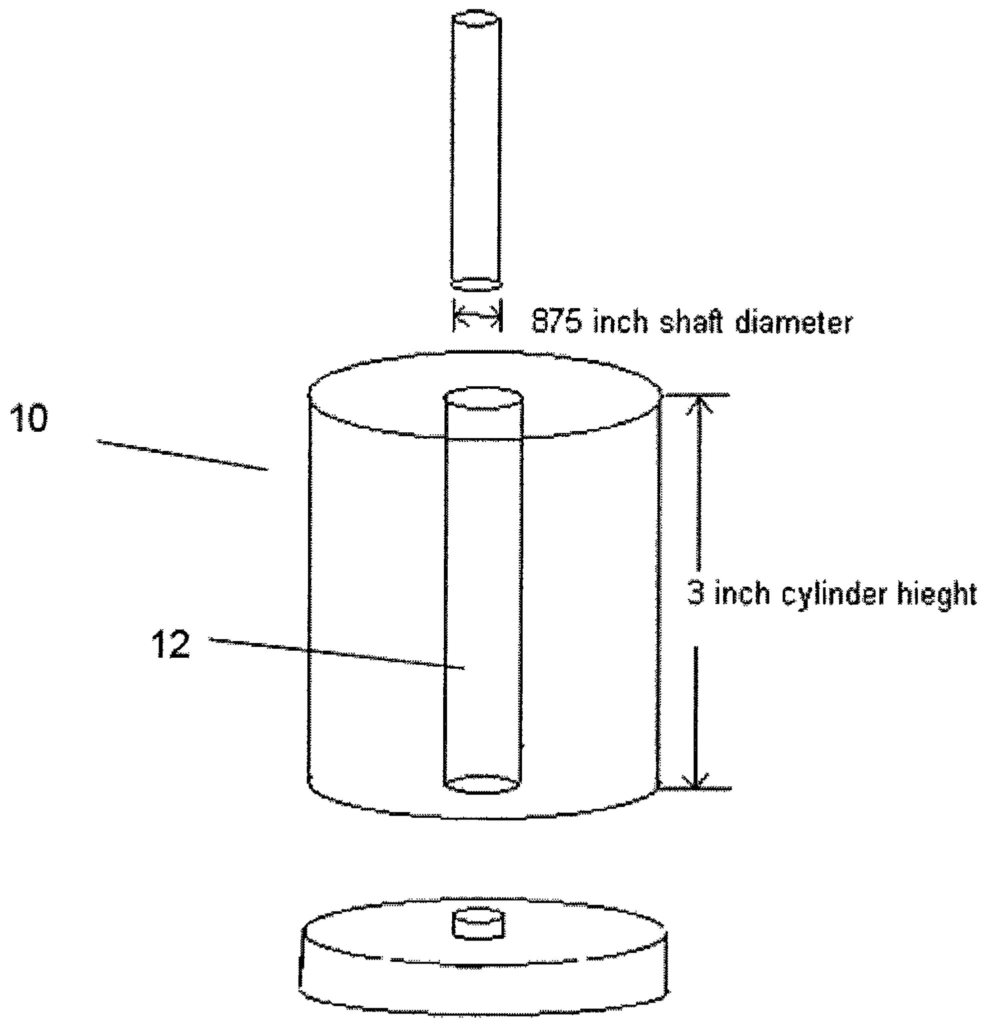
FIG. 7 depicts an illustration of a lab-scale compression mold, which is used in Test Procedure 2, described herein.

Equipment:

Compression Mold: See FIG. 7.

Tensile Tester: Texture Analyser TA-HDi equipped with a 500 Kg load cell (Stable Micro Systems supported by Texture Technologies Inc.)

Compressed Article Formation (Constrained Compression):

All testing is performed at 22° C. and 50% relative humidity. First, 10±0.1 grams of the prilled wax to be tested is weighed out and placed in a compression mold 10, such as that shown in FIG. 7. The mold is shaken back and forth sideways in order to cause the prilled wax particles to settle evenly. The plunger 12 is then set in place and the compression mold 10 is centered under a tensile tester equipped with a 500 kg load cell.

Figure 8:
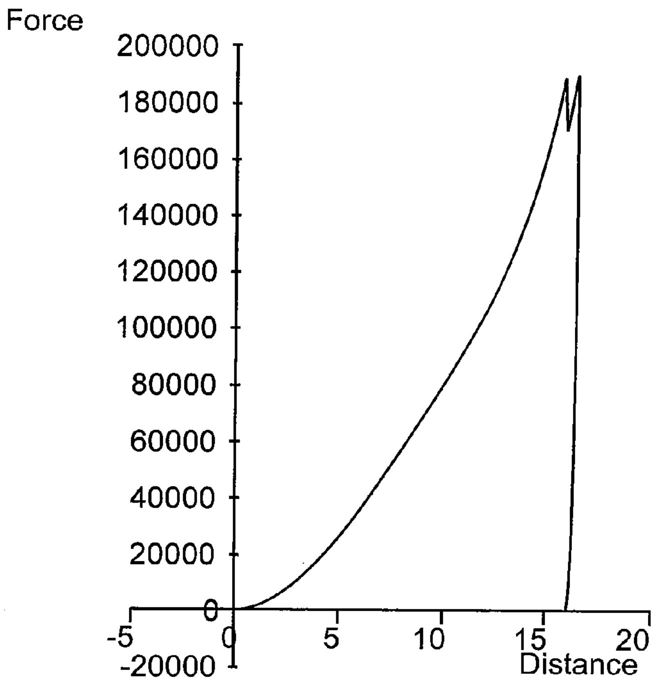
FIG. 8 illustrates a typical stress/strain curve that results from the constrained compression test.

The compression speed is set at 5 mm/sec until a trigger force of 100 grams is reached. At this point, the speed is reduced to 0.5 mm/sec. The prills are compressed until a force of 190 Kg (695 psi) is reached. The amount of force and the psi exerted are directly proportional to each other. The force is maintained for 5 seconds (All samples are run in duplicate). A typical stress/strain curve that results from the constrained compression test is shown in FIG. 8.

In order to obtain results that are comparable across different degrees of compression, additional compressed articles may be formed using the procedure described above at forces of 163 Kg (596 psi), 231 Kg (845 psi), and 273.4 Kg (1000 psi). These pressures span a range that is similar to that reached in industrial candle compression molding equipment. The multiple pressures are used so that relative densities in the range of interest can be attained and there need not be extrapolation of crush values and relative densities significantly outside the range of those measured. When complete, the compressed article is removed from the compression mold by inverting the mold and by applying a slow steady force to the plunger by hand.

The intrinsic density of the prill is determined using TEST PROCEDURE 3. The bulk density of the plug is then determined by measuring the height, diameter, and weight of the plug, and calculating the density of the compressed article from this data. The relative density of the plug is calculated by dividing the bulk density of the plug by the intrinsic density of the prill. For example, a 10 gram plug made up of prills with an intrinsic density of 0.9523 pressed to a volume of 10.5 mL would have a relative density of 1. If those same 10 grams of prills were compressed to 11 mL its relative density would be 0.9545.

Maximum Crush Force

Height and Maximum Crush Force Determination

Figure 9:
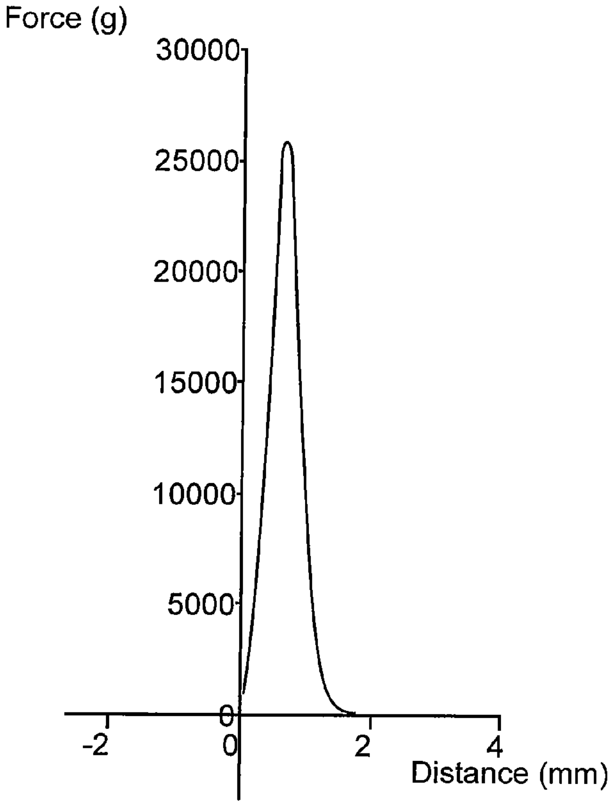
FIG. 9 illustrates a typical compression curve that results from the unconstrained compression test.

This test involves the unconstrained compression of the compressed article that is formed as described above. The expelled candle plug is placed on a piece of paper under a disk that is parallel to the surface below. When the article crumbles it can be conveniently collected and disposed of. The height of the plug is determined during the crush via a 100 g trigger force (0.01 mm accuracy). This is detected when parallel plates converge to crush the plug. The height of the article is used along with the max crush force to generate subsequent plots of relative density vs. max crush force. The parallel plates converge at 5 mm/second until a 100 g trigger force is reached and at this point the rate of convergence slows to 0.5 mm·second for the act of crushing. A typical unconstrained compression curve is shown in FIG. 9. The peak height is defined as the Maximum Crush Force.

Article integrity as measured by this test is dependent on the degree to which the sample is compressed in constrained compression. For this reason, multiple wax samples are typically compressed to different relative densities. The article integrity tends to increase with increasing relative density. The effect of composition on article integrity can then be compared across a range of compression pressures and relative densities. Using the procedure described above, wax compositions of the invention may be compared to a control paraffin wax.

Test Procedure 3: Determination of Density or Specific Gravity of a Solid Fat or Wax Sample Equipment/Reagents/Software Portable densimeter (Anton Paar DMA 35n)
Analytic balance
50 ml plastic tube
ethyl alcohol
DI water B. Procedures & Parameters The method is used to measure the density of the most dense (i.e. those not containing air voids) particles in the solid sample. IT is a modification of AOCS Official Method Cc 10b-25 Reapproved 1997, Sampling and Analysis of Commercial Fats and Oils.

When the sample particles float on the surface or distribute in the medium solution (i.e., suspended with no particles at the bottom of the medium solution), the sample particles have the same density as the medium solution. By measuring the density of the medium solution, the density of the most dense particles can be known.

1. Prepare 500 g of 45 wt % ethanol in water solution by weighing 225 g ethanol and adding DI water to total 500 g.

2. Add about 12-15 ml of 45 wt % ethanol/water solution to each of two 50 ml plastic tubes. (Please note that amount of the solution in the two tubes should be different for the measurement duplication purpose)
3. Add the sample to both tubes. Amount of the sample added should be able to cover the surface of the solution in the tube. About 1 g of the sample should be fine.
4. Shake the tube to make sure the sample in the solution is well wetted by the solution. Watch the sample in the tube.
5. If all sample particles stay at the surface of solution, pure ethanol is added dropwise until some sample particles start to sink. It is important that the added ethanol is well mixed in the tube so that the solution is uniform. Allow the mixture of the sample/solution to settle for 5-10 min and watch the tube to see if there are some solid particles floating in the solution. The end point for the measurement is the point at which some solid particles are suspended in the solution but do not stay at bottom of the solution. It is possible for most of the sample particles to stay at the surface of the solution and for only a few solid particles to float in the solution (or distribute in the solution). These few solid particles are the densest particles in the sample.
6. If some solid particles stay at the bottom of the solution, then pure DI water should be added dropwise to lift the particles into the solution in a state (i.e. distributed in the solution but not at the surface of the solution). When the water is added, make sure the solution is well mixed and uniform. Allow the solution mixture to settle for 30 min. When some solid particles still float on top or suspend in the solution BUT NO particles rest on the bottom (most particles of the sample may stay at the surface of the solution), the end point has been reached.
7. Use the portable densimeter to measure the density of the solution. The density of the solution is equal to the density of the sample without air bubbles incorporated.
8. Make sure the duplicate measurements of the sample have a density difference less than 0.005 g/ml; otherwise, the measurement should be repeated.

Test Procedure 4: DSC Characterization

Differential scanning calorimetry, DSC, measures changes in heat flow that occurs due to phase changes such as crystal formation or melting and the glassy to rubbery transitions. It reveals melting and crystallization temperature. The enthalpy of the transitions (J/g) relate to the amount of crystallinity. All temperature and heats of fusion were calibrated with indium.

The DSC method is used to examine (a) melt profiles on heating and (b) crystallization profiles on cooling. The heating/cooling program used was as follows. First, beginning at room temperature the sample is cooled at 10° C./min to −30° C. The sample is then heated at 10° C./min from −30° C. to 90° C. The sample is then cooled at a rate of 10° C./min from 90° C. to −30° C. This is followed by a second heat cycle at where the sample is heated at 10° C./min from −30° C. to 90° C.

The percent crystallinity can be determined by using the integrated heats of fusion and dividing by the theoretical heat of fusion for a 100% polyethylene crystallinity of 290 J/g.

Test Procedure 5: Slump Test

Purpose:

The slump test is used to test the strength of a candle under heat and weight conditions. It is meant to replicate the conditions a candle could undergo while being stored or shipped.

Procedure:

3 inch by 3 inch cylindrical candles were tested as follows. First, the height and diameter of the candle is measured and recorded. Next, the candle is placed on a tray with a rigid plate placed on top of the candle. The rigid plate is designed to evenly distribute the weight across the entire top of the candle. Next a 5 pound weight is placed on top of the rigid plate. Following this, the weighted candle is placed in an oven at a temperature of 49° C. for a period of 4 hours. After the 4 hour period, the weight and plate are removed and the height and diameter are again measured and recorded. All candles are then evaluated as a pass or a fail. A candle is considered to fail the slump test if the height and/or the diameter has changed by ±1/16 inch or more. Preferably, the wax articles of the present invention pass the slump test.

Characterization of Paraffin Control Wax:

The "paraffin control wax" used herein is a paraffin compression wax of the type that is suitable for use in forming candles by compression. A detailed chemical analysis of the paraffin control wax is provided in FIG. 12. The analysis will allow one of skill in the art to provide a paraffin control wax suitable for use as described herein.

Figure 10:
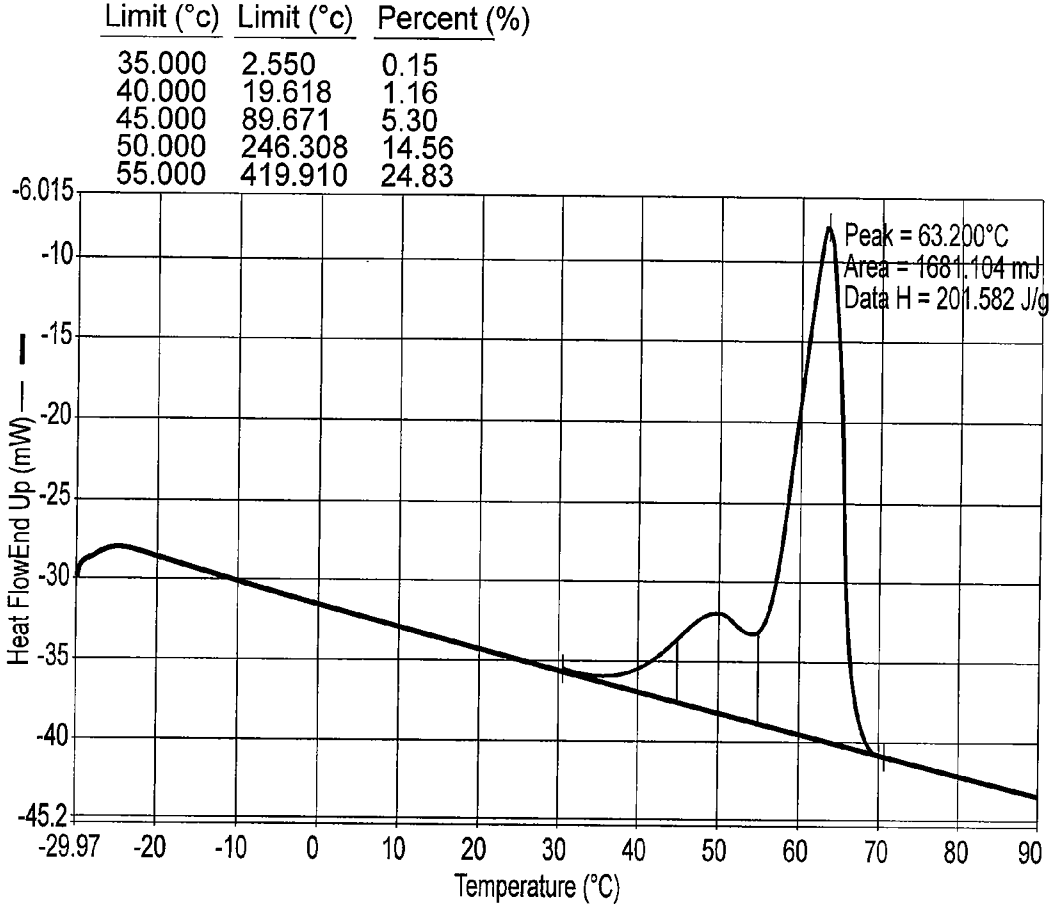
FIG. 10 shows a DSC profile (i.e. the second upheat) for a paraffin control wax.

The melting profile, which is provided in FIG. 10, shows a primary peak at 63° C. with a well-defined low melting shoulder peak at 50° C. Partial integrations show 5.3% of total enthalpy gone by 45° C., 14.6% gone by 50° C., and 24.8% gone by 55° C.

Gas Chromatograph of Paraffin Control Wax

Figure 11:
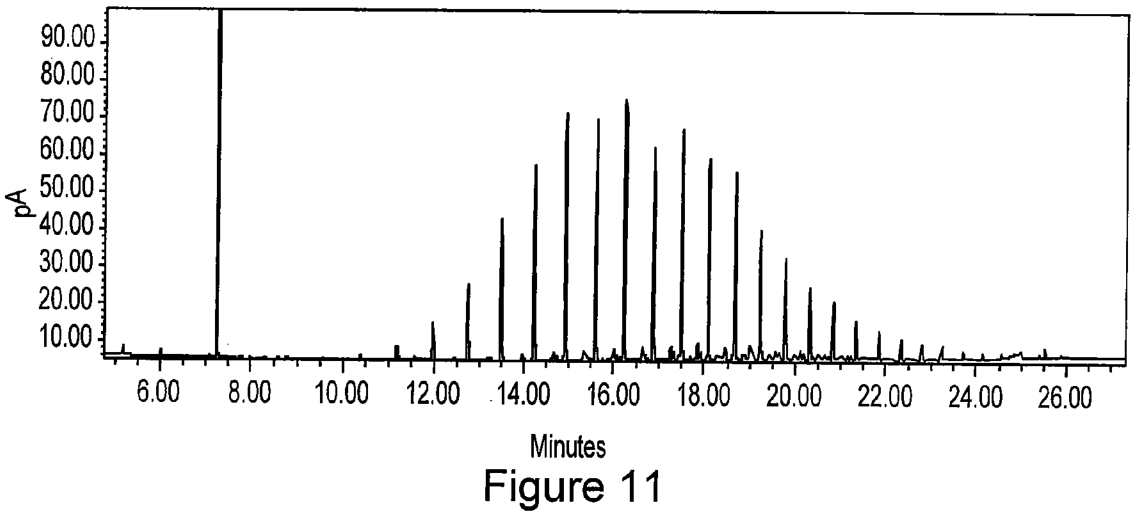
FIG. 11 shows a gas chromatogram (collected using Test Procedure 1, described herein) for the paraffin control wax of FIG. 10.
Figure 12:
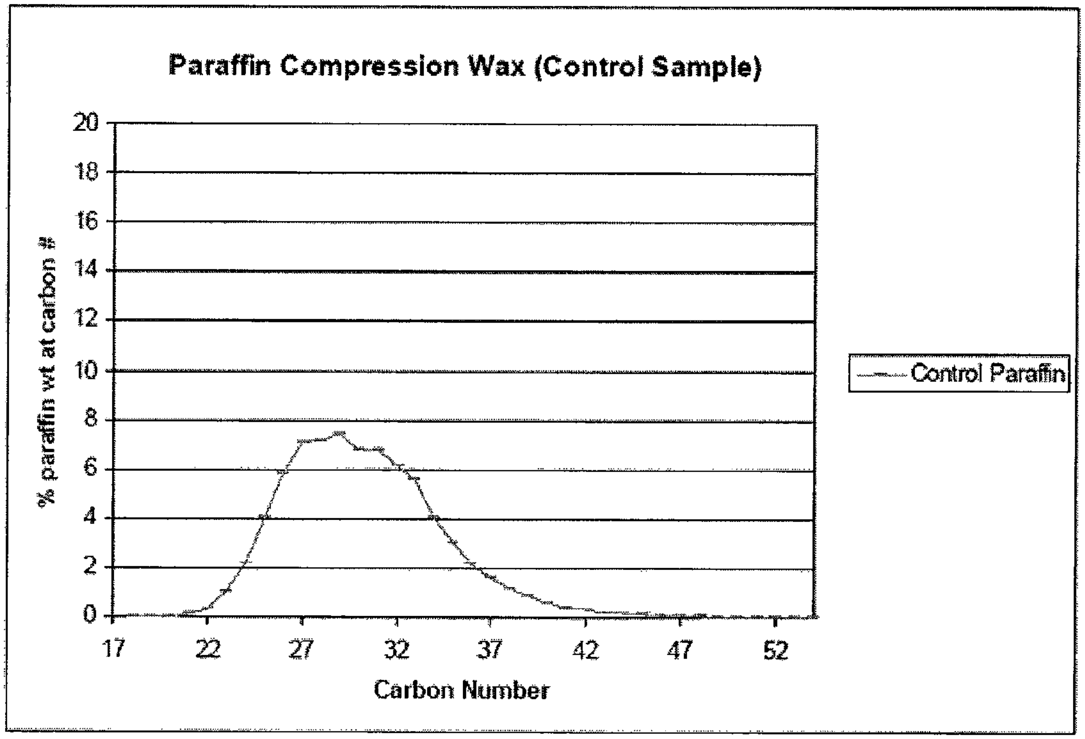
FIG. 12 shows a carbon distribution profile for the paraffin control wax of FIG. 10.

The straight chain carbon number distribution for the paraffin control wax is shown in FIG. 12. The minor branched peaks present in-between the straight chain peaks (see the gas chromatogram in FIG. 11) are shown in the table below. The paraffin control wax, shown in FIGS. 11 and 12, has a percent branching of 13.35% of the total paraffin in the range of C15 to C55.

% (w/w) of Hydrocarbons in Paraffin Control Wax

| Hydrocarbon Number | % (w/w) |
|---|---|
| 18 | 0.000 |
| 19 | 0.003 |
| 20 | 0.012 |
| 20 branched | 0.000 |
| 21 | 0.114 |
| 21 branched | 0.000 |
| 22 | 0.363 |
| 22 branched | 0.012 |
| 23 | 1.051 |
| 23 branched | 0.014 |
| 24 | 2.216 |
| 24 branched | 0.058 |
| 25 | 4.040 |
| 25 branched | 0.184 |
| 26 | 5.832 |
| 26 branched | 0.302 |
| 27 | 7.118 |
| 27 branched | 0.478 |
| 28 | 7.173 |
| 28 branched | 0.573 |
| 29 | 7.499 |
| 29 branched | 0.787 |
| 30 | 6.798 |
| 30 branched | 0.891 |
| 31 | 6.858 |
| 31 branched | 1.152 |
| 32 | 6.188 |
| 32 branched | 1.257 |
| 33 | 5.593 |
| 33 branched | 1.235 |
| 34 | 4.074 |
| 34 branched | 1.263 |
| 35 | 3.071 |
| 35 branched | 1.112 |

-continued

| % (w/w) of Hydrocarbons in Paraffin Control Wax | |
|---|---|
| Hydrocarbon Number | % (w/w) |
| 36 | 2.172 |
| 36 branched | 0.808 |
| 37 | 1.664 |
| 37 branched | 0.568 |
| 38 | 1.222 |
| 38 branched | 0.425 |
| 39 | 0.931 |
| 39 branched | 0.249 |
| 40 | 0.658 |
| 40 branched | 0.153 |
| 41 | 0.446 |
| 41 branched | 0.110 |
| 42 | 0.354 |
| 42 branched | 0.062 |
| 43 | 0.238 |
| 43 branched | 0.048 |
| 44 | 0.180 |
| 44 branched | 0.000 |
| 45 | 0.118 |
| 45 branched | 0.000 |
| 46 | 0.093 |
| 46 branched | 0.000 |
| 47 | 0.059 |
| 47 branched | 0.000 |
| 48 | 0.046 |
| 48 branched | 0.000 |
| 49 | 0.027 |
| 49 branched | 0.000 |
| 50 | 0.019 |
| 51 | 0.000 |
| 52 | 0.000 |
| 53 | 0.000 |
| 54 | 0.000 |

Example 1

Tooling and Flashing Evaluation

Wax compositions as shown in TABLE 1-1 were prepared and were used in a compression molding operation to produce wax articles. The articles were visually examined for tooling marks and flashing. The results are provided in TABLE 1-2.

TABLE 1-1

| Wax Compositions | | | |
|---|---|---|---|
| | Example 1 (%) | Comp. Ex. A (%) | Comp. Ex. B (%) |
| Hydrogenated Natural Oil-based Wax | | | |
| S-155 | 44 | 44 | 44 |
| HMSBO | 11 | 11 | 11 |
| Paraffin | | | |
| PM45 | | 45 | 30 |
| PM37 | 45 | | |
| PM30 | | | 15 |

TABLE 1-2

| Testing Results | | |
|---|---|---|
| Wax Composition | Tooling Marks | Flashing |
| Example 1 | Low | Low |
| Comp. Ex. A | Medium | Medium |
| Comp. Ex. B | High | High |

As noted in TABLE 1-2, the de-molding characteristics for Example 1, a wax representative of those covered by the present invention, are improved over the de-molding characteristics of other hybrid wax compositions.

Example 2

Cohesive Strength

Figure 13:
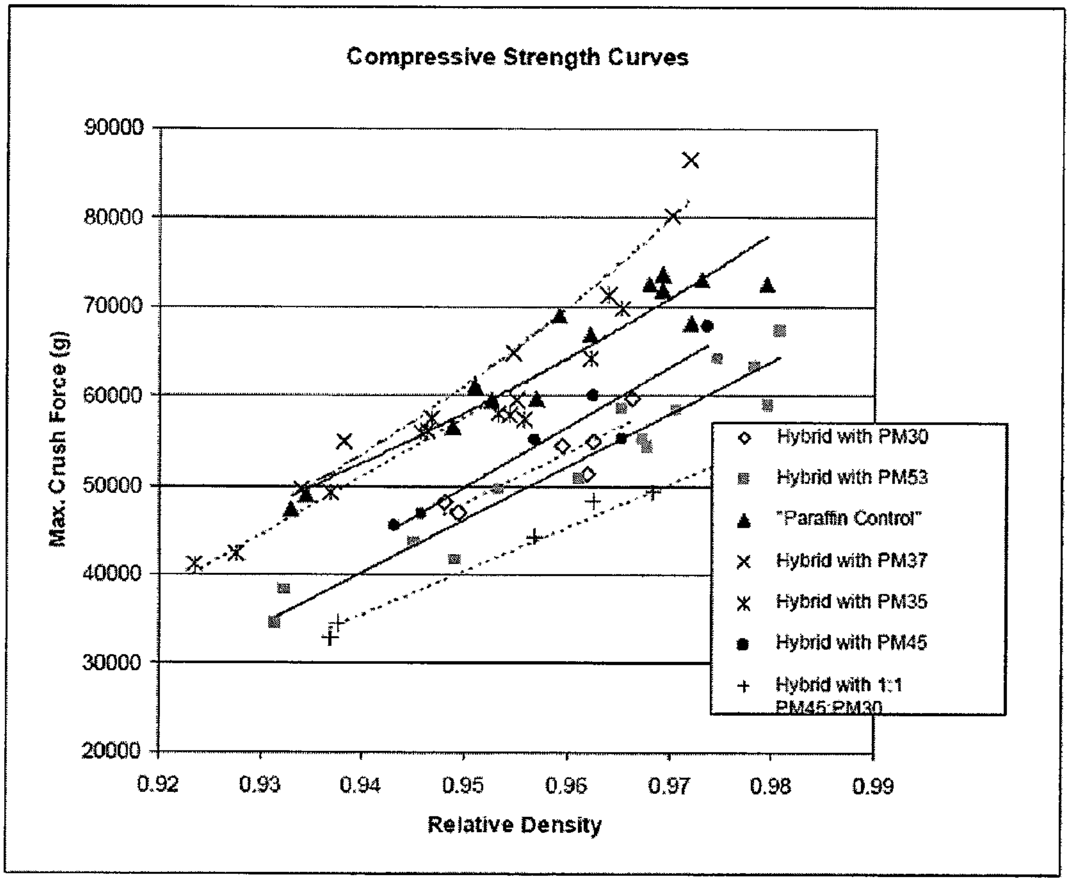
FIG. 13 is a graph showing compressive strength as a function of relative density for a series of wax composition samples. The data was measured using Test Procedure 2.

Wax compositions having the formulations listed in TABLE 2-1 were prepared and were tested for compressive strength using Test Procedure 2. The relative density for each sample was measured using Test Procedure 3. The results are graphically depicted in FIG. 13.

TABLE 2-1

| | Hybrid with PM30 | Hybrid with PM53 | Paraffin Control Wax | Hybid with PM37 | Hybrid with PM35 | Hybrid with PM45 | Hybrid with PM45/30 |
|---|---|---|---|---|---|---|---|
| Hydrogenated Natrual Oil-based Wax | | | | | | | |
| S-155 | 44 | 44 | | 44 | 44 | 44 | 44 |
| HMSBO | 11 | 11 | | 11 | 11 | 11 | 11 |
| Paraffin | | | | | | | |
| PM 45 | | | | | | 45 | 22.5 |
| PM 30 | 45 | | | | | | 22.5 |
| PM 35 | | | | | 45 | | |
| PM 53 | | 45 | | | | | |
| PM 37 | | | | 45 | | | |
| Paraffin Control Wax | | | 100 | | | | |

Figure 14:
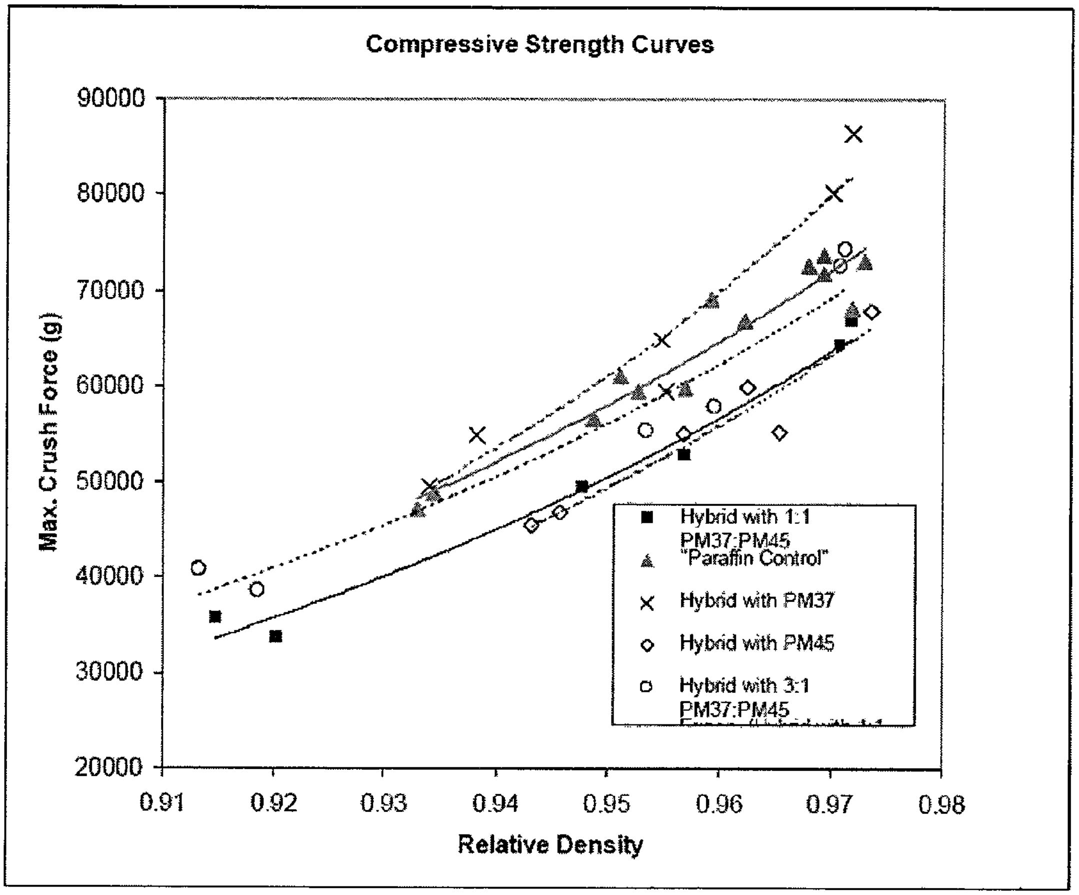
FIG. 14 is a graph showing compressive strength as a function of relative density for a series of wax composition samples. The data was measured using Test Procedure 2.

Wax compositions having the formulations listed in TABLE 2-2 were prepared and were tested for compressive strength using Test Procedure 2. The relative density for each sample was measured using Test Procedure 3. The results are graphically depicted in FIG. 14.

TABLE 2-2

| | Hybrid with 1:1 PM37:45 | Hybrid with 3:1 PM37/45 | Hybrid with PM37 | Hybid with PM45 | Citgo Comp. Wax |
|---|---|---|---|---|---|
| Hydrogenated Natrual Oil-based Wax | | | | | |
| S-155 | 44 | 44 | 44 | 44 | |
| HMSBO | 11 | 11 | 11 | 11 | |
| Paraffin | | | | | |
| PM 45 | 22.5 | 11.2 | | 45 | |
| PM 30 | | | | | |
| PM 35 | | | | | |
| PM 53 | | | | | |
| PM 37 | 22.5 | 33.8 | 45 | | |
| Paraffin Control Wax | | | | | 100 |

The curves in Example 2 demonstrate how cohesive one wax is versus another at a given relative density. At a given relative density, a wax with a higher crush force represents a wax with higher cohesive strength. The crush strength data is method specific, that is, the measured crush values are specific to the geometry, method of manufacture, and size of the samples that is tested. However, the relative trends in cohesive strength should be independent of scale and geometry for a given relative density.

Regression fits were applied to each sample set on the aforementioned plots. The regressed lines were then used to estimate values of strength at relative densities of 0.93 and 0.95. This allowed the sets to be ranked according to cohesive strength on a comparable basis.

Data for crush strength at relative densities of 0.93 and 0.95 are presented in TABLE 2-3. At 0.93, the hybrid waxes using PM37 and PM35 exhibited strengths similar to paraffin (i.e. strengths around 43,000-50,000 grams). At 0.95 relative density, the same hybrid waxes also exhibited strengths similar to paraffin (i.e., strengths around 53,000-63,000 grams). Hybrid waxes made with bio-based wax in combination with standard paraffin compression wax (PRL97) (Sample 97 in Table 2-3) performed poorly. Hybrid waxes made with high levels of PM30, PM45 or PM53 also performed noticeably worse than the paraffin benchmark.

TABLE 2-3

| Sample | Wax Composition | Max Crush Force at 0.93 relative density | Max Crush Force (grams) at 0.95 relative density | Relative Strength @ 0.93 relative density | Relative Strength @ 0.95 relative density |
|---|---|---|---|---|---|
| 72 | Hybrid with PM37 | 48119 | 59120 | 1.03 | 1.01 |
| 88 | Hybrid with 3:1 PM37:PM45 | 46628 | 57902 | 1.00 | 0.99 |
| 93 | Paraffin Control | 46595 | 58762 | 1 | 1 |

TABLE 2-3-continued

| Sample | Wax Composition | Max Crush Force at 0.93 relative density | Max Crush Force (grams) at 0.95 relative density | Relative Strength @ 0.93 relative density | Relative Strength @ 0.95 relative density |
|---|---|---|---|---|---|
| 94 | Hybrid with PM37 | 44641 | 62401 | 0.958 | 1.06 |
| 95 | Hybrid with PM35 | 44455 | 57753 | 0.954 | 0.98 |
| 84 | Hybrid with 1:1 PM37:PM45 | 41074 | 52164 | 0.882 | 0.888 |
| 91 | Hybrid with PM30 | 36328* | 47959* | 0.780* | 0.816* |
| 96 | Hybrid with PM45 | 36164* | 49753* | 0.776* | 0.847* |
| 92 | Hybrid with PM53 | 34332* | 46184* | 0.737* | 0.786* |
| 43 | Hybrid with 2:1 PM45:PM30 | 33741* | 45160* | 0.724* | 0.769* |
| 98 | Hybrid with 1:1 PM45:PM30 | 30527* | 40333* | 0.655* | 0.686* |
| 97 | Hybrid with Paraffin Control Wax | 24294* | 35217* | 0.521* | 0.599* |

*indicates that the samples performed substantially below the paraffin control wax.

Example 3

Carbon Distribution and Branching Profiles for Paraffin Waxes

Figure 15A:
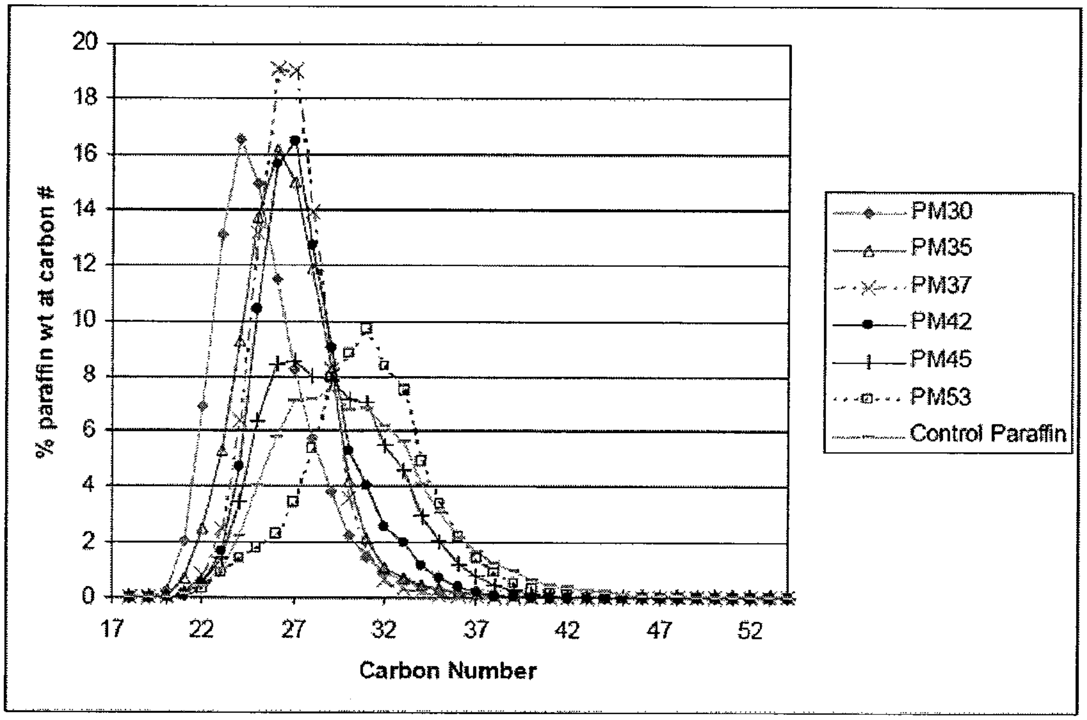
FIGS. 15A and B show carbon distribution profile for various paraffin waxes and paraffin wax blends.
Figure 15B:
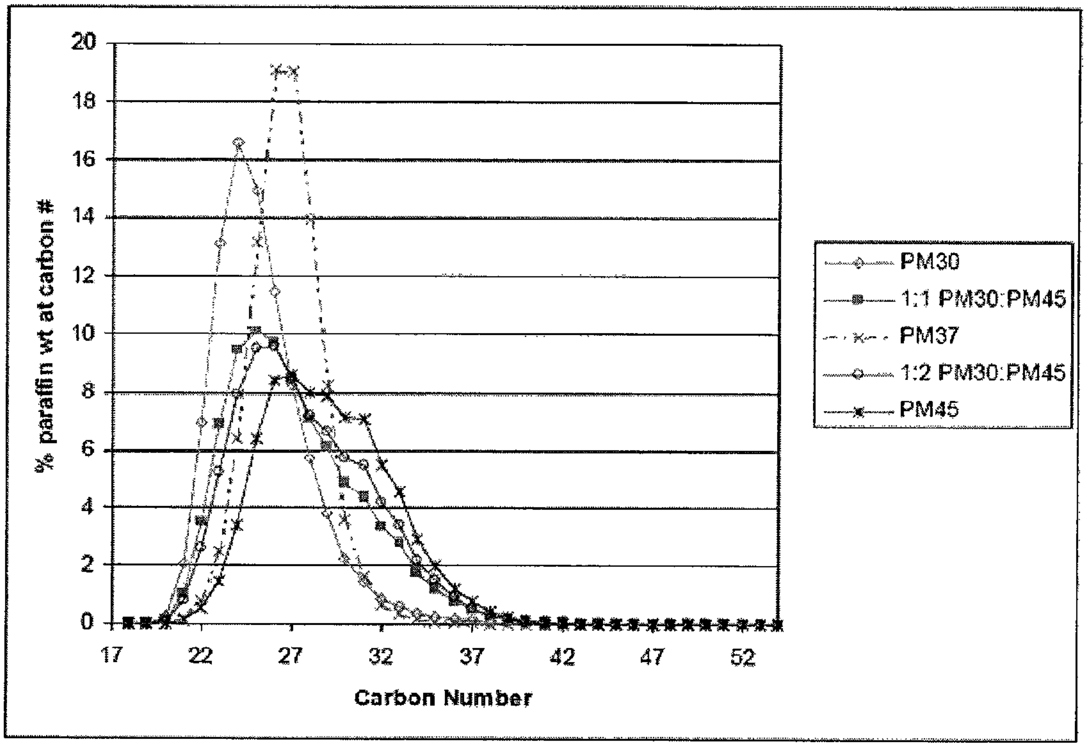

The carbon distribution profile for various paraffin waxes and paraffin wax blends was determined using Test Procedure 1. The results are shown in FIGS. 15A-B and 16 and in TABLE 3-1.

TABLE 3-1

| Paraffin Wax | C25-C29 (%) | C32-C35 (%) | Strength of Hybrid Wax at Rel. Density of 0.93 | Strength of Hybrid Wax at Rel. Density of 0.95 |
|---|---|---|---|---|
| PM30 | 49.42 | 2.38 | 36328 | 47959 |
| 1:1 PM30:PM45 | 49.92 | 11.18 | 30527 | 40333 |
| PM35 | 70.54 | 2.74 | 44455 | 57753 |
| PM37 | 81.68 | 1.41 | 48119 | 59120 |
| 1:2 PM30:PM45 | 50.02 | 13.75 | 33741 | 45160 |
| PM42 | 73.30 | 7.29 | — | — |
| PM45 | 51.05 | 19.56 | 36164 | 49753 |
| PM53 | 28.98 | 33.71 | 34332 | 46184 |
| Paraffin Control* | 41.56 | 24.83 | 46595 | 58762 |
| 25:75 PM45/37 | 74.89 | 5.43 | 46628 | 57902 |
| 50:50 PM45:37 | 67.56 | 9.77 | 41074 | 52164 |

*The strength reported here is for the paraffin control wax by itself (i.e. not for a hybrid wax containing the paraffin control wax). All other wax strengths are for the hybrid systems containing each type of paraffin wax, as described in Table 2-1 and Table 2-2.

As set forth above, the paraffin waxes used in the hybrid compositions here typically have a narrow distribution of carbon chain lengths, concentrated in the range of C25-C29. As can be seen in Graph 3-2, these same examples also have a small shoulder on the gas chromatogram, in the range of C32-C35 carbon chain lengths. The size of this shoulder varies as a percentage of the total hydrocarbon content and may affect the properties (e.g. cohesive strength) of the hybrid wax. The shoulder is typically less than 10% of the hydrocarbon content, more typically less than 7%, sometimes even less than 4%.

The percent branching for certain paraffin waxes was determined using Test Procedure 1. The results are reported in TABLE 3-2. This data in the table was derived by summing the w/w % of the total paraffin over the range from C18-C54 and summing the branched paraffin over the same range. The branched w/w % is divided by the total to get the percent of branched paraffin that is detected.

TABLE 3-2

| Wax ID | % branched paraffin | Total % paraffin (w/w) |
|---|---|---|
| paraffin control wax | 13.35 | 87.97 |
| PM30/PM45 | 9.53 | 91.67 |
| PM30/PM45 | 10.74 | 92.66 |
| PM30 | 6.09 | 95.31 |
| PM35 | 7.96 | 100.26 |

TABLE 3-2-continued

| Wax ID | % branched paraffin | Total % paraffin (w/w) |
|---|---|---|
| PM37 | 7.61 | 97.40 |
| PM42 | 7.71 | 94.98 |
| PM45 | 12.96 | 88.34 |
| PM53 | 17.85 | 87.44 |

Example 4

DSC Profiles For Paraffin Waxes

Figure 17:
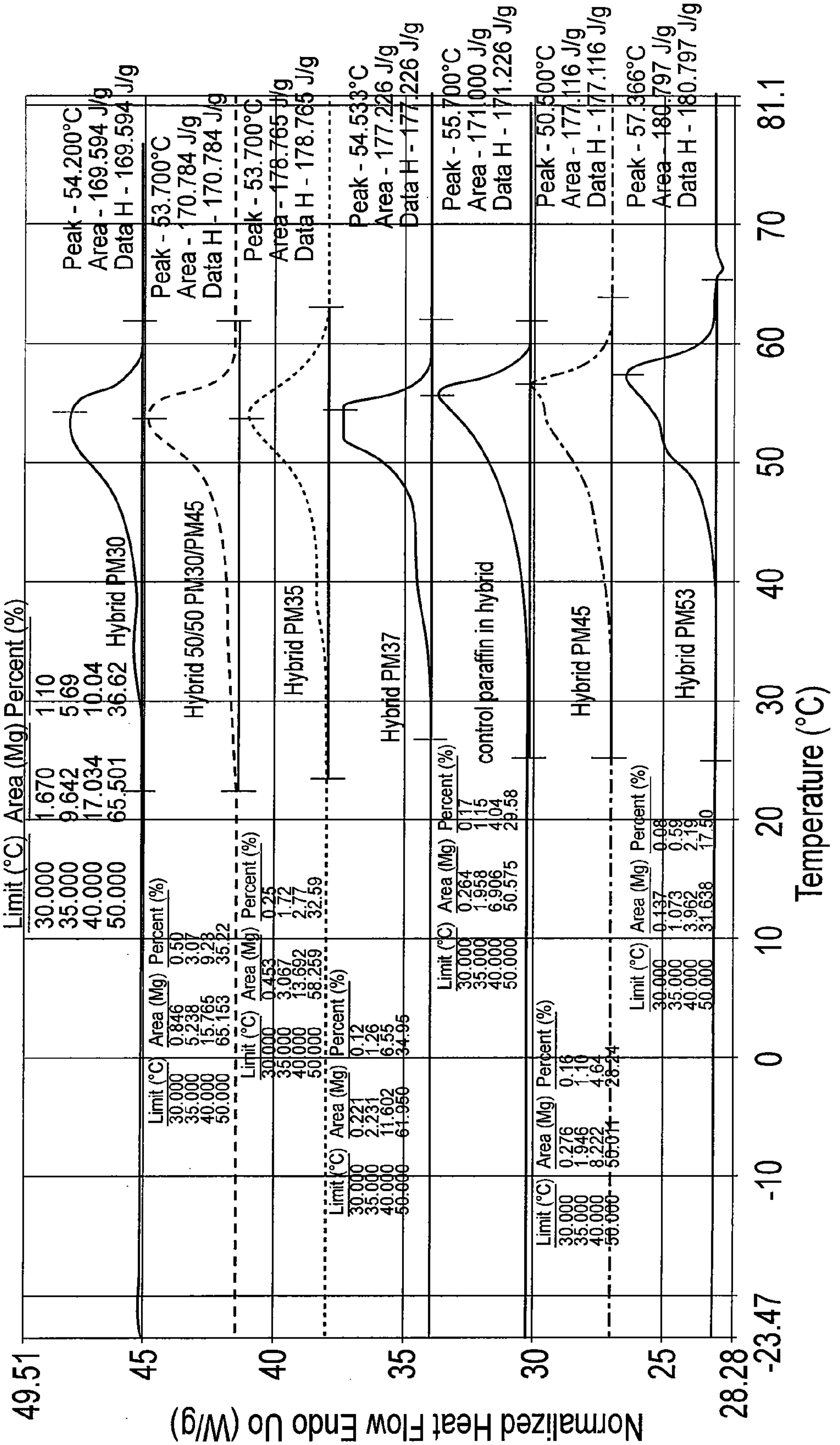
FIG. 17 shows DSC profiles (i.e. second upheats) for a series of hybrid wax compositions.

Waxes were characterized using differential scanning calorimetry (DSC). FIG. 17 shows DSC profiles for various paraffin waxes and hybrid wax compositions. Table 4.1, below gives quantitative and comparative values on how much of the sample is melted at a given temperature. Table 4.1 was generated by making limits of integration at 30° C., 35° C., 40° C., and 50° C. and the values listed show the percent of the enthalpy of melting that exists below that temperature limit of integration.

TABLE 4-1

| 11:44:45 HMSBO:S155:below | % below 30° C. | % below 35° C. | % below 40° C. | % below 50° C. | peak temp | enthalpy j/g |
|---|---|---|---|---|---|---|
| Hybrid PM30 | 1.1 | 5.69 | 10.04 | 38.62 | 54.2 | 169.6 |
| Hybrid 50/50 (PM30/PM45 | 0.5 | 3.07 | 9.23 | 35.22 | 53.7 | 170.8 |
| Hybrid PM35 | 0.25 | 1.72 | 7.77 | 32.59 | 53.7 | 178.8 |
| Hybrid PM37 | 0.12 | 1.26 | 6.55 | 34.96 | 54.53 | 177.22 |
| Control Paraffin Wax | 0.17 | 1.15 | 4.04 | 29.58 | 55.7 | 171 |
| Hybrid PM45 | 0.16 | 1.1 | 4.64 | 28.24 | 56.53 | 177.1 |
| Hybrid PM 53 | 0.08 | 0.59 | 2.19 | 17.5 | 57.36 | 180.8 |

Figure 18:
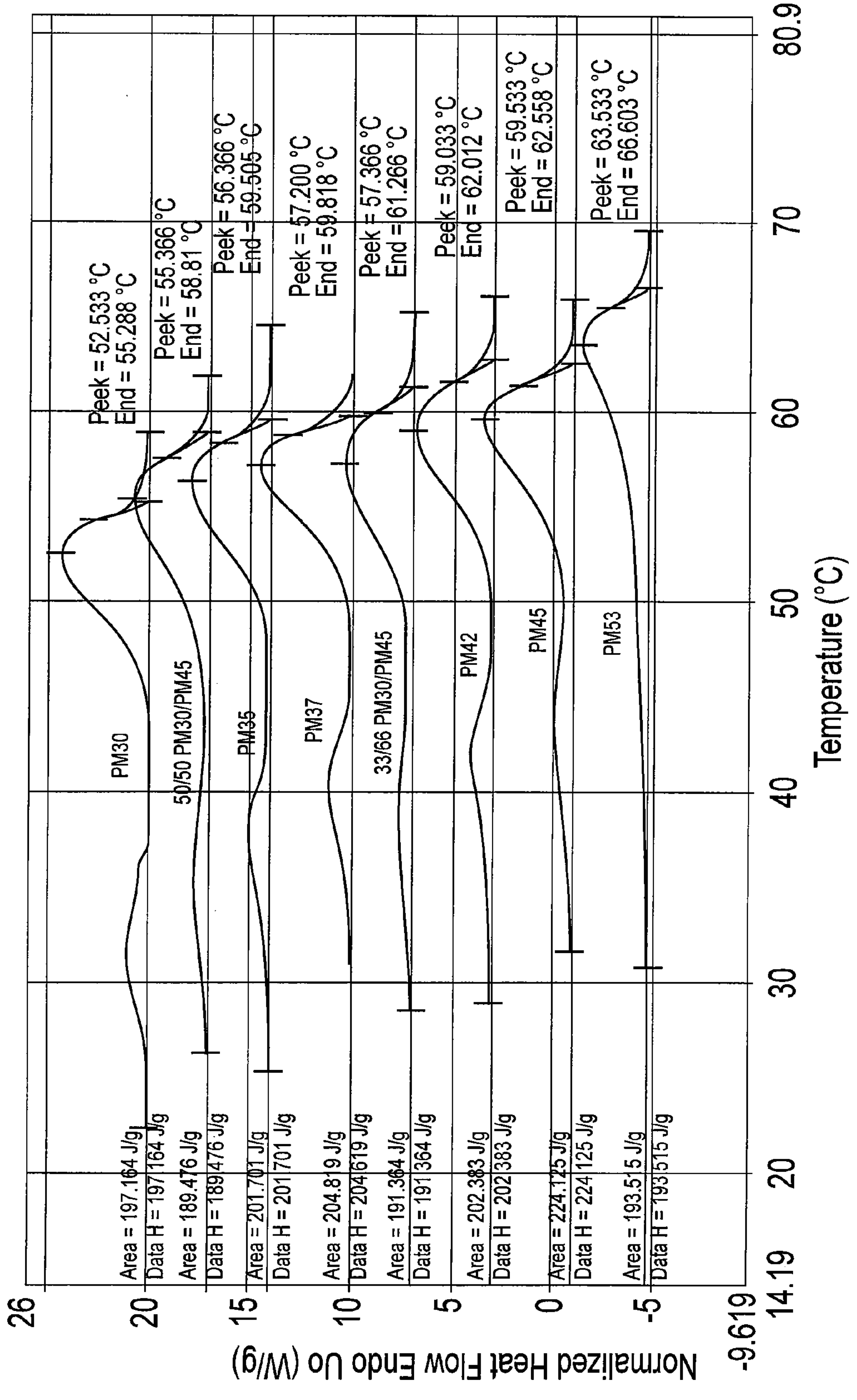
FIG. 18 shows DSC profiles (i.e. second upheats) for a series of paraffin wax compositions.

FIG. 18 shows the DSC profiles (Le. the second upheats) for various paraffin waxes. These are pure paraffin systems as opposed to hybrid waxes. Table 4-2 shows data that has been extracted from the DSC profile of FIG. 18.

TABLE 4-2

Below partial areas of 2nd upheat peak integrations have been extracted. The first five pick temperatures and list the percent of the peak lying below that temperature. The last four columns list the temperature necessary to attain 5, 10, 15, and 20% of the sample to be melted

| Paraffin ID | Area j/g | Melt peak | End set | % area Below 25° C. | % area Below 30° C. | % area Below 35° C. | % area Below 45° C. | % area Below 55° C. | % area Temp is | At 5% area Temp is | At 15 area Temp is |
|---|---|---|---|---|---|---|---|---|---|---|---|
| PM30 | 197.16 | 52.53 | 55.27 | 0.22 | 5.31 | 17.01 | 22.93 | 96.76 | 29.87 | 31.96 | 33.75 |
| 50/50 PM30/PM45 | 189.48 | 55.36 | 58.81 | na | 0.76 | 8.48 | 21.32 | 68.28 | 33.37 | 35.65 | 38.04 |
| PM35 | 201.7 | 55.36 | 59.05 | na | 0.5 | 4.88 | 21.85 | 56.63 | 35.063 | 37.15 | 38.89 |
| PM37 | 204.82 | 57.2 | 59.82 | na | 0.16 | 1.86 | 21.54 | 46.02 | 37.54 | 39.52 | 41.03 |
| 33/66 PM30/PM45 | 191.36 | 57.36 | 61.27 | na | 0.06 | 3.3 | 19.86 | 47.79 | 36.05 | 38.56 | 41.08 |
| PM42 | 202.38 | 59.03 | 62.81 | na | 0.02 | 0.88 | 19.76 | 33.37 | 39.02 | 41.04 | 42.69 |
| PM45 | 224.13 | 59.53 | 62.58 | na | na | 0.34 | 15.76 | 35.31 | 40.14 | 42.55 | 44.66 |
| PM53 | 193.52 | 63.53 | 66.6 | na | na | 0.29 | 5.6 | 26.96 | 44.45 | 48.05 | 50.5 |

Table 4-2 was generated by making limits of integration at 25, 30, 35 45 and 55 the values listed show the percent of the enthalpy of melting that exists below that temperature limit of integration. It gives quantitative comparative values on how much of the sample is melted at a given temperature.

Example 5

Slump Test

Candles having the wax formulations shown in TABLE 5-1 were tested according the Slump Test of Test Procedure 5. The results are shown in TABLE 5-1.

TABLE 5-1

| Candle ID | Formula | Pre-Oven Height (in.) | Pre-Oven Diameter (in.) | Post-Oven Height (in.) | Post-Oven Diameter (in.) | Pass/Fail |
|---|---|---|---|---|---|---|
| PRL70-4 | 45% PM37<br>43.9% S155<br>11.1% HMSBO | 3 3/16 | 3 | 3 3/16 | 3 | Pass |
| PRL71-3 | 45% PM37<br>44% S155<br>11% HMSBO | 3 1/8 | 3 | 3 1/8 | 3 | Pass |
| PRL68-2 | 45% PM37<br>44% S155<br>11% HMSBO<br>3 wt %<br>Fragrance | 3 3/16 | 3 | 3 3/16 | 3 | Pass |
| PRL72-7 | 45% PM37<br>44% S155<br>11% HMSBO<br>3 wt %<br>Fragrance | 3 1/8 | 3 | 3 1/8 | 3 | Pass |
| Control 1 | 100% PM45 | 3 | 3 | 2 11/16 | 3 | Fail |
| Control 2 | 100% PM45 | 3 | 3 | 2 3/4 | 3 | Fail |

HMSBO = hydrogenated metathesized soybean oil
S155 = hydrogenated soybean oil.

Sample candles PRL70-4, PRL71-3, PRL68-2, and PRL72-7, made in accordance with the present invention, maintained both their pre-oven height and diameter and, hence, passed the slump test. Control candle 1 lost 1/16 inch of its pre-oven height and control candle 2 lost % inch, and hence, failed the slump test.

It is intended that the foregoing detailed description be regarded as illustrative rather than limiting, and that it be understood that it is the following claims, including all equivalents, that are intended to define the spirit and scope of this invention.

The invention claimed is:

1. A hybrid wax composition comprising:

(a) a hydrogenated natural oil-based wax; and (b) a paraffin wax, wherein the paraffin wax is present in an amount of less than about 50% by weight of the hybrid wax composition, and wherein about 52% by weight or greater of hydrocarbons in the paraffin wax have carbon chain lengths ranging from C25 to C29.

2. The hybrid wax composition of claim 1, wherein about 65% by weight or greater of the hydrocarbons in the paraffin wax have carbon chain lengths ranging from C25 to C29.

3. The hybrid wax composition of claim 1, wherein about 70% by weight or greater of the hydrocarbons in the paraffin wax have carbon chain lengths ranging from C25 to C29.

4. The hybrid wax composition of claim 1, wherein about 10% by weight or less of hydrocarbons in the paraffin wax are branched.

5. The hybrid wax composition of claim 1, wherein from about 7% to about 10% by weight of hydrocarbons in the paraffin wax are branched hydrocarbons.

6. The hybrid wax composition of claim 1, wherein the paraffin wax has a hydrocarbon carbon chain length distribution that is centered at about C25 to C27.

7. The hybrid wax composition of claim 1, wherein the hydrogenated natural oil-based wax comprises a hydrogenated vegetable oil, a hydrogenated animal fat, or a mixture thereof.

8. The hybrid wax composition of claim 7, wherein the hydrogenated natural oil-based wax comprises fully hydrogenated soybean oil.

9. The hybrid wax composition of claim 1, wherein the hydrogenated natural oil-based wax has an iodine value (IV) of about 0.1 to about 80.

10. The hybrid wax composition of claim 1, wherein the hydrogenated natural oil-based wax comprises a hydrogenated metathesized natural oil-based wax.

11. The hybrid wax composition of claim 10, wherein the hydrogenated metathesized natural oil-based wax has an iodine value (IV) of about 0.1 to about 80.

12. The hybrid wax composition of claim 1, wherein the hydrogenated natural oil-based wax comprises: (i) a hydrogenated natural oil-based wax; and (ii) a hydrogenated metathesized natural oil-based wax.

13. The hybrid wax composition of claim 12, wherein the hydrogenated natural oil-based wax and the hydrogenated metathesized natural oil-based wax are present in a weight ratio ranging from about 10:1 to about 1:2.

14. The hybrid wax composition of claim 12, wherein the hydrogenated metathesized natural oil-based wax comprises hydrogenated metathesized soybean oil.

15. The hybrid wax composition of claim 1, wherein the hydrogenated natural oil-based wax is present in an amount of about 41% wax weight or greater of the hybrid wax.

16. The hybrid wax composition of claim 1, wherein the hydrogenated natural oil-based wax is present in an amount of about 51% wax weight or greater of the hybrid wax.

17. The hybrid wax composition of claim 1, further comprising a fat bloom inhibitor.

18. The hybrid wax composition of claim 17, wherein the fat bloom inhibitor comprises monoglycerides, diglycerides, sorbitan esters, polyglycerol polyricinoleate, lecithin, paraffin, surface-active ingredients, and mixtures thereof.

19. The hybrid wax composition of claim 1, wherein the hydrogenated natural oil-based wax is fat bloom resistant.

20. The hybrid wax composition of claim 1, wherein the paraffin wax is present in an amount of about 20% wax weight to about 49% wax weight of the hybrid wax.

21. A method of making a wax article by compression molding, the method comprising the steps of:

providing a prilled wax comprising (a) a hydrogenated natural oil-based wax; and (b) a paraffin wax, wherein the paraffin wax is present in an amount of less than about 50% by weight of the hybrid wax composition, and wherein about 52% by weight or greater of hydrocarbons in the paraffin wax have carbon chain lengths ranging from C25 to C29;

providing a compression molding apparatus comprising a mold defining a cavity and at least one compressing piston;

at least partially filling the cavity of the compression molding apparatus with the prilled wax;

compressing the prilled wax with the piston to form the article; and ejecting the article from the cavity.

22. A hybrid wax composition comprising:

(a) about 40% to 50% wax weight hydrogenated soybean oil-based wax;

(b) about 10% to 15% wax weight hydrogenated metathesized soybean oil; and (c) a paraffin wax, wherein the paraffin wax is present in an amount of less than about 50% by weight of the hybrid wax composition, and wherein about 52% by weight or greater of hydrocarbons in the paraffin wax have carbon chain lengths ranging from C25 to C29, and having a melting point ranging from 130° F. to 140° F.

* * * * *

UNITED STATES PATENT AND TRADEMARK OFFICE

CERTIFICATE OF CORRECTION

PATENT NO. : 8,652,221 B2
APPLICATION NO. : 12/637123
DATED : February 18, 2014
INVENTOR(S) : Uptain et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 599 days.

Signed and Sealed this
Eleventh Day of August, 2015

Michelle K. Lee
*Director of the United States Patent and Trademark Office*